United States Patent [19]

Kohno et al.

[11] Patent Number: 5,781,915

[45] Date of Patent: Jul. 14, 1998

[54] DOCUMENT PROCESSING APPARATUS THAT DETERMINES WHETHER A DOCUMENT HAS BEEN CONFIRMED BY ANOTHER USER

[75] Inventors: Akihiro Kohno; Tadashi Yamakawa, both of Yokohama, Japan

[73] Assignee: Canon Kabushiki Kaisha, Tokyo, Japan

[21] Appl. No.: 504,077

[22] Filed: Aug. 4, 1995

[30] Foreign Application Priority Data

Aug. 5, 1994 [JP] Japan .................... 6-184950
Aug. 24, 1994 [JP] Japan .................... 6-199456
Aug. 24, 1994 [JP] Japan .................... 6-199457

[51] Int. Cl.$^6$ .................................... G06F 7/02
[52] U.S. Cl. .................... 707/511; 707/201; 707/203; 707/8
[58] Field of Search .................... 395/762, 772, 395/774, 776, 617, 619, 620, 608, 610, 331, 332, 200.02, 200.03, 200.04; 707/501, 511, 513, 514, 201, 203, 204, 8; 345/331, 332

[56] References Cited

U.S. PATENT DOCUMENTS

| | | | |
|---|---|---|---|
| 5,008,853 | 4/1991 | Bly et al. | 395/331 |
| 5,339,392 | 8/1994 | Risberg et al. | 395/333 |
| 5,367,621 | 11/1994 | Cohen et al. | 395/762 |
| 5,396,587 | 3/1995 | Reed et al. | 395/764 |
| 5,490,270 | 2/1996 | Devarakonda et al. | 395/617 |
| 5,535,332 | 7/1996 | Ishida | 395/200.01 |
| 5,649,192 | 7/1997 | Stucky | 395/614 |

FOREIGN PATENT DOCUMENTS

| | | |
|---|---|---|
| 0319232 | 6/1989 | European Pat. Off. |
| 0635794 | 1/1995 | European Pat. Off. |
| 9212488 | 7/1992 | WIPO |

OTHER PUBLICATIONS

IBM Tech. Discl. Bull., vol. 36, No. 8, Aug. 1993, pp. 77–82, "Change-Notification Service for Shared Files".
Pat. Abs. Jp., vol. 014, No. 534 (P-1135), Nov. 26, 1990 (JP-A-02-227748).

*Primary Examiner*—Anton Fetting
*Assistant Examiner*—Stephen Hong
*Attorney, Agent, or Firm*—Fitzpatrick, Cella, Harper & Scinto

[57] ABSTRACT

A document processing apparatus has memory space for holding a plurality of documents, each of the documents being provided with respective update time data, and additional memory space for storing respectively, for each of a plurality of users, reference time data for the plurality of documents. When one of the plurality of users causes the documents to be read, the reference time data for that user can be read out for comparing, for each of the plurality of documents, the respective update time data with the read reference time data to determine whether or not a user other than the one user has confirmed any of the plurality of documents after a previous updating of that document. In response to the determination, the apparatus displays the plurality of documents, with any confirmed documents being displayed distinguishably from the rest of the documents. In this way, the user can tell if any of the documents has been updated by another user after he himself last updated the document.

36 Claims, 66 Drawing Sheets

FIG. 2

```
<Title> ABC SONG </Title>
<Paragraph ID = 1> ABCD
<List><Item>
<ItemHead> EFG </ItemHead>
<ItemParagraph> HIJKLMN
</ItemParagraph>
</Item>
</List>
OPQR <Emphasize> ST </Emphasize>
</Paragraph>
...
```

FIG. 7

```
<Document UpdateTime = "24. Jan. 1994_17:30">
<Title> ABC SONG </Title>
<Paragraph> ABCD
<List><Item>
<ItemHead> EFG </ItemHead>
<ItemParagraph> HIJKLMN
</ItemParagraph>
</Item>
</List>
OPQR <Emphasize> ST </Emphasize>
</Paragraph>
...
```

FIG. 8

|  | DOCUMENT 1 | DOCUMENT 2 | ... |
|---|---|---|---|
| USER 1 | 1994. 01. 24<br>17 : 30 | 1994. 11. 23<br>21 : 12 |  |
| USER 2 | 1994. 01. 15<br>08 : 42 | 1994. 01. 26<br>12 : 57 |  |
|  |  |  |  |

FIG. 16

```
<Document date = "93.10.25" time = "17:25">
<Title date = "93.10.25" time = "17:25">
 ABC SONG
</Title>
<Paragraph date = "93.10.24" time = "09:25">
 ABCD
<List date = "93.10.25" time = "17:15">
<Item date = "93.10.25" time = "17:15">
<ItemHead date = "93.10.25" time = "12:13">
 EFG
</ItemHead>
<ItemParagraph date = "93.10.25" time = "17:15">
 HIJKLMN
<ItemParagraph>
<Item>
<List>
 OPQR
<Emphasize date = "94.01.24" time = "17:30"> ST </Emphasize>
</Paragraph>
 ...
```

FIG. 19

```
<Document UpdateTime = "24.Jan.1994_17:30">
<Title> ABC SONG </Title>
 & file1;  ～205
<Paragraph> ABCD
<List><Item>
<ItemHead> EFG </ItemHead>
<ItemParagraph> HIJKLMN </ItemParagraph>
</Item></List>
 OPQR <Emphasize> ST </Emphasize>
</Paragraph>
...
[/DIR/file1.sgml]
<Paragraph UpdateTime = "23.Jan.1994_12:42"> "AB"C"DE"FG
<List><Item>
<ItemParagraph> "H"IJKL </ItemParagraph>
</Item></List></Paragraph>
...
```

FIG. 21

```
⎧ <Document date = "93.10.25" time = "17:25">
⎪ <Title date = "93.10.25" time = "17:25"> ABC SONG </Title>
⎪   & file1; ←―205
⎪ <Paragraph date = "93.10.24" time = "09:25"> ABCD
⎪ <List date = "93.10.25" time = "17:15">
⎪ <Item date = "93.10.25" time = "17:15">
⎨ <ItemHead date = "93.10.25" time = "12:13"> EFG
⎪ </ItemHead>
⎪ <ItemParagraph date = "93.10.25" time = "17:15"> HIJKLMN
⎪ </ItemParagraph></Item></List>
⎪   OPQR <Emphasize date = "94.01.24" time = "17:30"> ST </Emphasize>
⎪ </Paragraph>
⎪ ...
⎪ [/DIR/file1.sgml]
⎪ <Paragraph date = "94.01.23" time = "12:42">
⎪   "AB"C"DE"FG </Paragraph>
⎪ <Paragraph date = "94.01.23" time = "12:51">
⎩   "H"IJKL </Paragraph>
```

FIG. 23

```
<Document date = "93.10.25"  time = "17:25">
<Title date = "93.10.25"  time = "17:25"> ABC SONG </Title>
<Paragraph date = "93.10.24"  time = "12:41"> & file1; </Paragraph>
...
[/DIR/file1.sgml]
  ABCD
<List date = "93.10.25"  time = "17:15">
<Item date = "93.10.25"  time = "17:15">
<ItemHead date = "93.10.25"  time = "12:13"> EFG </ItemHead>
<ItemParagraph date = "93.10.25"  time = "17:15">
  HIJKLMN </ItemParagraph>
</Item></List>
  OPQR <Emphasize date = "94.01.24"  time = "17:30"> ST </Emphasize>
```

FIG. 25

|  | USER 1 | USER 2 | · · · |
|---|---|---|---|
| DOCUMENT 1 | × | × | · · · |
| DOCUMENT 2 | ○ | ○ | · · · |
| DOCUMENT 3 | × | × | · · · |
| DOCUMENT 4 | × | ○ | · · · |
| ⋮ | ⋮ | ⋮ | · · · |

FIG. 27

| USER 1 | USER 2 | · · · |
|---|---|---|
| DOCUMENT 1 | DOCUMENT 1 | · · · |
| DOCUMENT 2 | DOCUMENT 2 | · · · |
| DOCUMENT 3 | DOCUMENT 3 | · · · |
| DOCUMENT 4 | DOCUMENT 4 | · · · |
| ⋮ | ⋮ | |

FIG. 30

| USER 1 | USER 2 | USER 4 | ... |
|---|---|---|---|
| DOCUMENT 1 | DOCUMENT 1 | DOCUMENT 2 | ... |
| DOCUMENT 3 | DOCUMENT 3 | DOCUMENT 4 | ... |
| DOCUMENT 4 | | | ... |
| ... | ... | ... | |

FIG. 32

| USER 1 | USER 3 | USER 4 | ... |
|---|---|---|---|
| DOCUMENT 1 | DOCUMENT 1 | DOCUMENT 1 | ... |
| DOCUMENT 2 | DOCUMENT 2 | DOCUMENT 4 | ... |
| DOCUMENT 4 | DOCUMENT 6 | | ... |
| ... | ... | | |

FIG. 34

```
<Document ST = "4.Apl.1994_14:30" FT = "4.Apl.1994_15:45">
<Title ST = "4.Apl.1994_15:30" FT = "4.Apl.1994_15:30"> ABC SONG </Title>
<Paragraph ST = "4.Apl.1994_15:50" FT = "4.Apl.1994_16:00"> ABCD
EFGHIJ
<Emphasize ST = "4.Apl.1994_15:55" FT = "4.Apl.1994_16:00"> KL
</Emphasize>
MN
...
</Paragraph>
</Document>
```

| | |
|---|---|
| USER 1 | 1994.01.24 17 : 30 |
| USER 2 | 1994.01.15 08 : 42 |
| ⋮ | ⋮ |

FIG. 39

|  | | PARENT ELEMENT OF TARGET ELEMENT | | TARGET ELEMENT | | ALL ST, FT IN TARGET ELEMENT |
|---|---|---|---|---|---|---|
|  | | ST | FT | ST | FT | |
| ELEMENT | INSERT | nop | update | update | update | update |
| ELEMENT | DELETE | nop | update | | | |
| CHARACTER | INSERT | nop | update | | | |
| CHARACTER | DELETE | nop | update | | | |

FIG. 43

| UPDATE TIME OF THE ELEMENTS IN THE CONTENTS / UPDATE TIME OF THE CONTENTS | | NEW | OLD |
|---|---|---|---|
| NEW | NEW CONTENTS | This content is new.<br><new-elem><br>new-content<br></new-elem><br>end of the content.<br>(1) | This content is new.<br><old-elem><br>new-content<br></old-elem><br>end of the content.<br>(2) |
| NEW | OLD CONTENTS | ✕ | This content is new.<br><old-elem><br>old-content<br></old-elem><br>end of the content.<br>(3) |
| OLD | NEW CONTENTS | ✕ | This content is old.<br>< old-elem ><br>new-content<br></old-elem ><br>end of the content.<br>(4) |
| OLD | OLD CONTENTS | ✕ | This content is old.<br><old-elem><br>old-content<br></old-elem><br>end of the content.<br>(5) |

FIG. 44

| | PARENT ELEMENT OF TARGET ELEMENT | | TARGET ELEMENT | | ALL ST, FT IN TARGET ELEMENT |
|---|---|---|---|---|---|
| | ST | FT | ST | FT | |
| ELEMENT INSERT | nop | update | update | nop | nop |
| ELEMENT DELETE | nop | update | | | |
| CHARACTER INSERT | nop | update | | | |
| CHARACTER DELETE | nop | update | | | |

FIG. 45

| UPDATE TIME OF THE ELEMENTS IN THE CONTENTS / UPDATE TIME OF THE CONTENTS | | NEW | OLD |
|---|---|---|---|
| NEW | NEW CONTENTS | This content is new.<br><new-elem><br>new-content<br></new-elem><br>end of the content.<br>(1) | This content is new.<br>< old-elem ><br>new-content<br></old-elem ><br>end of the content.<br>(2) |
| NEW | OLD CONTENTS | This content is new.<br><new-elem><br>old-content<br></new-elem><br>end of the content.<br>(3) | This content is new.<br>< old-elem ><br>old-content<br></old-elem ><br>end of the content.<br>(4) |
| OLD | NEW CONTENTS | ✕ | This content is old.<br>< old-elem ><br>new-content<br></old-elem ><br>end of the content.<br>(5) |
| OLD | OLD CONTENTS | ✕ | This content is old.<br>< old-elem ><br>old-content<br></old-elem ><br>end of the content.<br>(6) |

FIG. 47

| UPDATE TIME OF THE ELEMENTS IN THE CONTENTS / UPDATE TIME OF THE CONTENTS | | NEW | OLD |
|---|---|---|---|
| NEW | NEW CONTENTS | This content is new.<br><new-elem><br>new-content<br></new-elem><br>end of the content.<br>(1) | This content is new.<br><old-elem><br>new-content<br></old-elem><br>end of the content.<br>(2) |
| NEW | OLD CONTENTS | This content is new.<br><new-elem><br>old-content<br></new-elem><br>end of the content.<br>(3) | This content is new.<br><old-elem><br>old-content<br></old-elem><br>end of the content.<br>(4) |
| OLD | NEW CONTENTS | ✕ | This content is old.<br><old-elem><br>new-content<br></old-elem><br>end of the content.<br>(5) |
| OLD | OLD CONTENTS | ✕ | This content is old.<br><old-elem><br>old-content<br></old-elem><br>end of the content.<br>(6) |

FIG. 49

| | | PARENT ELEMENT OF TARGET ELEMENT | | TARGET ELEMENT | | ALL ST, FT IN TARGET ELEMENT |
|---|---|---|---|---|---|---|
| | | ST | FT | ST | FT | |
| ELEMENT | INSERT | nop | nop | update | nop | nop |
| ELEMENT | DELETE | nop | update | | | |
| CHARACTER | INSERT | nop | update | | | |
| CHARACTER | DELETE | nop | update | | | |

FIG. 51

| | | PARENT ELEMENT OF TARGET ELEMENT | | TARGET ELEMENT | | ALL ST, FT IN TARGET ELEMENT |
|---|---|---|---|---|---|---|
| | | ST | FT | ST | FT | |
| ELEMENT | INSERT | nop | nop | update | nop | nop |
| | DELETE | nop | update | update | nop | nop |
| | COPY | nop | nop | update | update | update |
| CHARACTER | INSERT | nop | update | | | |
| | DELETE | nop | update | | | |

FIG. 52

| UPDATE TIME OF THE ELEMENTS IN THE CONTENTS / UPDATE TIME OF THE CONTENTS | | NEW | OLD |
|---|---|---|---|
| NEW | NEW CONTENTS | This content is new.<br><new-elem><br>new-content<br></new-elem><br>end of the content.<br>(1) | This content is new.<br><old-elem><br>new-content<br></old-elem><br>end of the content.<br>(2) |
| NEW | OLD CONTENTS | This content is new.<br><new-elem><br>old-content<br></new-elem><br>end of the content.<br>(3) | This content is new.<br><old-elem><br>old-content<br></old-elem><br>end of the content.<br>(4) |
| OLD | NEW CONTENTS | This content is old.<br><new-elem><br>new-content<br></new-elem><br>end of the content.<br>(5) | This content is old.<br><old-elem><br>new-content<br></old-elem><br>end of the content.<br>(6) |
| OLD | OLD CONTENTS | This content is old.<br><new-elem><br>old-content<br></new-elem><br>end of the content.<br>(7) | This content is old.<br><old-elem><br>old-content<br></old-elem><br>end of the content.<br>(8) |

FIG. 54
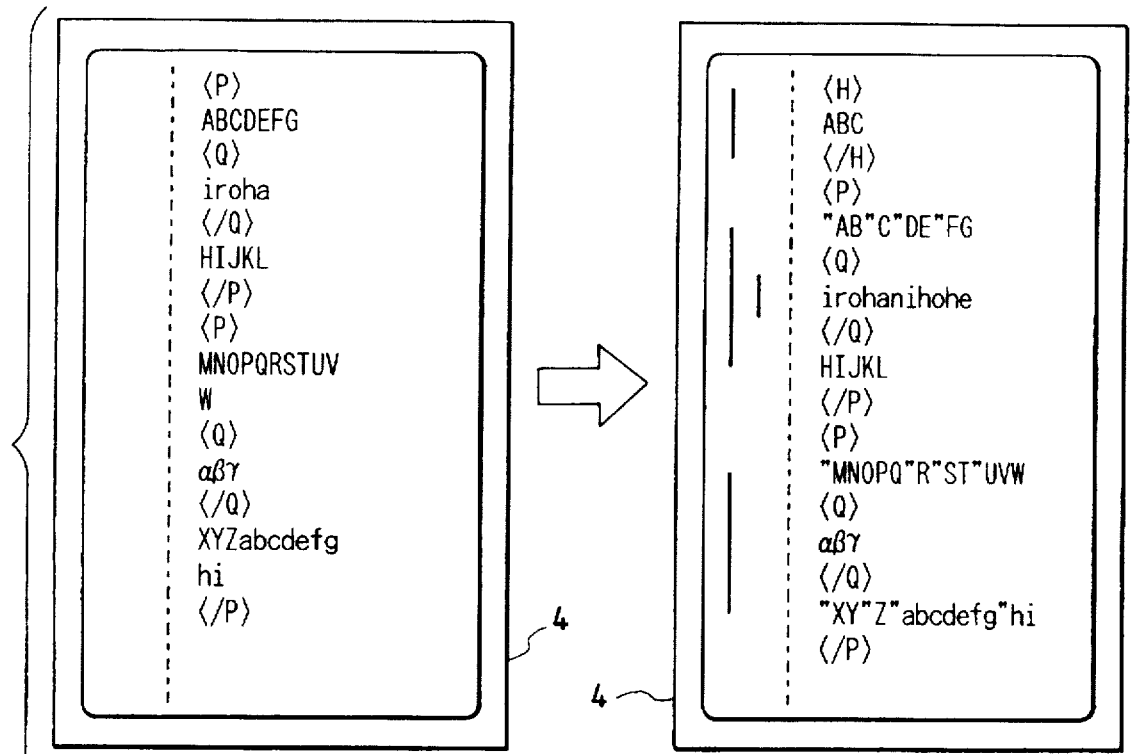
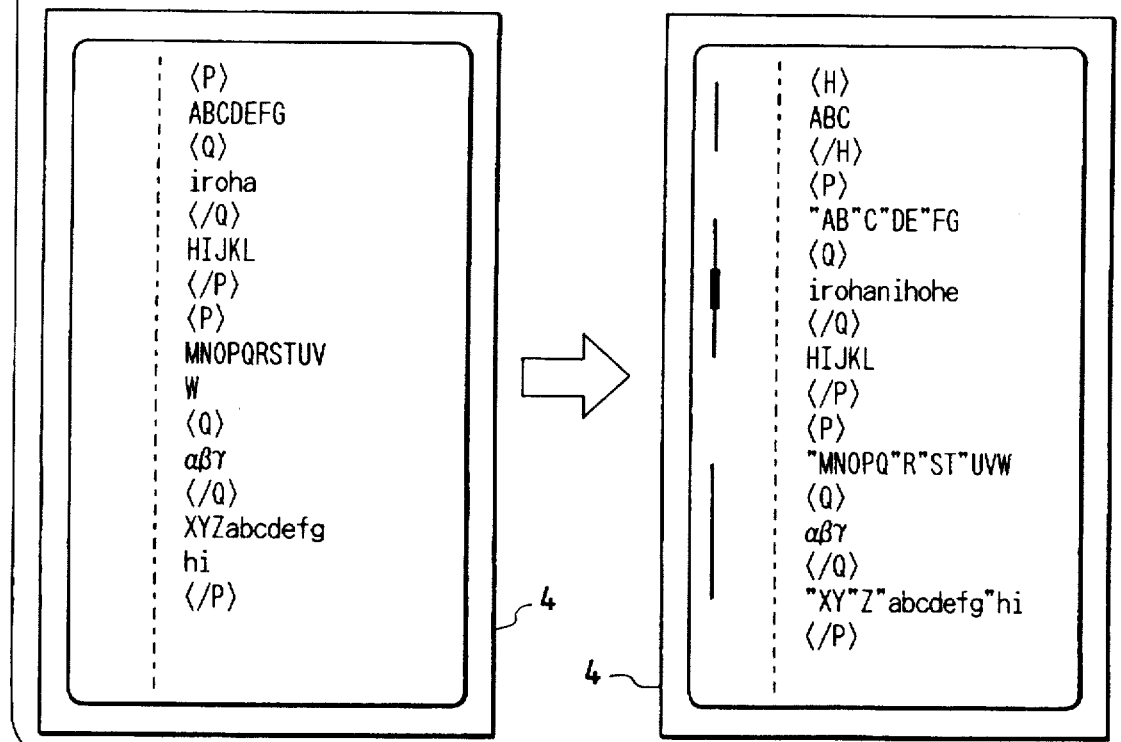

FIG. 55

| UPDATE TIME OF THE ELEMENTS IN THE CONTENTS / UPDATE TIME OF THE CONTENTS | | NEW | OLD |
|---|---|---|---|
| NEW | NEW CONTENTS | This content is new.<br><new-elem><br>new-content<br></new-elem><br>end of the content. | This content is new.<br><old-elem><br>new-content<br></old-elem><br>end of the content. |
| | OLD CONTENTS | This content is new.<br><new-elem><br>old-content<br></new-elem><br>end of the content. | This content is new.<br><old-elem><br>old-content<br></old-elem><br>end of the content. |
| OLD | NEW CONTENTS | This content is old.<br><new-elem><br>new-content<br></new-elem><br>end of the content. | This content is old.<br><old-elem><br>new-content<br></old-elem><br>end of the content. |
| | OLD CONTENTS | This content is old.<br><new-elem><br>old-content<br></new-elem><br>end of the content. | This content is old.<br><old-elem><br>old-content<br></old-elem><br>end of the content. |

```
<Document Time = "4.Apl.1994_14:30">
<Title Time = "4.Apl.1994_15:30"> ABC SONG </Title>
<Paragraph Time = "4.Apl.1994_15:50"> ABCD
 EFGHIJ
<Emphasize Time = "4.Apl.1994_15:55"> KL </Emphasize>
 MN
 ...
</Paragraph>
</Document>
```

```
<new-elem>
This is new.
<new-elem2>
NEW
</new-elem2>
This is the content of new-elem.
</new-elem>
<old-elem>
This is cofirmed.
<new-elem3>
not confirmed
</new-elem3>
This is the content of old-elem.
</old-elem>
```

USER 1

| | |
|---|---|
| 3. Apl. 1994_12:00 | |
| 4. Apl. 1994_08:10 | 4. Apl. 1994_14:30 |
| 4. Apl. 1994_15:30 | 4. Apl. 1994_15:55 |
| 4. Apl. 1994_22:13 | |
| ⋮ | ⋮ |

USER 2

| | |
|---|---|
| 3. Apl. 1994_12:00 | |
| 4. Apl. 1994_08:10 | |
| 4. Apl. 1994_10:25 | 4. Apl. 1994_15:50 |
| 4. Apl. 1994_23:13 | |
| ⋮ | ⋮ |

FIG. 71

| UPDATE TIME | CHECK |
|---|---|
| 3. Apl. 1994_12:00 | |
| 3. Apl. 1994_22:30 | |
| 4. Apl. 1994_08:10 | |
| 4. Apl. 1994_14:30 | |
| 4. Apl. 1994_15:30 | |
| 4. Apl. 1994_15:55 | |

FIG. 72

```
<Document ID = 1   Time = "4.Apl.1994_14:30">
<Title ID = 2   Time = "4.Apl.1994_15:30"> ABC SONG </Title>
<Paragraph ID = 3   Time = "4.Apl.1994_15:50"> ABCD
 EFGHIJ
<Emphasize ID = 5   Time = "4.Apl.1994_15:55"> KL </Emphasize>
 MN
 ...
</Paragraph>
</Document>
```

DOCUMENT PROCESSING APPARATUS THAT DETERMINES WHETHER A DOCUMENT HAS BEEN CONFIRMED BY ANOTHER USER

BACKGROUND OF THE INVENTION

1. Field of the Invention

The present invention relates to a document processing method by which a plurality of users can handle an electronic document in common, and to an apparatus for document processing.

2. Related Background Art

Document data, which is a data group that can be expressed as a document, can be described as structured document data that is provided by, for example, SGML (ISO8879) as is shown in FIG. 2. By the individual structure unit, the structured document data can be stored by using a conventional file directory structure, for example. FIG. 3 is a diagram showing an example of the document structure. The structured data group thus stored is information that can be recognized as a document by a human being. To identify the contents of the document, means, such as "display", "printing", or "hearing", is employed. In addition, another conventional technique, such as linking, is employed to use in common data from another document data. Suppose that structured data groups that are assembled together provide a format for a document and compose the information for one document. The document data can be displayed as a document, as is shown in FIG. 5, for example, by employing a conventional hypertext system. To handle a plurality of documents, a document editor or the like has been employed for editing them. Conventionally, in order to determine whether or not the document that was referred to or recognized has been subsequently altered, the date that the document was referred to previously must be remembered, and must be compared with the current date on which the document has been updated to determine whether or not the updated date is more recent than the previous date on which the document was referred to or was recognized. At this time, if the previous reference or recognition data is not stored or recorded, a person must inspect each document and must examine it to determine whether it has been altered. There is another method whereby a document that was referred to or recognized previously, or an old version of the complete document, is always held in storage and is compared with a current document. This method, however, is less efficient as regards the memory capacity. On the other hand, like SCCS or RCS in the UNIX system, there is a system that stores only that information which is changed when a document that is in use is edited, so that, in this case, a user can identify prior information by comparing it with that in the current document. Since this system retains only that information which was changed, the problem concerning memory capacity can be resolved.

This system, however, employs a complete document as the target for processing, and a line as the unit for comparison, and does not perform processing on a structured document by the individual structure unit. Although a system that employs a structured document as a processing target handles a complete document as a processing target, it employs each structure as a unit for comparison, and stores only that information in the structure that is changed. In this system, as is shown in FIG. 6, a display attribute is changed in such a manner that black lines that are used to identify modifications are displayed nearby, so that such information as was changed in a document that was referred to previously, or in the old version of a document, can be represented by the individual structure unit. The display examples 7 in FIG. 6 identify portions where information has been changed in a document that was previously referred to, or in an old version of a document.

When such document data is used by a plurality of persons and the information contained in the document data is frequently updated, such document data, even that including having the same document data, is maintained by a plurality of persons, or a specific individual, and is updated as time elapses. In a case where the information contained in a document is updated, the document data that is currently being referred to by a user might have been updated by another user since the first user referred to that document data. It is therefore important for each user to know whether or not the data in the document has been updated since it was referred to by that user last time.

To overcome the above described shortcomings of the prior art, it is one object of the present invention to provide a document processing method by which a user can easily determine whether or not document data has been changed since he referred to the document data previously, and to provide an apparatus for such document processing.

It is another object of the present invention to provide a document processing method by which a user can easily identify document data that has been changed by another user, and to provide an apparatus for such document processing.

It is an additional object of the present invention to provide a document processing method by which it can be easily determined whether or not document data, including document data to which another information refers, that a user previously referred to has been updated by another user, and to provide an apparatus for such document processing.

It is a further object of the present invention to provide to a document processing method by which document data that has been updated by another user can be identified by sounding of an alarm, and to provide an apparatus for such document processing.

It is still another object of the present invention to provide a document processing method by which it can be determined whether or not any document data that a user updated previously has been updated by another user, and to provide an apparatus for such document processing.

When document data is used by a plurality of persons and the content of the information is very frequently changed, the document data, even that including the same document data, is maintained by a plurality of persons or a specific person and is updated as time elapses. A user who refers to a document however has a constant need to acquire the latest document data. The document data whose content is frequently updated is shared among and referred to by a plurality of users. When specific document data is employed in common by a plurality of users, and especially when the content of the information is frequently updated, a problem arises for a user who is referring to the document data in that while the document data has been updated he is not aware of it. Therefore, for each user there is a need to compare document data that was previously referred to with the latest, unknown data and to examine any changes. That is, although document data is used in common by a plurality of persons, the information that is required for reference purposes differs with each user. Thus, even when each user tries to obtain the latest information from a structured document having such a form, it is difficult for the user to identify which information in the document is already known and which is unknown.

In addition, when document data is used by a plurality of persons and the content of the information is very frequently changed, the document data, even that including the same document data, is maintained by a plurality of persons, or a specific individual, and is updated as time elapses. A user who refers to a document however has a need to constantly acquire the latest document data. Document data whose content is frequently updated is shared among and referred to by a plurality of users. When specific document data is employed in common by a plurality of users, and especially when the content of the information is frequently updated, a problem arises for a user who is referring to document data in that while the document data has been updated he is not aware of it, and an unconfirmed output is produced. Therefore, for each user there is a need to identify unconfirmed data in a document that is used in common and that has been updated since the user last confirmed the data. That is, while document data is utilized in common by a plurality of users, data that users desire to confirm when they refer to the data differs for each user. Therefore, even when a user tries to obtain the latest information from a structured document having such a format, it is difficult for that user to identify which information in the document has been confirmed and which is as yet unconfirmed. In addition, each time the document is referred to, there is no guarantee that all the changed portions can be confirmed, and whether or not an unconfirmed portion has been identified as being unconfirmed. In other words, even if an unconfirmed portion is displayed, it does not mean that the unconfirmed portion is so identified.

SUMMARY OF THE INVENTION

According to one embodiment of the present invention, it is one object to provide a document processing apparatus comprising:

holding means for holding a plurality of sets of document data and update time data;

storage means for storing reference time data, for each user, of the document data held by the holding means;

reading means for reading the document data held by the holding means; and control means for reading, from the storage means, the update time data, which is added to the document data that is read by the reading means, and the reference time data for each user that corresponds to the document data, for comparing the update time data with the reference time data in order to determine whether or not the document data is updated, and for so displaying the document data that is determined to be updated as to render the document data identifiable.

Further, according to the embodiment of the present invention, it is another object to provide a document processing method, by which desired document data is read, from a document file wherein a plurality of sets of document data are stored, and is processed, comprising the steps of:

storing reference time data for each user of the document data that is stored in the document file;

reading desired document data from the document file;

reading update time data, which is added to the document data that is read out, and the reference time data for each user that corresponds to the document data, and comparing the update time data with the reference time data; and displaying the document data that as a result of comparison is determined to be updated in such a way as to render the document data identifiable.

The other objects and features of the present invention will be obvious by referring to the following specification and accompanying drawings.

BRIEF DESCRIPTION OF THE DRAWINGS

FIG. 2 is a diagram showing one example of common structured document data;

FIG. 7 is a diagram showing one example of structured document data of the first embodiment of the present invention wherein update time data is included;

FIG. 8 is a diagram showing one example of user-by-user document reference time data according to the first embodiment of the present invention;

FIG. 16 is a diagram showing one example of structured document data that includes update time data according to a fourth embodiment of the present invention;

FIG. 19 is a diagram showing one example of structured document data that includes update time data according to a fifth embodiment of the present invention;

FIG. 21 is a diagram showing one example of structured document data that includes update time data according to a sixth embodiment of the present invention;

FIG. 23 is a diagram showing one example of structured document data that includes update time data according to a seventh embodiment of the present invention;

FIG. 25 is a diagram showing one display example of document titles according to an eighth embodiment of the present invention;

FIG. 27 is a diagram showing one display example of document titles according to a ninth embodiment of the present invention;

FIG. 30 is a diagram showing one display example of document titles according to an eleventh embodiment of the present invention;

FIG. 32 is a diagram showing one example of user names with corresponding document titles according to a modification of the present invention;

FIG. 34 is a diagram showing one example of structured document data that includes update time data according to the twelfth embodiment of the present invention;

FIG. 39 is a diagram showing one display example of attribute changes according to the twelfth embodiment of the present invention;

FIG. 43 is a diagram showing one document display example according to the twelfth embodiment of the present invention;

FIG. 44 is a diagram showing one example of attribute changes according to a fourteenth embodiment of the present invention;

FIG. 45 is a diagram showing one document display example according to a thirteenth embodiment of the present invention;

FIG. 47 is a diagram showing one document display example according to the fourteenth embodiment of the present invention;

FIG. 49 is a diagram showing one example of attribute changes according to the fifteenth embodiment of the present invention;

FIG. 51 is a diagram showing one example of attribute changes according to the sixteenth embodiment of the present invention;

FIG. 52 is a diagram showing one document display example according to the sixteenth embodiment of the present invention;

FIG. 54 is a diagram showing another display example of an altered portion according to the seventeenth embodiment of the present invention;

FIG. 55 is a diagram showing an additional display example of an altered portion according to the seventeenth embodiment of the present invention;

FIG. 71 is a diagram showing one example of a list of update times according to the twenty-first embodiment of the present invention;

FIG. 72 is a diagram showing one example of a document in which an ID and update time data are included according to the twenty-first embodiment of the present invention;

DESCRIPTION OF THE PREFERRED EMBODIMENTS

[First Embodiment]

The preferred embodiments of the present invention will now be described in detail while referring to the accompanying drawings.

Figure 1:
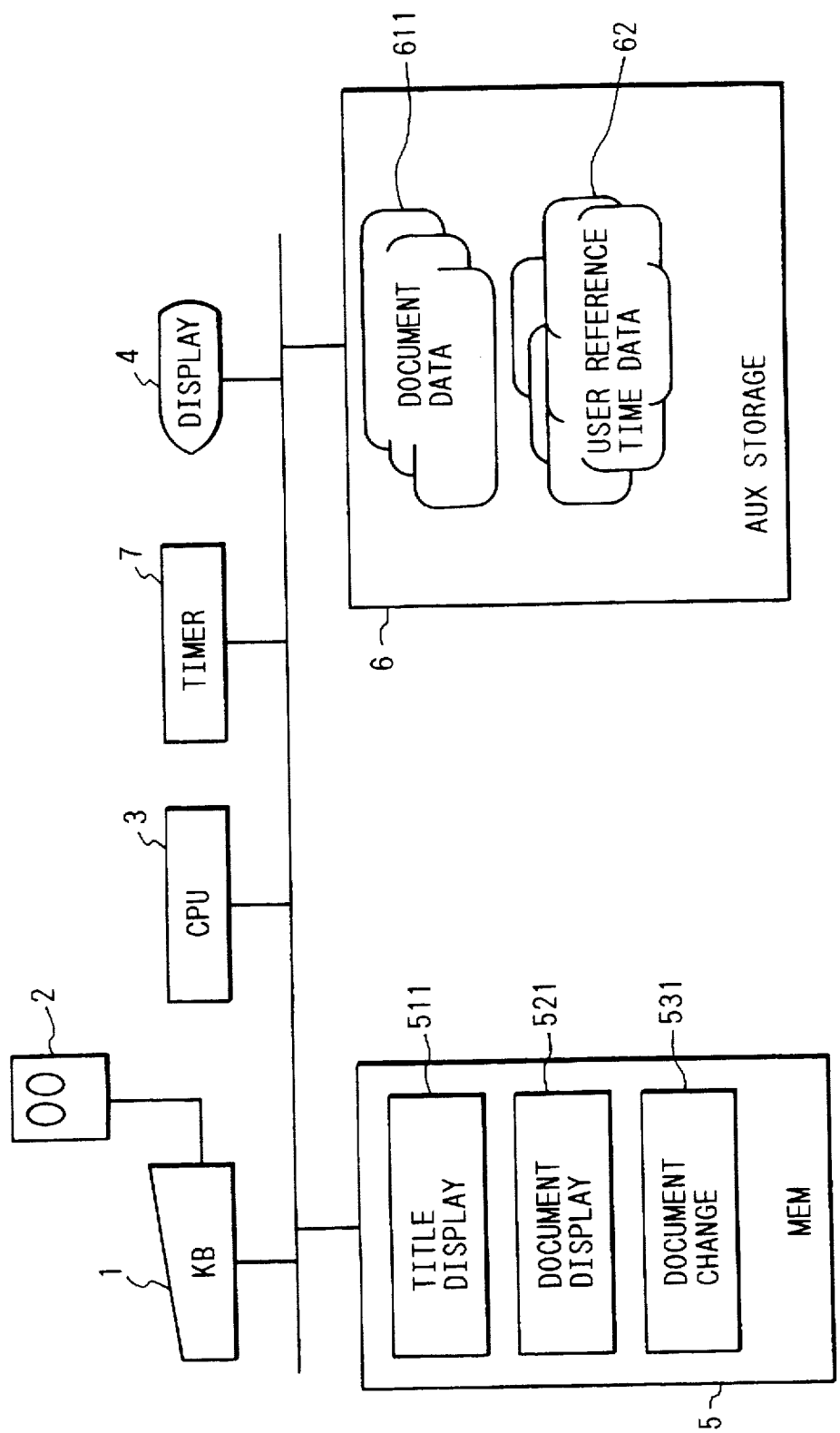
FIG. 1 is a block diagram illustrating the arrangement of a document processing apparatus according to a first embodiment of the present invention.
Figure 3:
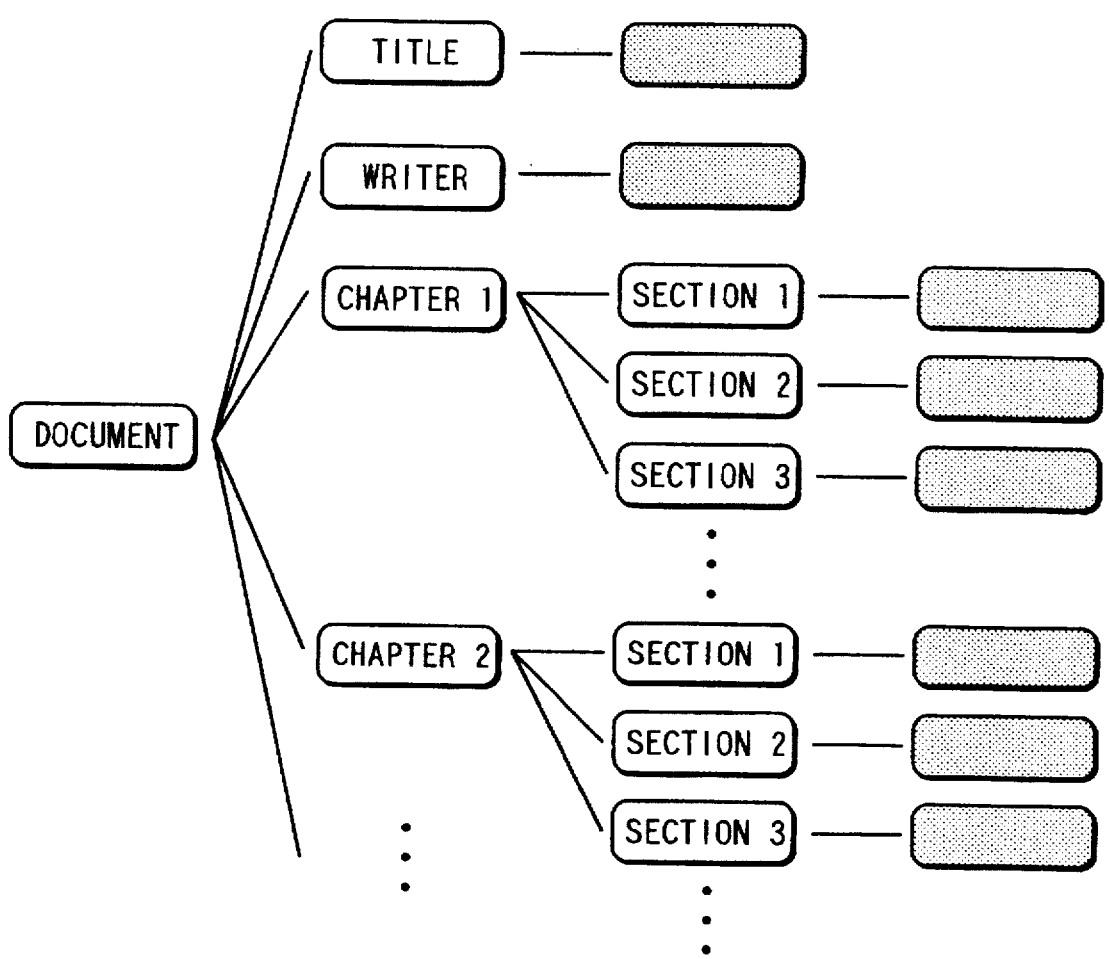
FIG. 3 is a diagram for explaining one example of conventional document data storage.
Figure 4:
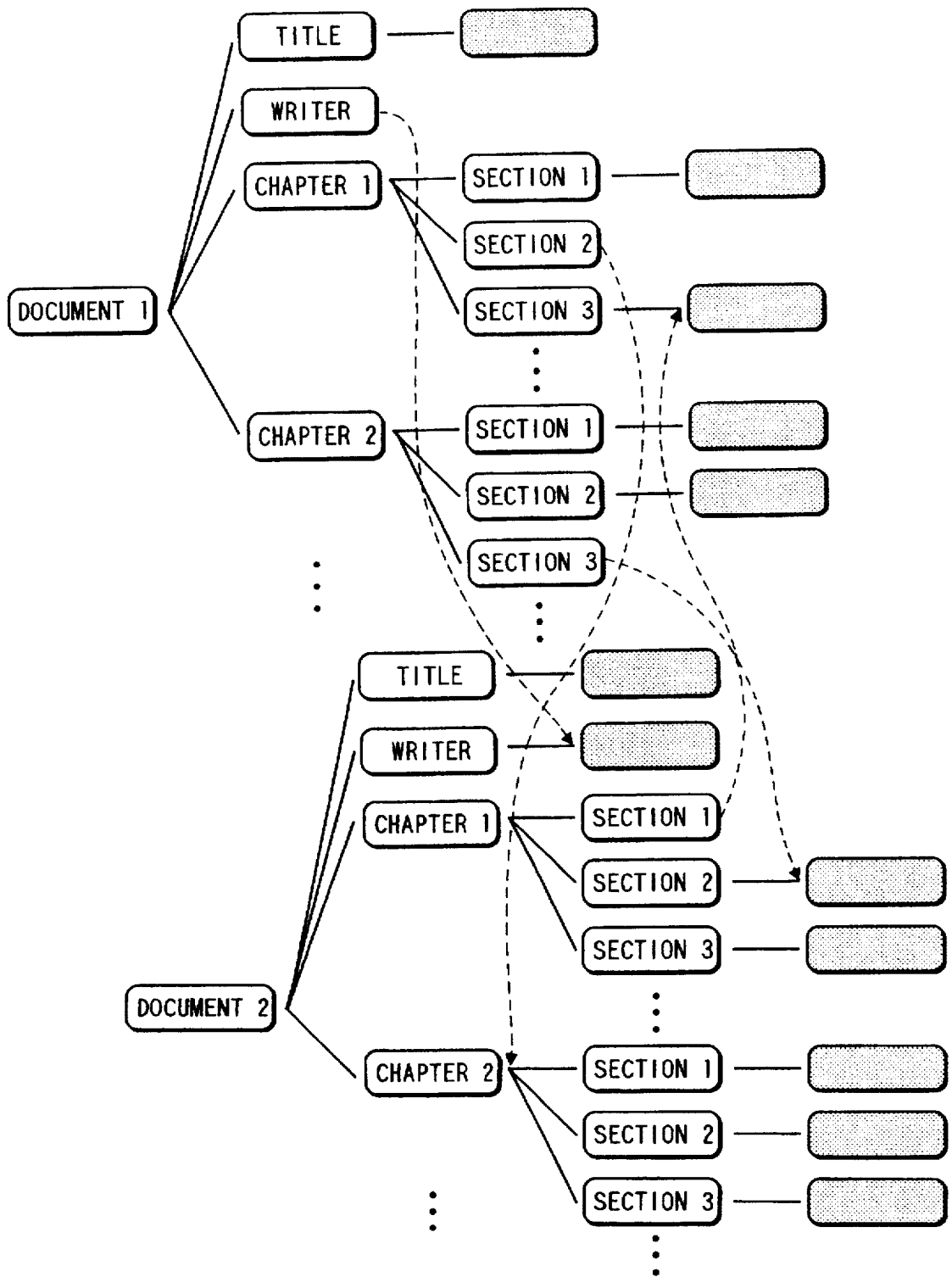
FIG. 4 is a diagram for explaining one example where a document is provided from conventional document data.
Figure 5:
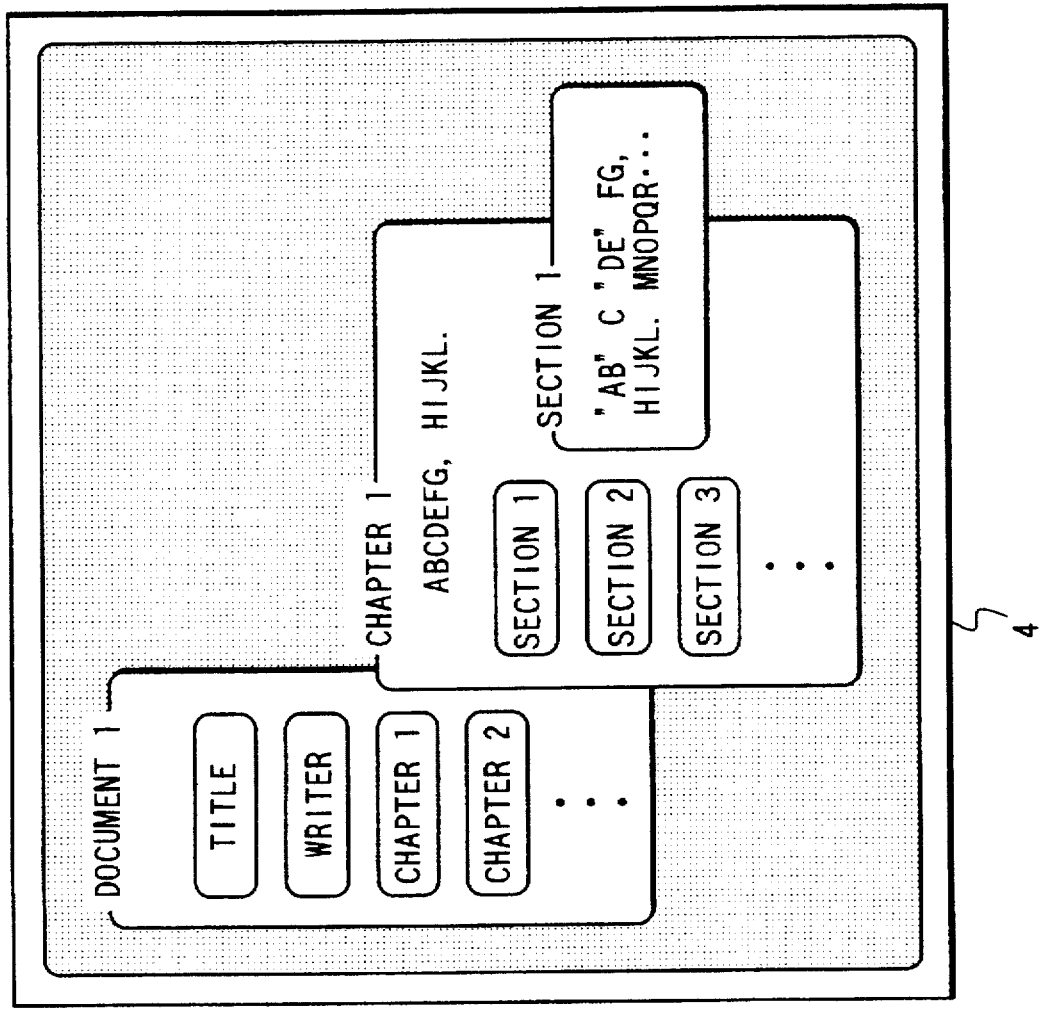
FIG. 5 is a diagram showing one example of a conventional document display.

FIG. 1 is a schematic block diagram illustrating the arrangement of a document processing apparatus according to the first embodiment of the present invention.

In FIG. 1, a keyboard (KB) 1 is manipulated by an operator to input document data and various commands. A pointing device 2, such as a mouse, is employed to move a cursor on the screen of a display 4, such as a CRT, for inputting desired commands and data. A CPU 3 that controls the entire apparatus performs a variety of control processing procedures by executing various programs that are stored in a memory 5, such as a RAM. The display 4 is a liquid crystal display or a CRT. The memory 5 is employed to hold programs and data for this embodiment, and by executing a control program that is stored therein the CPU 3 performs control. An auxiliary storage device 6 is nonvolatile memory that is employed to store programs and various data. The memory 5 and the auxiliary storage device 6 may be used together as a program/data storing memory, rather than being used separately. A timer 7 is employed to count a predetermined time upon the reception of an instruction from the CPU 3, and has a counting function for the current time and a calendar function. In the document processing apparatus in this embodiment, to read and store document data a password or an ID code must be input to specify a user.

As is shown in FIG. 1, a document title display program 511, a document display program 521 and a document change program 531 are stored in the memory 5. A document data group 611 and user-by-user document reference time data 62 are stored in the auxiliary storage device 6.

In this embodiment, document data is treated as structured document data that as one attribute has update time data <UpdateTime>, as is shown in FIG. 7, for example. In FIG. 7, the update time for this document is 5:30 PM, Jan. 24th, 1994. The user-by-user document reference time data 62 for each user includes for each document a reference time, in the form shown in FIG. 8, for example. In the example in FIG. 8, the reference times for documents 1 and 2 for each of the users 1 and 2 are stored. This information is hereafter called the user-by-user document reference time data. The update time data or the user-by-user document reference time data is updated according to time data that is output by the timer 7.

Figure 9:
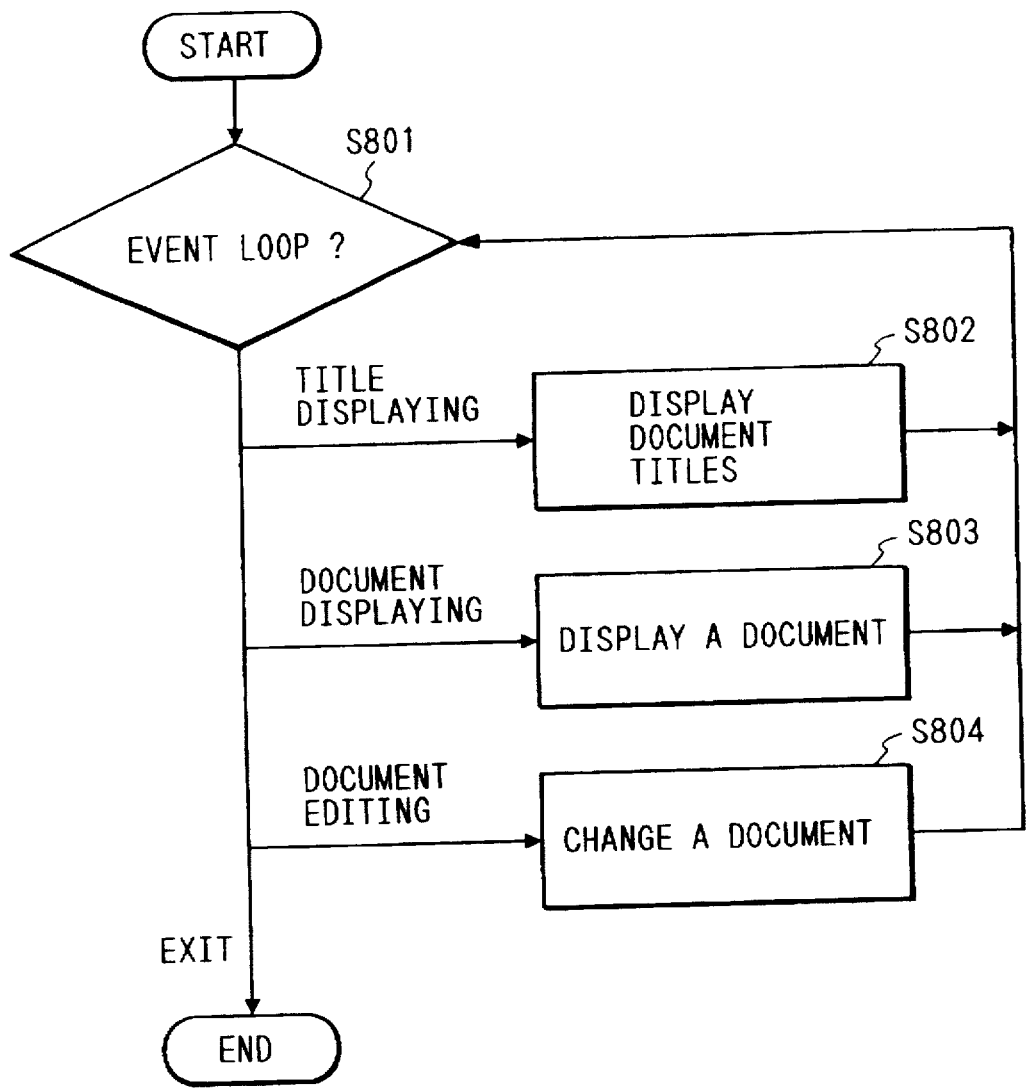
FIG. 9 is a flowchart showing processing for the document processing apparatus according to the first embodiment of the present invention.

FIG. 9 is a flowchart showing the processing that is performed by the document processing apparatus of this embodiment, and a control program according to which this processing is performed is stored in the memory 5.

When a document processing apparatus in this embodiment is activated by a user, first, in an event loop at step S801, the occurrence of an event is waited for. When the operation for displaying document titles is performed, program control moves to step S802, where is displayed a list of data, with which it is possible to specify document data, such as document titles, of document data that is changed after the user referred to it (see FIG. 10).

In an example shown in FIG. 10, an "X" indicates a document that was referred to by a specific user and is later updated by another user, and a "○" indicates a document that is not changed after it was referred to by a certain user.

The operation for displaying document titles at step S802 in FIG. 9, i.e., the processing of the document title display program 511, will now be described while referring to the flowchart in FIG. 11.

First, at step S1001, document titles are displayed in order. Then, program control moves to step S1002, at which point the user-by-user document reference time data 62 is compared with the update time attribute <UpdateTime> of the document data, and a check is performed to determine whether or not the document data has been updated. When the document data has been changed after the document reference time, program control moves to step S1004, where the corresponding document title is displayed followed by an "X", for example, as is shown in FIG. 10, to indicate that a need for confirmation exists.

Figures 10, 11:
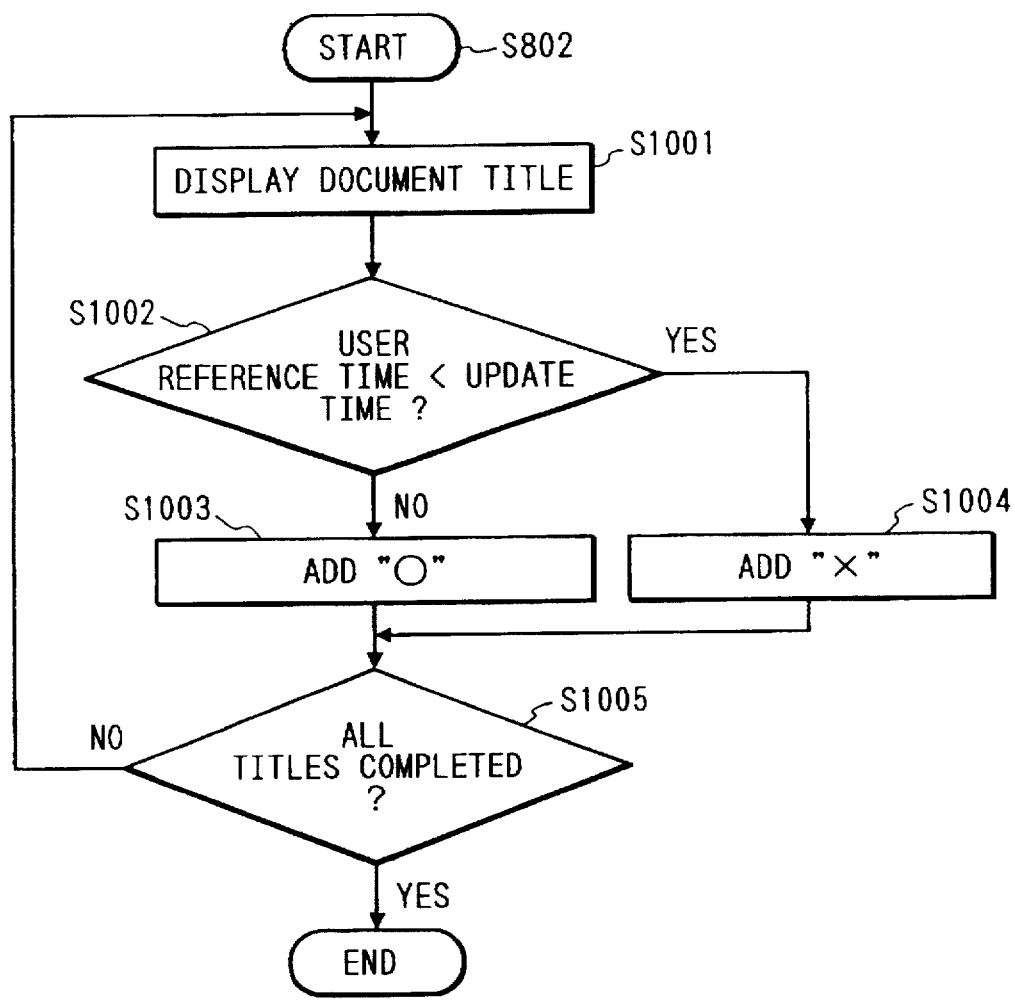
FIG. 10 is a diagram showing one display example of document titles according to the first embodiment of the present invention.
FIG. 11 is a flowchart showing processing for displaying a document title according to the first embodiment of the present invention.

When the document data is not changed, program control goes to step S1003, at which the corresponding document title is displayed followed by "○", for example, as is shown in FIG. 10. These procedures are repeated until all the document titles are displayed at step S1005.

When, at step S801, a document display operation is to be performed, program control goes go step S803, where a document that is specified by a document title is displayed on the display 4. The time at which the document data has been read is stored in the auxiliary storage device 6 and is employed as the user-by-user document reference time data of that document. The document display program 521 is performed in this manner.

If, at step S801, an editing operation is to be performed, program control moves to step S804, at which point a document that is specified by its document title being input is edited and updated through dialogue document data processing involving the use of a so-called document editor, for example. At this time, the attribute <UpdateTime> for the update time data of the changed document data is set to reflect the current time. The current time that is set is stored in the auxiliary storage device 6 and is employed as the user-by-user document reference time data 62 of the document. The document change program 531 is performed in this manner. When an event termination procedure is performed, the processing by the document processing apparatus of this embodiment is terminated.

Through the processing, the reference time of each document is constantly held for each user. By comparing the user-by-user document reference time data 62 with the update time attribute that is included in the document data, a user who specifies a document that since he last referred to it has been changed by another user can identify which document has been updated while that user is not aware of. In this embodiment, a user who refers to document data employs the update time for the document and determines whether or not that document has been changed by another user since last he referred to it. However, the document may be stored before it is updated, or the time relationship between the update time of the document and the reference time can be acquired by a counter and a comment.

Although in this embodiment the update time is included as an attribute of structured document data, when document data forms one file, for example, a time stamp for that file may be employed. Further, while event driven processing is performed in this embodiment, the event driven procedures may be replaced by independent programs that use document data in common. In this case, the event termination procedure is not required.

In addition, while the display program and the editing program are separated entities in this embodiment, a program that incorporates both the displaying and editing procedures may be employed as an editing program and a separate display program may be eliminated. Further, in this embodiment, the document data that has been updated and the document data that has not been updated are indicated respectively by "Updated" and "Non-updated". The title of only the document that is updated, or the title of only the document that is not updated may be displayed.

Moreover, according to the embodiment, it is possible for each user, for each document that is referred to, to identify document data that has been updated by another user. A user therefore can easily determines whether or not document data that he desires to see has been updated by another user.

[Embodiment 2]

Although in the first embodiment the document data that includes unknown data is represented as is shown in FIG. 10, for example, the present invention is of course not limited to this.

Figure 12:
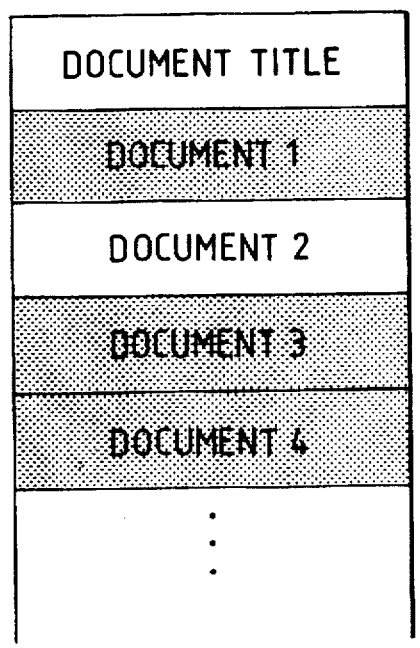
FIG. 12 is a diagram showing one display example of document titles according to a second embodiment of the present invention.
Figure 13:
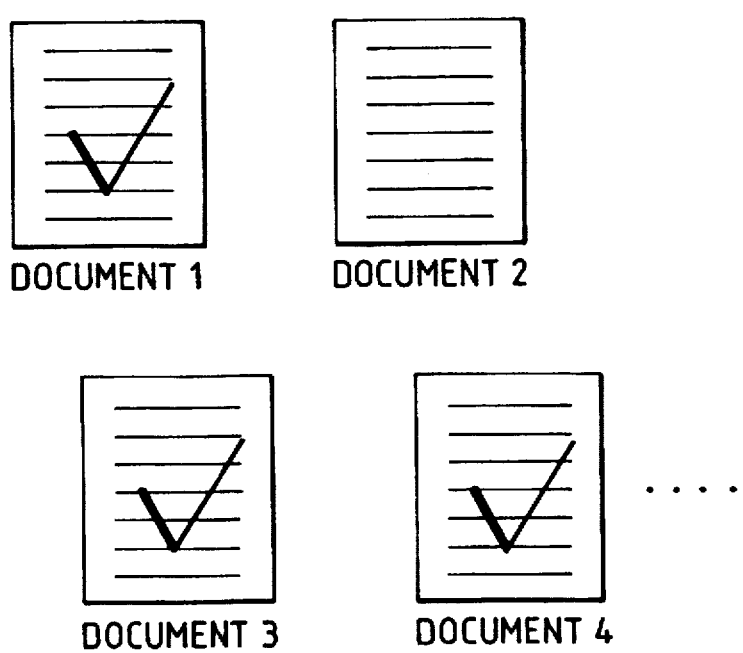
FIG. 13 is a diagram showing one display example of document titles according to the second embodiment of the present invention.

When, at step 802 in the flowchart for the first embodiment, i.e., in FIG. 9, the user-by-user document reference time data 62 is compared with the update time attribute <UpdateTime> of document data, and the document title for the document data that was changed after the document reference time is displayed, that document title may be displayed with a shaded background or may be inverted when it is displayed, as is shown in FIG. 12. Further, as is shown in FIG. 13, an icon for each document data may be so displayed that updated documents can be distinguished from the non-updated document. As is apparent from FIGS. 12 and 13, as well as in FIG. 10, document 2 is not updated.

Since the document data that was previously updated by a user and that has now been updated by another user, and thus includes unknown data, is displayed by changing its display attribute and its display form, the document data that includes the data that is unknown to the user can be identified in the document data group 611 where the known data and the unknown data are mixed together. Therefore, each user can easily obtain desired document data.

[Third Embodiment]

In the first and the second embodiments, the data for a document, which includes unknown data because after the document was updated by a specific user it was updated by another user, can be identified by being displayed in a distinctive manner. The present invention is not limited to this, and document data that includes unknown data may be identified by sounds.

Figure 14:
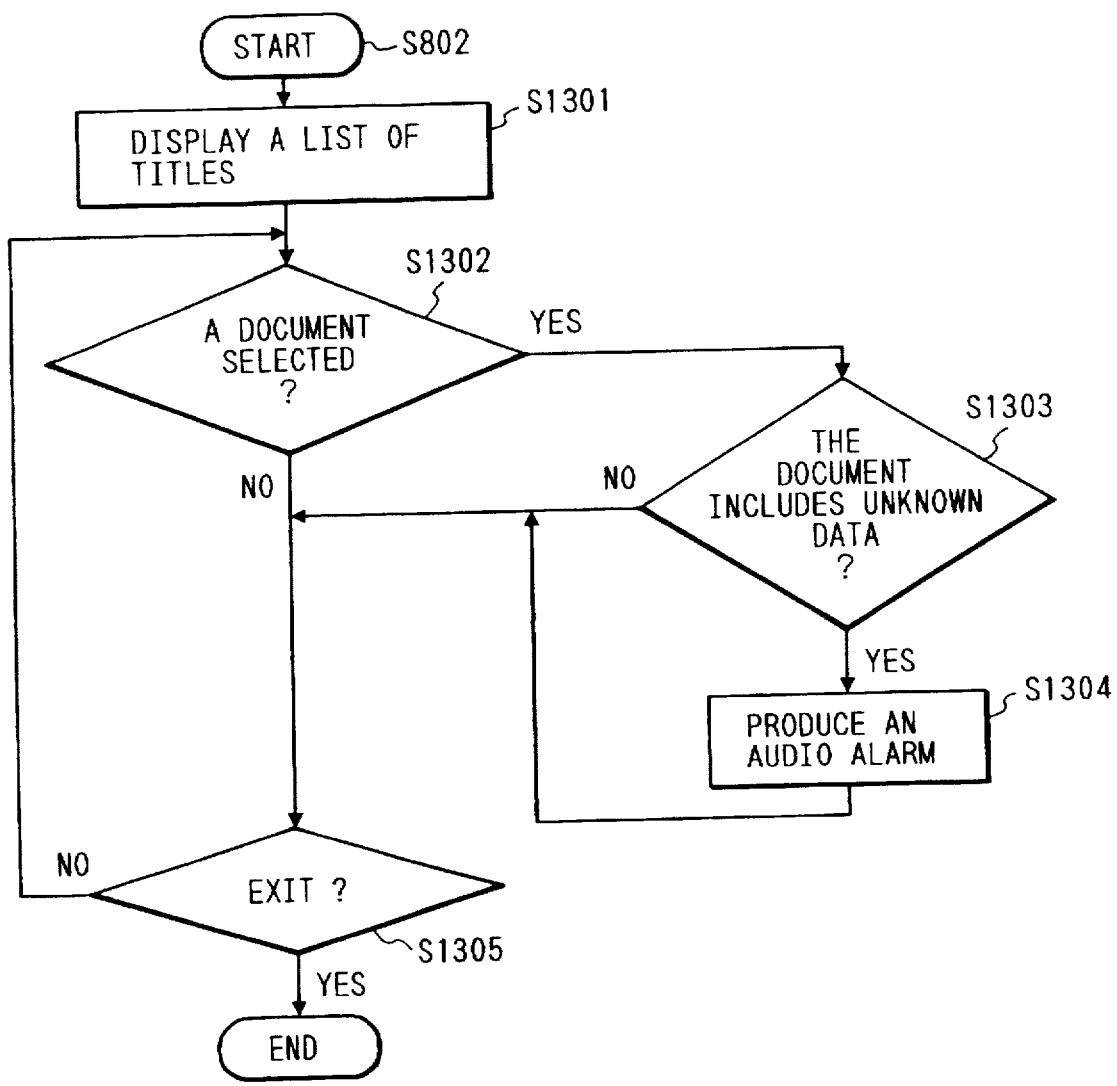
FIG. 14 is a flowchart showing processing for displaying a document title according to the third embodiment of the present invention.

The arrangement of a document processing apparatus in this case can be provided by adding, for example, an alarm generator that generates an audible alarm to the apparatus arrangement in FIG. 1, and by changing the document title display program 511 in FIG. 1 to a processing program that is performed as is depicted by the flowchart in FIG. 14.

In the flowchart for the entire system in this embodiment, the document title display processing in the flowchart for the first embodiment in FIG. 9 is replaced by another document title display processing. More specifically, when a user activates the apparatus, the occurrence of an event is waited for at the event loop as well as at step S801. When a display of document titles is instructed, the document title display process at step 802 is performed and all the document titles that are stored in the document data group 611 are displayed by the document title display process at step S802.

The details of the process at step S802 will now be explained while referring to the flowchart in FIG. 14.

Figure 15:
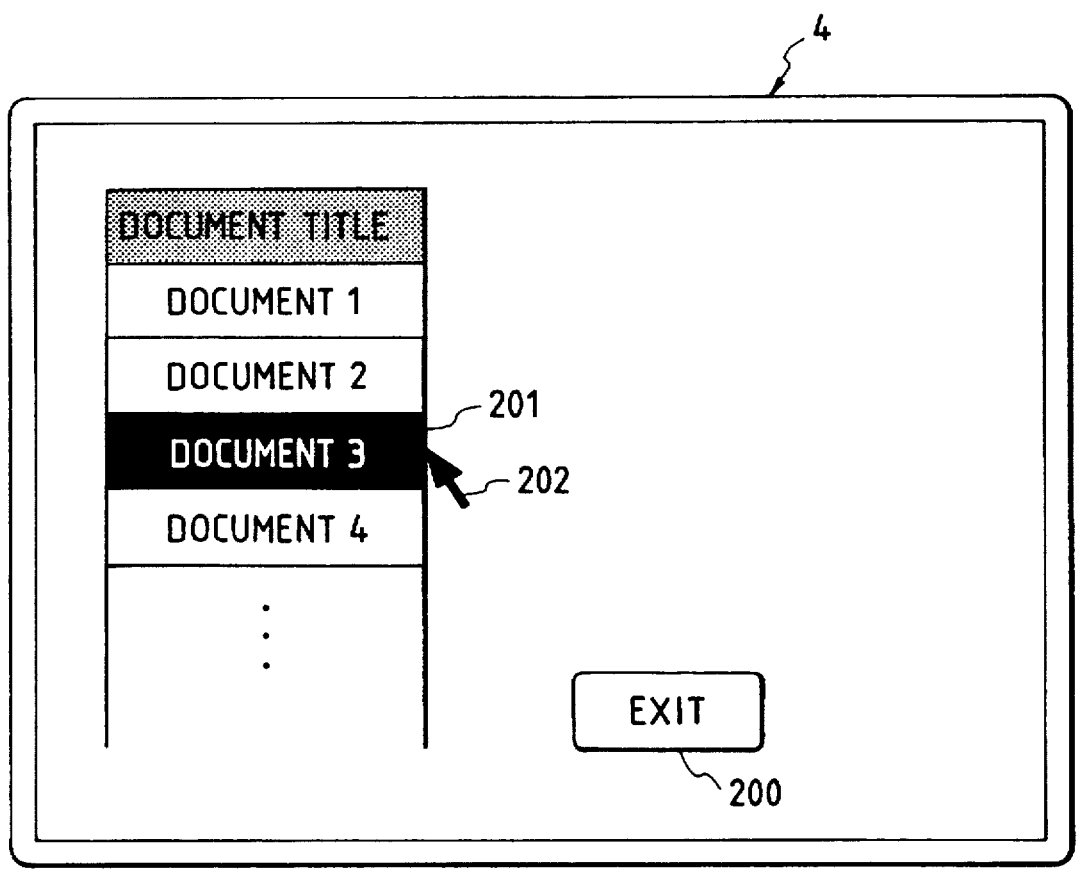
FIG. 15 is a diagram showing one display example of a list of document titles according to the third embodiment of the present invention.

First, at step S1301, a list of document titles that is stored in the document data group 611 is displayed on the screen of the display 4. One example of the display of document titles is shown in FIG. 15. In FIG. 15, reference number 201 denotes a list of documents and reference number 200 denotes a command area for instructing the termination of the document display. Program control advances to step S1302 to wait for a document that is selected by using the pointing device 2. When "document 3" is selected with a cursor 202 by using the pointing device 2, as is shown in FIG. 15, the user-by-user document reference time data 62 is compared with the update time attribute <UpdateTime> of document 3 to examine whether or not document 3, which was previously updated by the present user, has been updated by another user. When document 3 has been updated by another user and thus includes unknown data, program control goes to step S1304, where an audio alarm is sounded by the alarm generator in order to inform the user that unknown data is included in the document data (document 3) that was selected at step S1302.

When, at step S1305, the end command area 200 is pointed to with the cursor 202 and the pointing device 2 is clicked, the document title display process is terminated. In this case, the instructed document may be selected as target document data for a document display process and a document editing process by double clicking the button of the pointing device 2. Thereafter the document title display process may be terminated.

The document display process (which corresponds to that which is performed at step S803), the document editing process (which corresponds to that which is performed at step S804), and the termination process are the same as those in the first embodiment.

In this embodiment, an audio alarm signal is produced when document data that includes unknown data is selected, so that document data wherein known data and unknown data are mixed can be identified. Such an alarm need not be issued only by an audio signal, however, and any signaling means can be employed so long as it provides a sensation that can be clearly and distinctively perceived by one of the five human senses.

[Fourth Embodiment]

Although in the previously described embodiments, the update time data for a document is employed only for the entire document, the present invention is not limited to this. In the fourth embodiment, each time structured document data is altered, for each document element that is changed, that time at which the change is made is stored as an update time attribute. The details of this processing will now be described. The arrangement of an apparatus in this embodiment is also the same as the arrangement in FIG. 1, and merely the content of a corresponding program is changed.

FIG. 16 is a diagram showing one example of structured document data according to the fourth embodiment of the present invention. Each document element holds update time data as an attribute (date=, time=). The processing performed by the apparatus in this embodiment is shown in the flowchart in FIG. 9, as in the previous embodiments.

Figure 17:
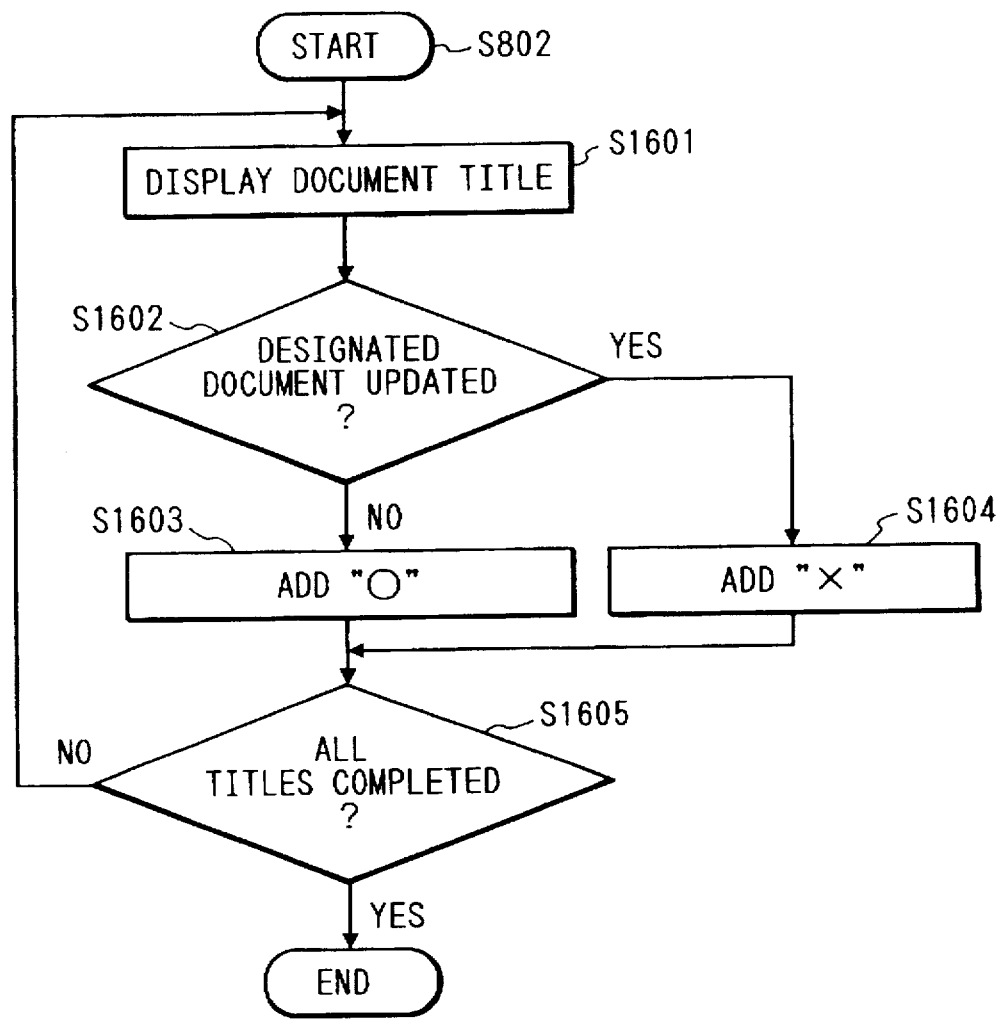
FIG. 17 is a flowchart showing processing for displaying a document title according to the fourth embodiment of the present invention.

FIG. 17 is a flowchart showing the document title display process at step S802 for the fourth embodiment.

When the editing of a document is instructed, the content of a document that is specified by a document title is updated in the same manner as in the previous embodiments. The update time attribute (date, time) of the updated document element is set to the current time. The current time is then stored, as the user-by-user document reference time data 62 for the updated document, in the auxiliary storage device 6.

When the display of document titles is instructed, as well as in the aforementioned embodiments, a list of document titles, for example, each of which specify the document data of a document that was referred to by a user and which thereafter was changed by another user, is displayed (S1601). Program control moves to step S1602, and a check is performed to determine whether or not the document pointed at by the cursor 202 was previously referred by a user and was then updated by another user. If the document has been updated by another user, at step S1604 an "X" is displayed for that document. If the document has not been updated, program control goes to step S1603, and a "o" is displayed in conjunction with the document title (see FIG. 10).

Figure 18:
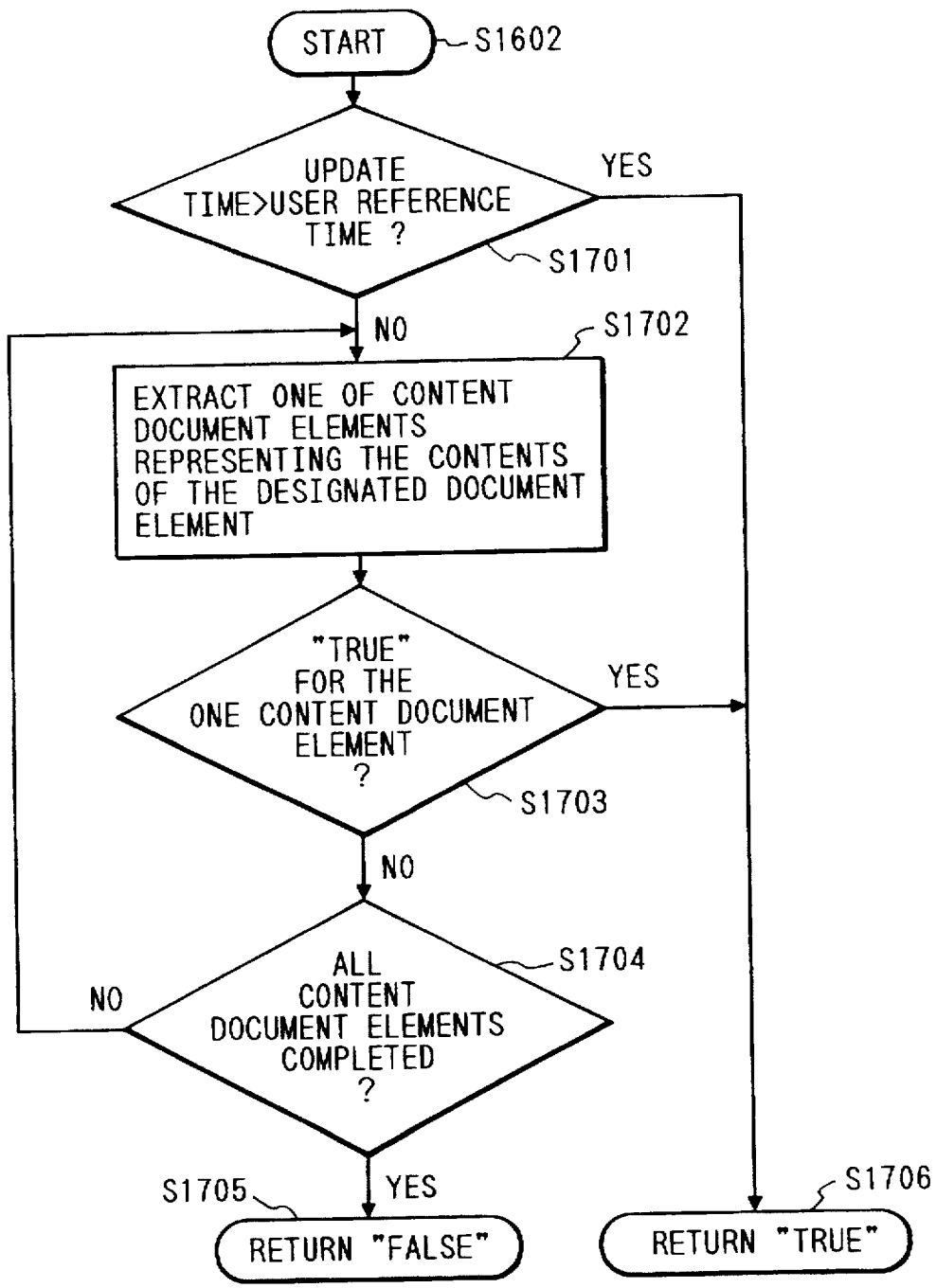
FIG. 18 is a flowchart showing processing for comparing updating according to the fourth embodiment of the present invention.

The process at step S1602 will now be explained while referring to the flowchart in FIG. 18.

Since the entire block of document data that is pointed at by the cursor 202 and so specified is also regarded as a single document element, at step S1701, the update time for the document element is compared with the user-by-user document reference time data 62. When the update time for the document element is later, it is assumed that the updating has been performed. At step S1706 a "true" is returned and thereafter the process is terminated.

When, at step S1701, there is no updating or when the time at which the document element was updated is the same as the user-by-user document reference time data, program control goes to step S1702, where the content document elements of the designated document element are extracted in order. At step S1703, the updating and comparing process for each document element is a "false", and at step S1704 the extraction process is terminated when all the contents of the designated document element have been extracted. When the extraction is completed, a "false" is returned at step S1705 and the processing is thereafter terminated. When the updating and comparing process returns a "true" during the operation, i.e., when the update time of the document element is later than the document reference time for each user, a "true" is returned at step S1706, and thereafter the processing is terminated.

When the updating and comparing process is terminated, program control returns to the flowchart in FIG. 17. Program control branches to step S1603 or S1604 depending on whether or not the process at step S1602 is "true" or "false", and an "X" or a "o", for example, is displayed for each document.

In this manner, the reference time for each document is constantly held for each user, and when a user compares the user-by-user document reference time data 62 with the update time attribute that corresponds to each document element, the user can specifically identify that document data in which are included document elements that have been updated by another user after the first user last referred to them.

Although, in this embodiment, each document element has an update time, the document data may include update time data as an attribute of the entire document by adding a time stamp, for example, to a file. In such a case, when the document is to be updated, the update time data for the entire block of document data that includes the updated document elements may be set to the current time. Thus, the same processing as in the first embodiment can be performed.

[Fifth Embodiment]

Document data is considered independent according to the aforementioned embodiments, but the status of the document data is not limited to this interpretation. In the fifth embodiment, the reference to other document data is permitted for structured document data, and the time of its alteration is included in the update time data for the entire block of document data. It is easy, therefore, to identify the document data that include unknown data even when they are included in document data that refer to other document data. The details of this processing will now be described. The arrangement of an apparatus that is employed for this embodiment is also substantially the same as in FIG. 1.

FIG. 19 is a diagram showing the arrangement of structured document data according to the fifth embodiment of the present invention.

In this embodiment, this data is treated as structured document data that has update time data <UpdateTime> as attribute data. Further, among the document data, a reference to document data, such as the "&file1;" that is denoted by 205, is permitted. The "&file1;" indicates a reference to another document data file that is defined as, for example, <!ENTITY file1 SYSTEM "/DIR/file1.sgml">. It should be noted that "file1" is document data that can be regarded as one document element.

Figure 20:
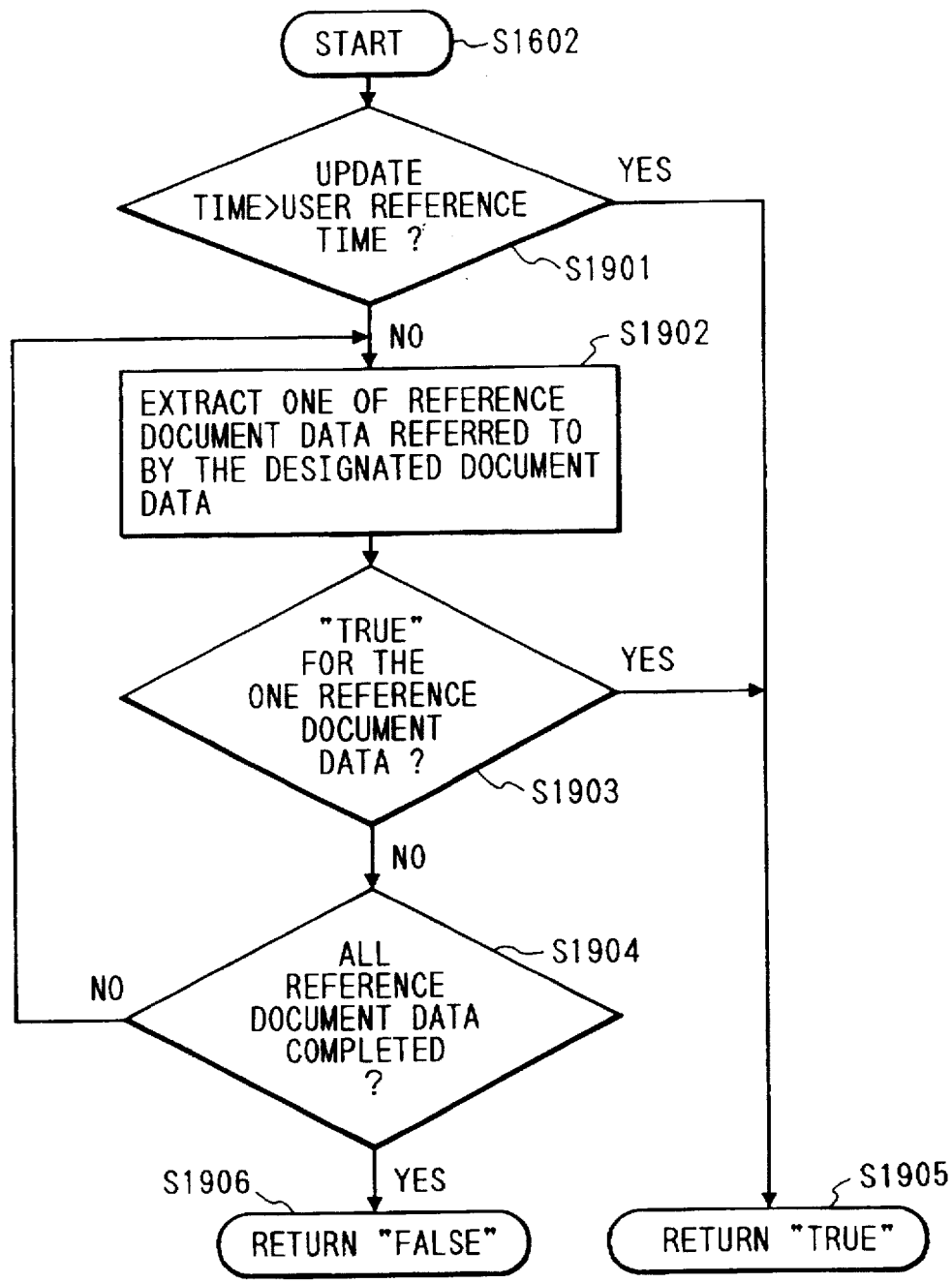
FIG. 20 is a flowchart showing processing for comparing the updating according to the fifth embodiment of the present invention.

The processing for this embodiment will be performed according to the flowchart shown in FIG. 17, as in the fourth embodiment. The process in the fifth embodiment that corresponds to that at step S1602 will be explained while referring to the flowchart in FIG. 20.

First, at step S1901, the update time for the document data that is designated by using the cursor 202 is compared with the user-by-user document reference time data. When the update time of the document is later, it is assumed that updating has been performed. Program control then moves to step S1905, where a "true" is returned, and thereafter the process is terminated. When there has been no updating, program control goes to step S1902, where the reference document data that is referred to by the designated document is extracted in order from the document data group 611. At step S1903, a check is performed to determine whether or not the update time for the reference document data is later than the user-by-user document reference time data. If the update time is later, program control goes to step S1905 where a "true" is returned and thereafter the process is terminated. If the update time is not later, program control moves to step S1904, and the procedures at steps 1904 through S1902 are repeated until all the reference document data that are referred to by the designated document data are extracted. When the extraction process is completed, program control advances to step S1906, a "false" is returned, and the process is thereafter terminated.

In this manner, the reference time for each document is constantly maintained for each user. When a user compares the update time attribute of the designated document data with the update time attribute of the referred document data, the user can identify a document that has been updated since the user last referred to it and a document that refers to the updated document data, so that each user can know that data which has been changed while he was not aware of it.

According to the fifth embodiment, for each user and for each document, document data can be identified that, since a specific user referred to it, has been updated by another user and that include known data and unknown data.

In addition, when other document data is referred to in the document data, document data that include data that is unknown to a user can also be identified.

[Sixth Embodiment]

Although in the fifth embodiment the update time data for a document is employed for the entire document, the update time data is not so limited. In the sixth embodiment, the structured document data can be examined by the individual reference document element unit in other document data. Thus, even in those document data that refer to another document element, document data that include unknown data can be identified. The details of the processing will now be explained. Since the general arrangement of the apparatus and the basic processing for this embodiment are the same as those in the previously described embodiments, no explanation for them will be given here.

According to this embodiment also, in the structured document data in FIG. 21, the reference to another document element is indicated by the "&file;" that is denoted by 205. For the display of document titles, as in the previously described embodiments, the document title display processing that is performed corresponds to that in the flowchart in FIG. 17.

Figure 22:
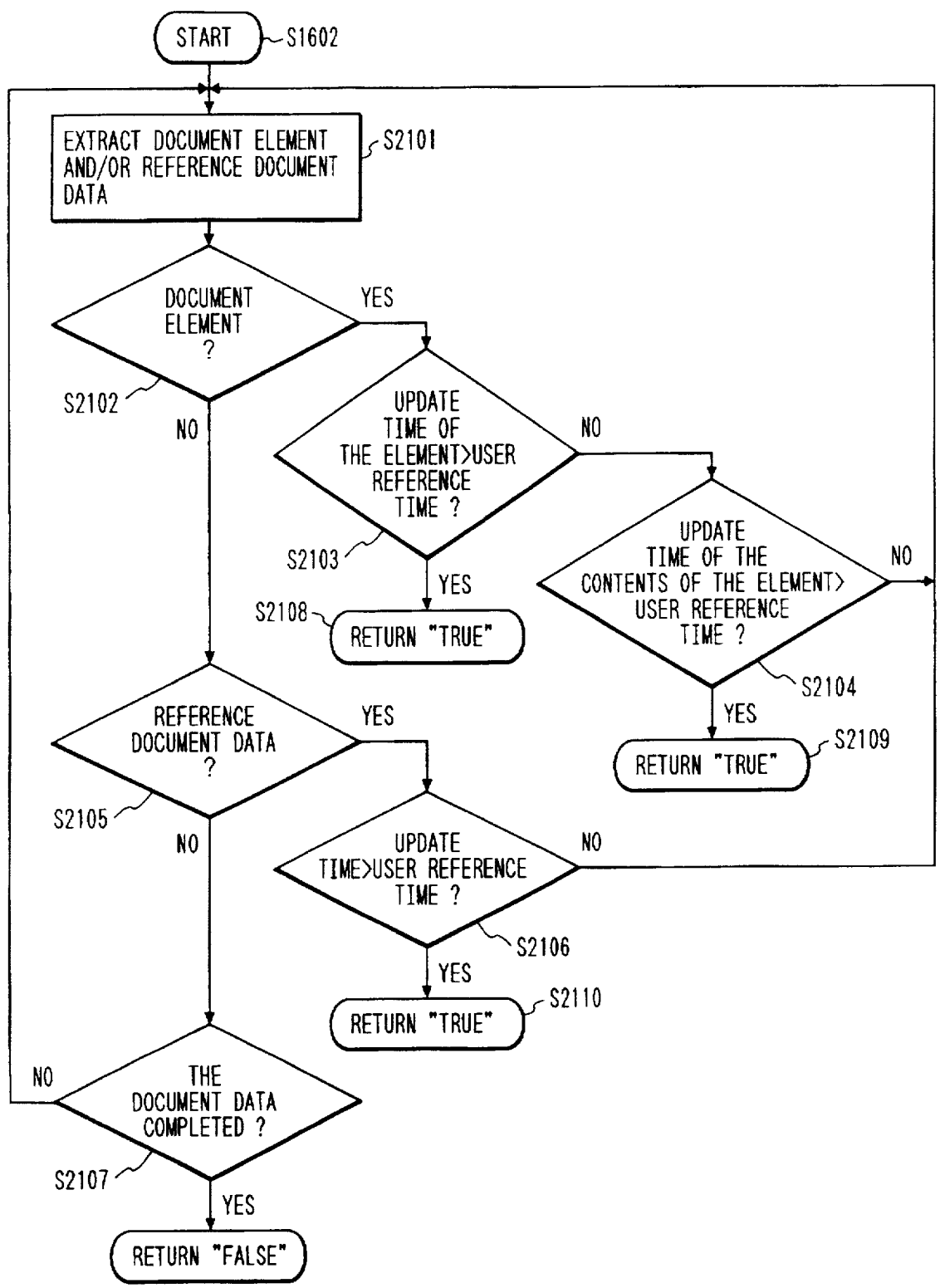
FIG. 22 is a flowchart showing processing for comparing the updating according to the sixth embodiment of the present invention.

The process at step S1602, which is the feature of the sixth embodiment, will now be explained while referring to the flowchart in FIG. 22.

When document titles are displayed and one of the documents is designated by the cursor 202, program control moves to step S2101, where document elements or entities for a reference document are extracted in order. A check is then performed to determine whether or not the extracted document data is a document element (step S2101). When the extracted data is a document element, program control goes to step S2103 and a check is performed to determine whether or not the update time of the document element is later than the document reference time. When the update time is later than the document reference time, program control goes to step S2108 where a "true" is returned. When the update time is earlier than or the same as the document reference time, program control moves to step S2104, and the comparison process for comparing the update time of the content of the document element is performed. When the result obtained through the updating and comparing process is "true", i.e., when the update time is later than the document reference time for each user, program control moves to step S2109 where a "true" is returned.

When, at step S2101, the extracted document data is not a document element, program control advances to step S2105, and a check is performed to determine whether or not the extracted data is reference document data. When the extracted data is reference document data, program control moves to step S2106, and the comparison process for comparing the update time of the reference document data with the user-by-user document reference time data is performed. If, as a result, it is determined that the reference document data has been updated by another user, program control goes to step S2110 where a "true" that indicates updating has been performed is returned. If no updating has been performed, program control returns to step S2101 where the sequential data extraction is performed. When the sequential extraction for the designated document data has been completed, a "false" is returned and the process is thereafter terminated.

According to the sixth embodiment, the reference time for each document for each user is constantly maintained, and the user-by-user document reference time data 62 is compared with the update time attributes of the document elements in the designated document data and in the document data that is referred to by that designated document data, so that a user can identify the document data in which is included a document element that has been updated since that user referred to it.

[Seventh Embodiment]

According to the seventh embodiment, the reference to other document data is permitted in the structured document data by the individual content unit of a document element, and each time the structured document data is updated, the time at which the change is made is held in the update time attribute that is given to each of the changed document elements. Therefore, even in the document data that refers to other document data, document data that include unknown data can be identified. The seventh embodiment is almost the same as the sixth embodiment, except that, as is shown in FIG. 23, the reference not of the arrangement of elements but of the content of the elements is permitted as reference document data, as in "&file;".

In this manner, the reference time for each document for each user is constantly maintained. The user-by-user document reference time data 62 is compared with the update time attributes of all the document elements of the designated document data and the document data that is referred to by that designated document data, so that the document data that include document elements that were updated after a user referred to them can be specified and document data that has been updated by another user can be identified by each user.

According to this embodiment, document data for each document is updated after a user referred to that data, and document data that include data that is unknown to the user can be distinguished from other data in the document data group wherein known data and unknown data are mixed. Even when other document data is referred to in the document data by the individual content unit of a document element, the document data that include unknown data that has been updated by another user can also be identified.

As is described above, according to the embodiment, a document, in a plurality of document data, that has been changed from the previously referred is reported to each reader or specified to ensure that it will be possible to identify a known document and a document that includes unknown data.

Each user can therefore acquire, in the form of a document, desired document data that has been changed. Since the update time data is provided as an attribute for document data that is to be referred to, even in the document data that has reference document data, it is possible to distinguish a known document from a document that includes unknown data.

[Eighth Embodiment]

Figure 24:
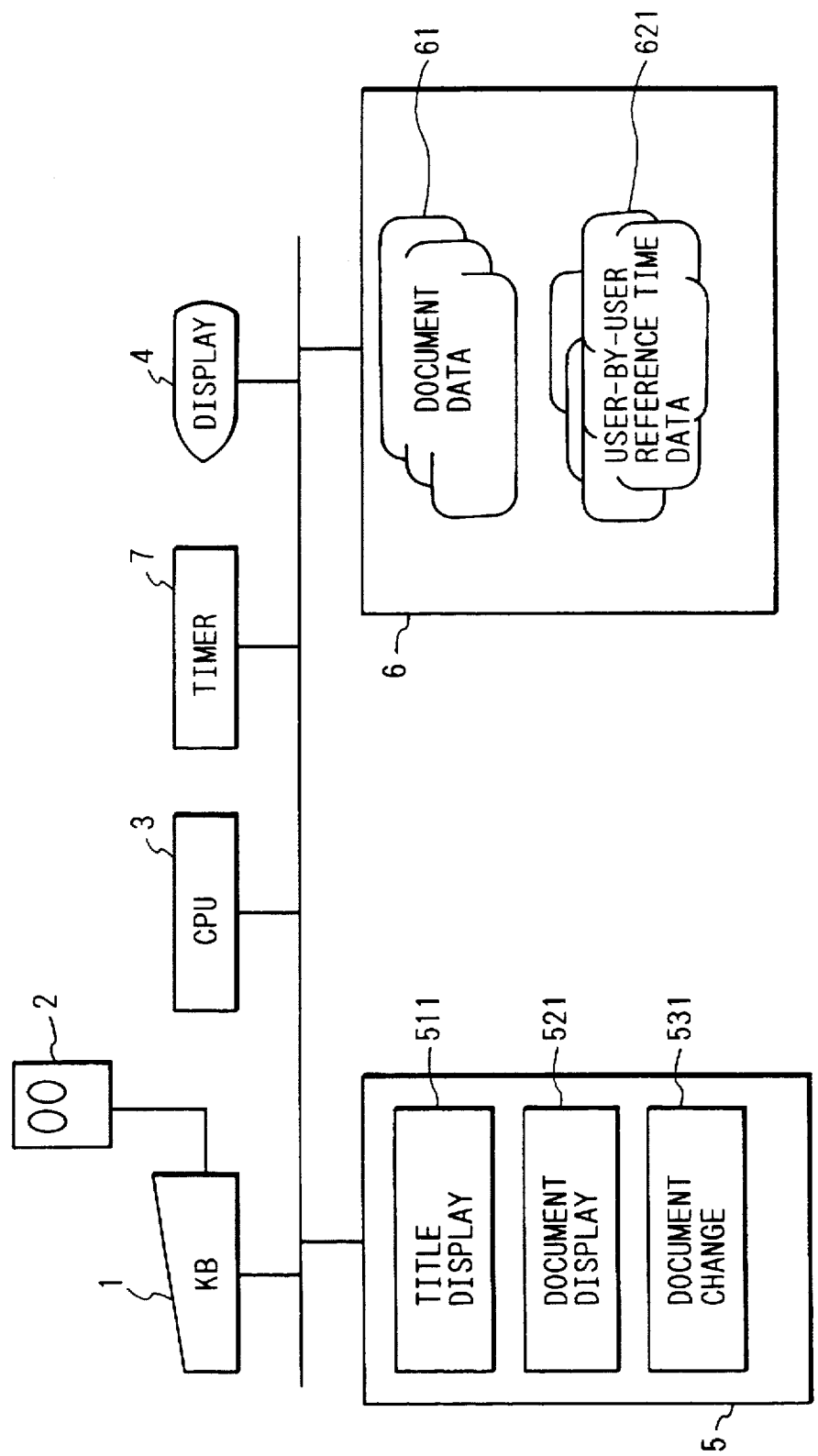
FIG. 24 is a block diagram illustrating the arrangement of a document processing apparatus according to another embodiment of the present invention.

FIG. 24 is a block diagram illustrating the arrangement of a document processing apparatus according to the eighth embodiment of the present invention. The same reference numbers as are used in the previous embodiments are also used to denote corresponding or identical components, and no explanation for them will be given here. This embodiment differs from the others in the user-by-user document reference time data 621 that is stored in the storage device 6.

Figure 26:
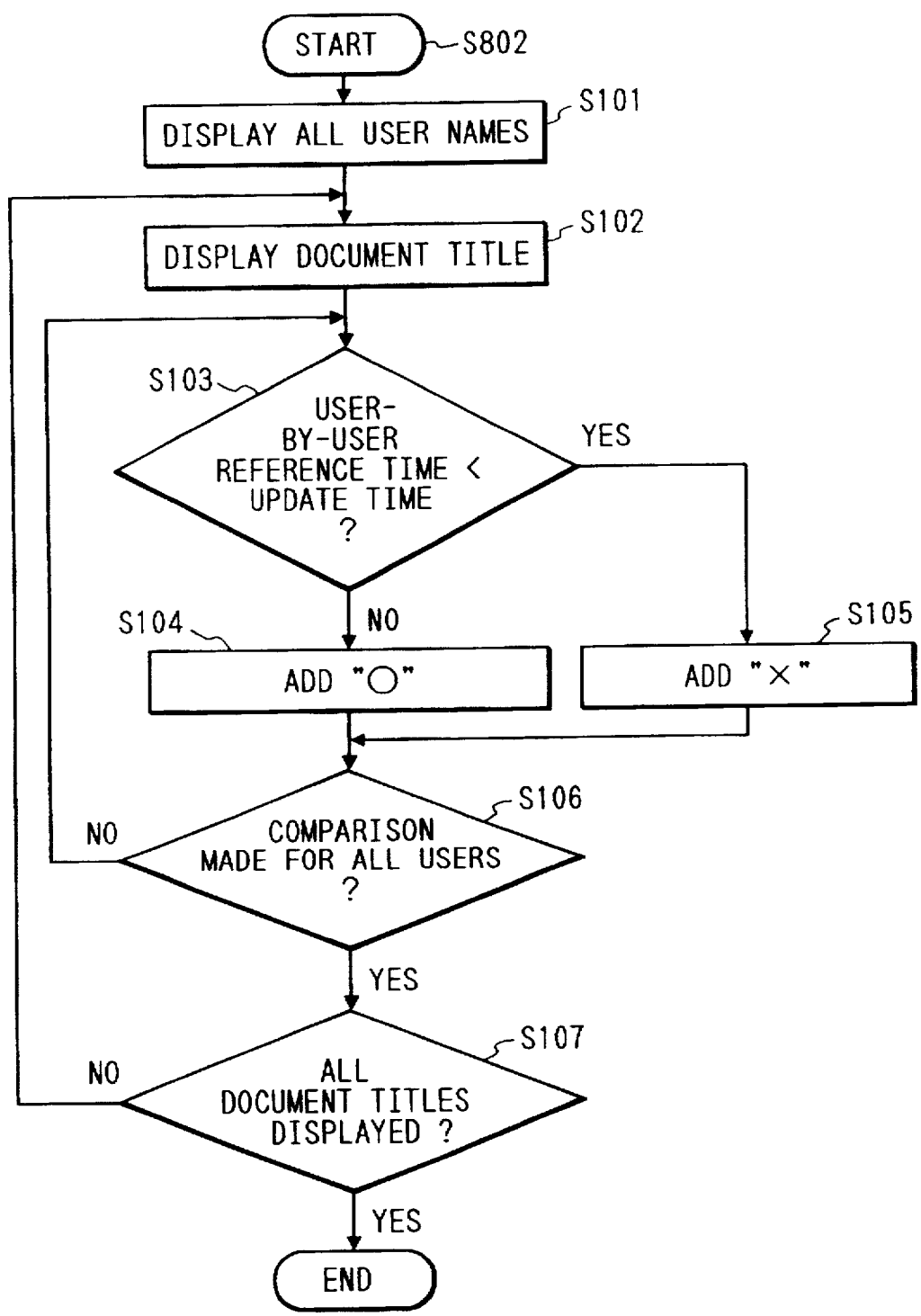
FIG. 26 is a flowchart showing processing for displaying a document title according to the eighth embodiment of the present invention.

The basic processing in this embodiment is the same as that shown in the flowchart in FIG. 9. In the document title display process at step S802, as is shown in FIG. 25, document data that was previously referred to by a user and that has been updated by another user can be identified for each user. FIG. 25 corresponds to FIG. 10 in the first embodiment, and the display process is as shown by the flowchart in FIG. 26. The details of the processing will be briefly explained in correspondence with the flowchart in FIG. 11.

At step S101, the names of all users that are held in the user-by-user document reference time data 621 for each user are displayed, and at step S102, document titles are displayed in order. At step S103, the document reference time for each user is compared with the update time <UpdateTime> of document data. At step S105, the document data that was updated after the document reference time is displayed with an "X" added, as is shown in FIG. 24. This process is performed for all the users. When the document data has not yet been updated, at step S104, the document data with a "○" added is displayed as is shown in FIG. 25.

[Ninth Embodiment]

In addition, for example, at step S802 in the flowchart in FIG. 9 for the first embodiment, the user-by-user document reference time data 621 is compared with the update time attribute <UpdateTime> of the document data, and when the title of the document data that was changed later than the document reference time is to be displayed, a display wherein the background is shaded may be used or the title in a display may be inverted, as is shown in FIG. 27. If the document data that include unknown data are displayed with a changed display attribute or in a different display style, the document data that includes data that is unknown to a user can be identified within the document data group 611 wherein known data and unknown data are mixed. Further, as is shown in a table in FIG. 27, when a document of a specific user is not inverted when displayed but is selected by the pointing device 2, and when the document has been changed by another user, an audible warning signal may be employed to notify the user that the document data has been updated.

When alerted by an audible warning signal that is produced when the document data that include unknown data are selected, a user can distinguish document data, from among the document data that are included in the document data group 611, that include both known data and unknown data for that user. It should be noted at this time that a warning need not be issued to a user only by an audible signal, but that any means by which a signal may be given, to include an image, may be employed for this purpose, so long as it provides a sensation that can be perceived by one of the five human senses.

[Tenth Embodiment]

Figure 28:
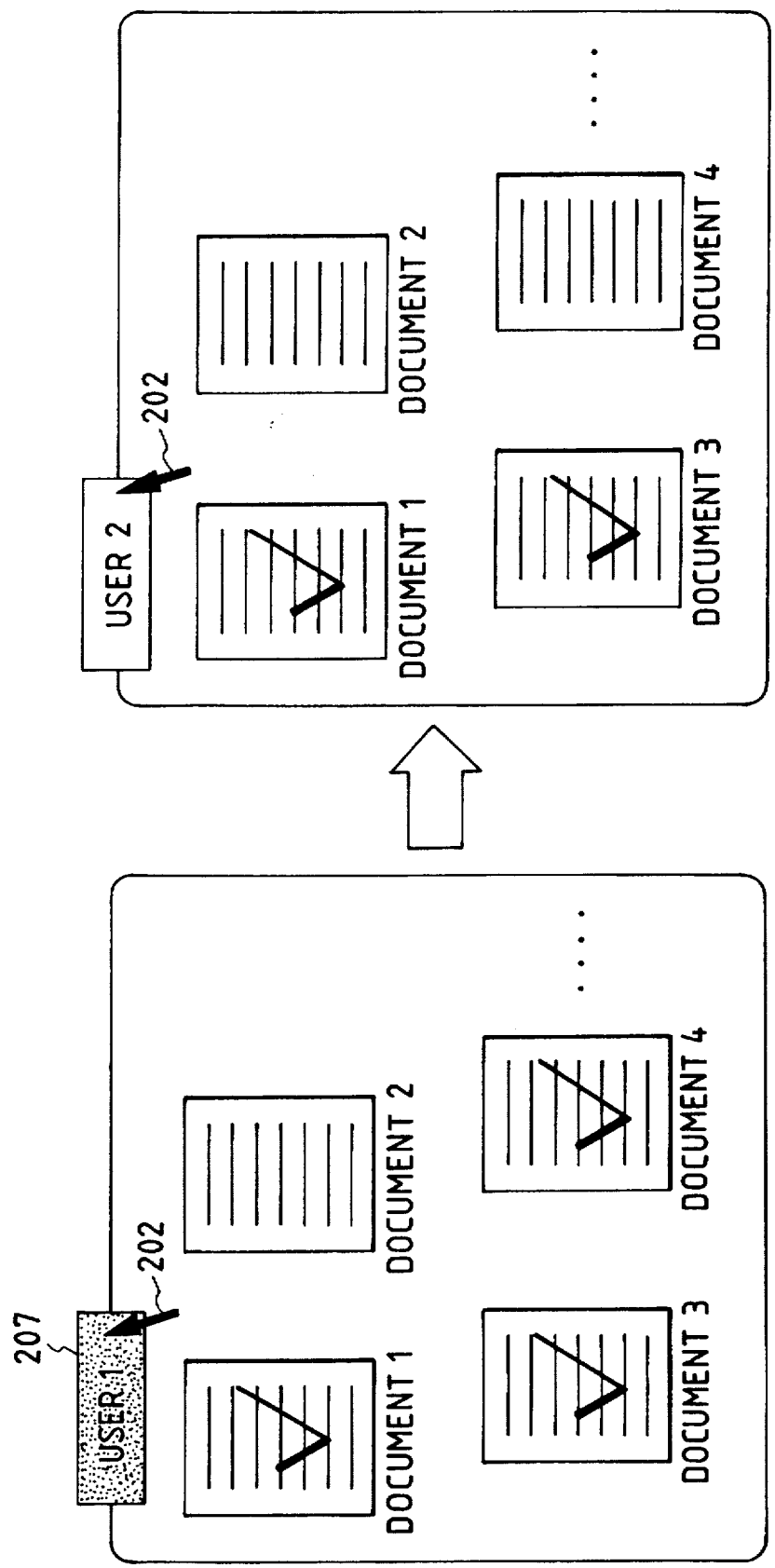
FIG. 28 is a diagram showing one display example of document titles according to a tenth embodiment of the present invention.
Figure 29:
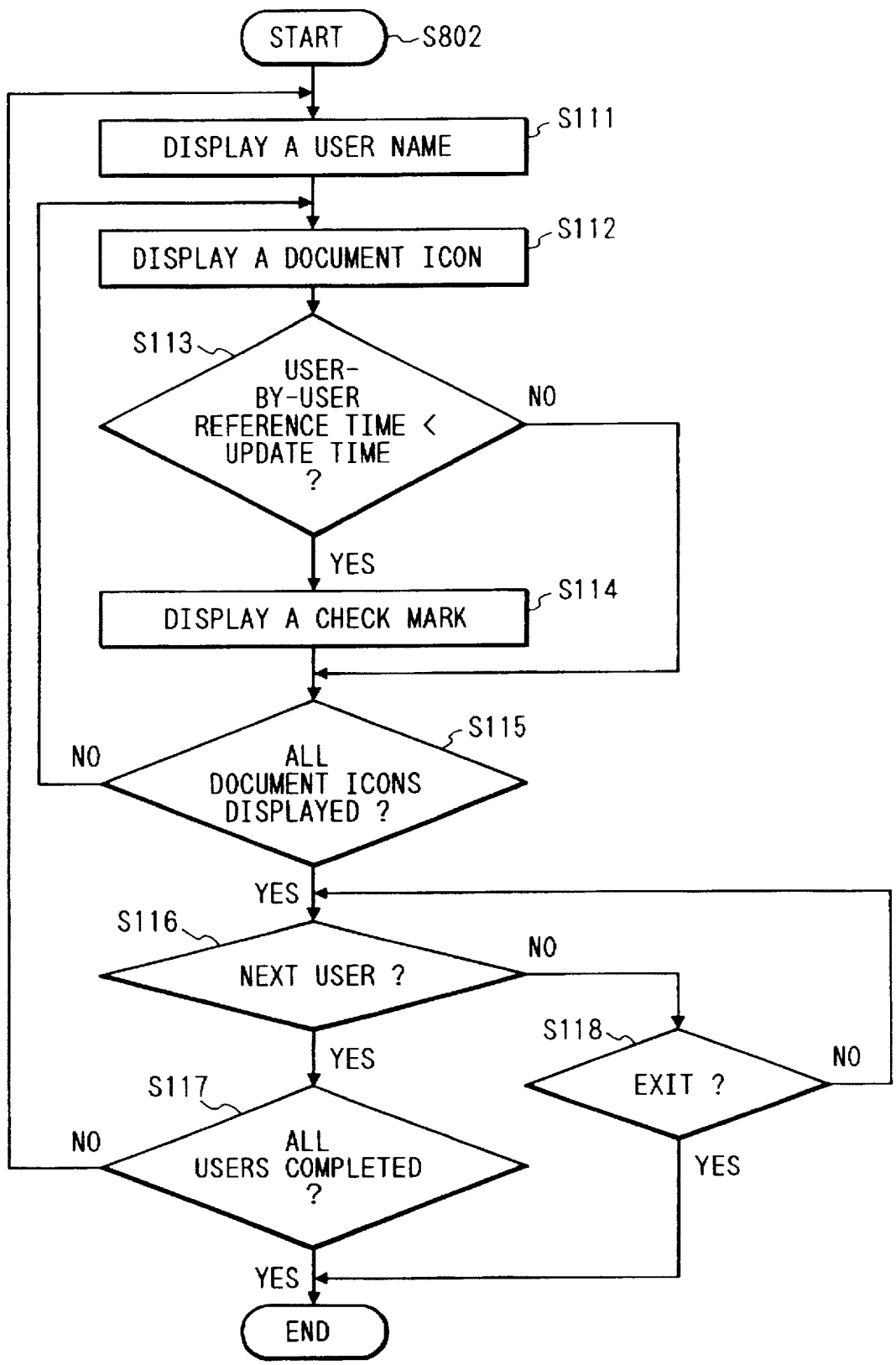
FIG. 29 is a flowchart showing processing for displaying a document title according to the tenth embodiment of the present invention.

In the tenth embodiment, a document that has been updated by a different user can be displayed, as is shown in FIG. 28. When user 1 is designated by the cursor 202, only an icon for "document 2" is displayed as not being updated. When user 2 is designated by the cursor 202, icons for "document 2" and "document 4" are displayed as not being updated. The processing will now be explained while referring to the flowchart in FIG. 29. In this process, the user-by-user document reference time data 62 is compared with the update time attribute <UpdateTime> of document data. When the title of document data that has been changed after the document reference time is to be displayed, a distinguishing mark is added to an icon that corresponds to that document, as is shown in FIG. 28. At this time, documents are displayed as folders, one for each user, and the switching of users is performed in order by the clicking a button in a user name display area 207 that is shown in FIG. 28.

First, at step S111, the first user name is displayed, and a document icon that is formed as a user's folder is displayed (S112). User-by-user document reference time data 621 is compared with the update time attribute <UpdateTime> of the document data to determine whether or not the document has been updated by another user since the first user referred to previously (S113). To identify document data that have been changed by another user after the document reference time, on the document icons that are displayed for them a mark is added (S114). At step S115, the procedures at step S113 and 114 are performed for all the documents.

When all the documents for that user have been displayed, program control advances to step S116. The entry of an instruction for displaying the next user (step S116), or the entry of an instruction for terminating the display process (step S118) is waited for. When a display for the next user is instructed, program control moves to step S117, where a document icons that take the form of user's folder are displayed in order until the display for all of the users is completed. When, at step S118, the termination of the display process is instructed, the process is terminated.

As is described above, when the icon of a document that was updated by a user and was later updated by another user, and that thus includes data that is unknown to the original user, is displayed by using a different display form, document data that include data that is unknown to the user can be identified. The icons that are displayed are not limited to the examples shown in this embodiment, and each document may be designated by an icon having the form of a folder and a user may be represented by an icon.

For the folders shown in FIG. 13, instead of a mark being added to the document icon for a document that has been updated by another user, when a user employs the pointing device 2 to select the icon of such a document, an audible alarm can be sounded to signal the user that the designated document has been so updated. Further, any means other than sound may be employed as a signal so long as it provides a sensation that can be clearly perceived by one of five human senses.

[Eleventh Embodiment]

In the eleventh embodiment, only the titles of documents that have been changed, or only the titles of documents that have not been updated are displayed for each user (FIG. 30). For each document that has been updated, only a confirmed user name or an unconfirmed user name may be displayed, as is shown in FIG. 32.

Figure 31:
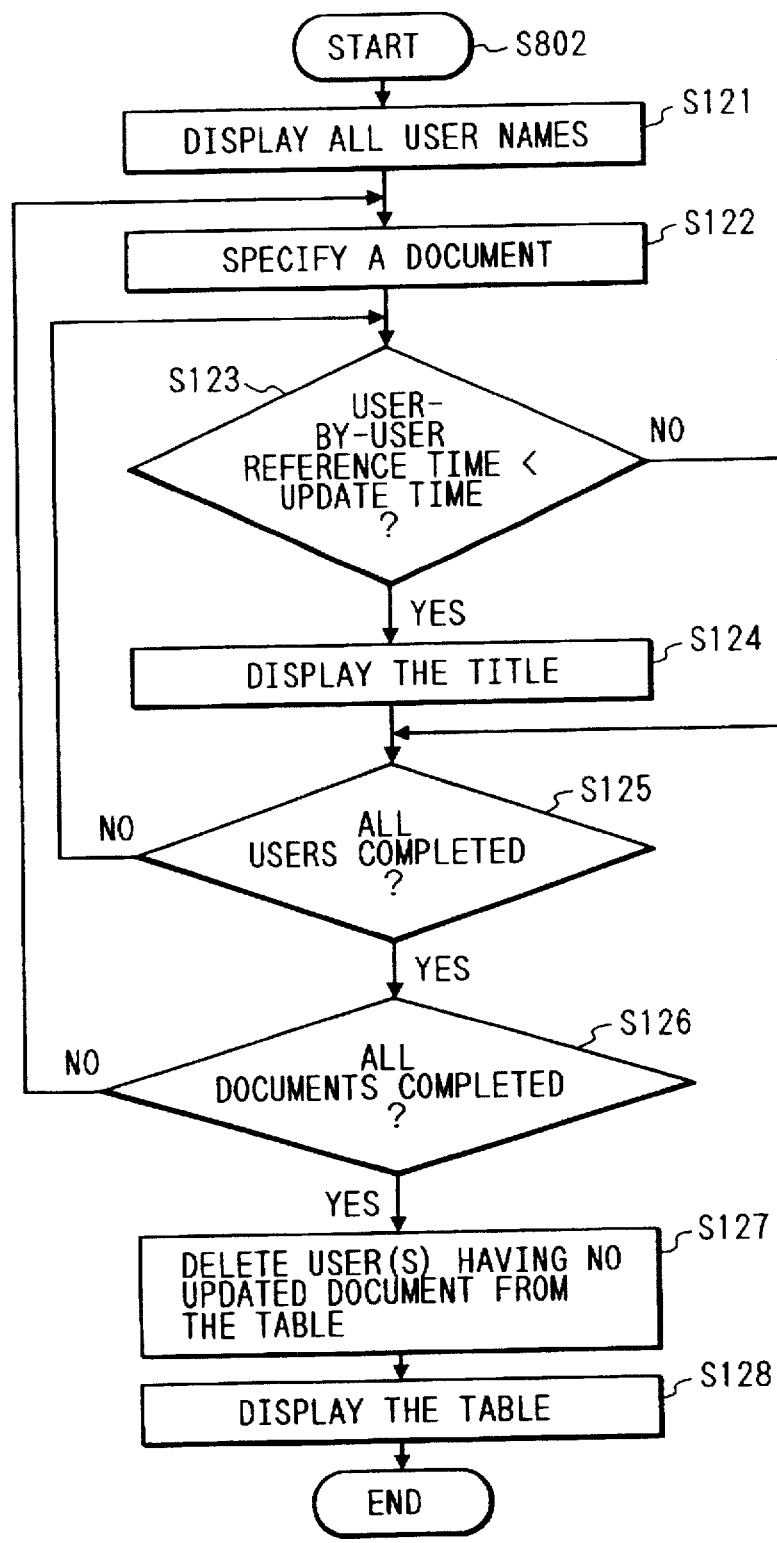
FIG. 31 is a flowchart showing processing for displaying a document title according to the eleventh embodiment of the present invention.

FIG. 31 is a flowchart showing this process. The arrangement of the apparatus employed for this process is the same as is in shown in FIG. 24.

When the display of document titles is being executed, the process described at step S802 in FIG. 9 is performed. For each user is displayed a document title or the like that specifies that document data of a document that has been changed by another user since it was last referred to.

First, at step S121, all user names that are included in the user-by-user reference time data 621 are displayed in the form of an auxiliary table. Program control then advances to step S122 to wait for documents to be specified in order. This procedure is performed by a user using the keyboard 1 or the pointing device 2. The user-by-user document reference time data 621 is compared with the update time attribute <UpdateTime> of specified document data to determine whether or not the specified document has been updated (S123). When the specified document data has been updated by another user since the time indicated in the user-by-user reference time data 621, program control moves to step S124, and the title of the document data is displayed in the column of a corresponding user in the table, as is shown in FIG. 30. The procedures at steps S123 and S124 are performed for all the users (S125). Then, program control advances to step S126 where the process for each user is performed for all the documents.

When these procedures are completed, program control moves to step S127. A user name for which there are no document titles displayed, i.e., a user name for which there are no documents that have been updated by another user, is deleted from the table. Program control goes to step S128 where the table is displayed, and the process is thereafter terminated. The other processes are basically the same as those in the above described embodiments.

Therefore, the user-by-user reference time for each document is constantly maintained, and when a user compares the user-by-user reference time data 621 with the update time attribute of the document data, that user can determine whether a document has been changed by another user since the first user previously referred to it.

Although, in this embodiment, an unconfirmed document is specified for each user, only an unconfirmed user name may be displayed for each document, as is shown in FIG. 32.

In such a case, especially when the writer of a document has updated that document, the updating of the document can be easily detected.

Further, the display of document data for each user may be performed by using the icon forms that are shown in the previous embodiment.

In this embodiment, the update time is provided as an attribute of the entire structured document data; but when document data form a single file, the time stamp for that file may be employed.

When a user who refers to document data desires to examine whether or not that document data has been changed by another user since it was last referred to, the user can obtain the original document, not the update time, and can determine the time relationship between the update time and the reference time by employing a counter and a comment.

The above described embodiments may be combined as needed, even though they were separately explained, or may be selected individually, as needed, and carried out.

Although these embodiments are accomplished by performing event driven processes, the event driven processes may be replaced by independent programs that use document data in common. In this case, the event process for termination is not required. Further, although a display program and an editing program are separate entities in this embodiment, a program that includes both the display process and the editing process may be used as an editing program, and a display program may be eliminated.

Further, in this embodiment, the update data, for all the documents for all the users, that are held in the user-by-user reference time data 621 are processed. A procedure for inputting a specific single user, or a specific plurality of users may be added so that the update data is designated with respect to only the user or the users that are specified. Or, a procedure for inputting a specific single document or a specific plurality of documents may be added so that the update data are designated with respect to only the document or the documents that are specified.

As is described above, according to this embodiment, document data that was referred to by a user and that was later updated by another user can be so displayed for each user and for each document that it can be identified.

Therefore, each user can easily understand in which document data are unknown data that must be confirmed, or a data management supervisor can easily identify each document for which user confirmation of unknown data is required.

The present invention may be employed for a system that is constituted by a plurality of devices, or for an apparatus that is constituted by a single device. In addition, the present invention can be employed for a case where a program that carries out the present invention is provided for a system or an apparatus to accomplish the present invention.

As is described above, according to the present invention, among a plurality of document data, a document that has been changed since it was last referred to-is reported to or specified for each reader, so that a known document and a document that include unknown data can be identified for each user.

Therefore, one advantage is that whether document data has been confirmed or has not yet been confirmed by a user can be easily determined.

Further, another advantage is that for a document that is updated, the user who has confirmed the document and the user who has not yet confirmed it can be easily discerned.

In addition, since the update time data is appended as an attribute to document data that is to be referred to, it is possible that, for document data that includes reference document data, a known document and a document that includes unknown data are identified for each user, or a user for whom there is no unknown data can be identified for each document.

As is described above, according to the present invention, it can be easily determined whether or not document data has been changed during the period extending from the time a specific user last referred to the document data up to the present time.

Further, according to the present invention, document data that has been changed by another user can be easily identified.

In addition, according to the present invention, it can be determined whether or not specified document data and document data that the specified document data refers to, both of which a user referred to previously, have been changed by another user.

Moreover, according to the present invention, a user can be notified that document data have been updated by another user by sounding an audible alarm signal.

Further, according to the present invention, it can be determined for each user whether or not each set of document data that was previously updated by the user has been changed by another user.

[Twelfth Embodiment]

The twelfth embodiment of the present invention will now be described while referring to the accompanying drawings.

Figure 33:
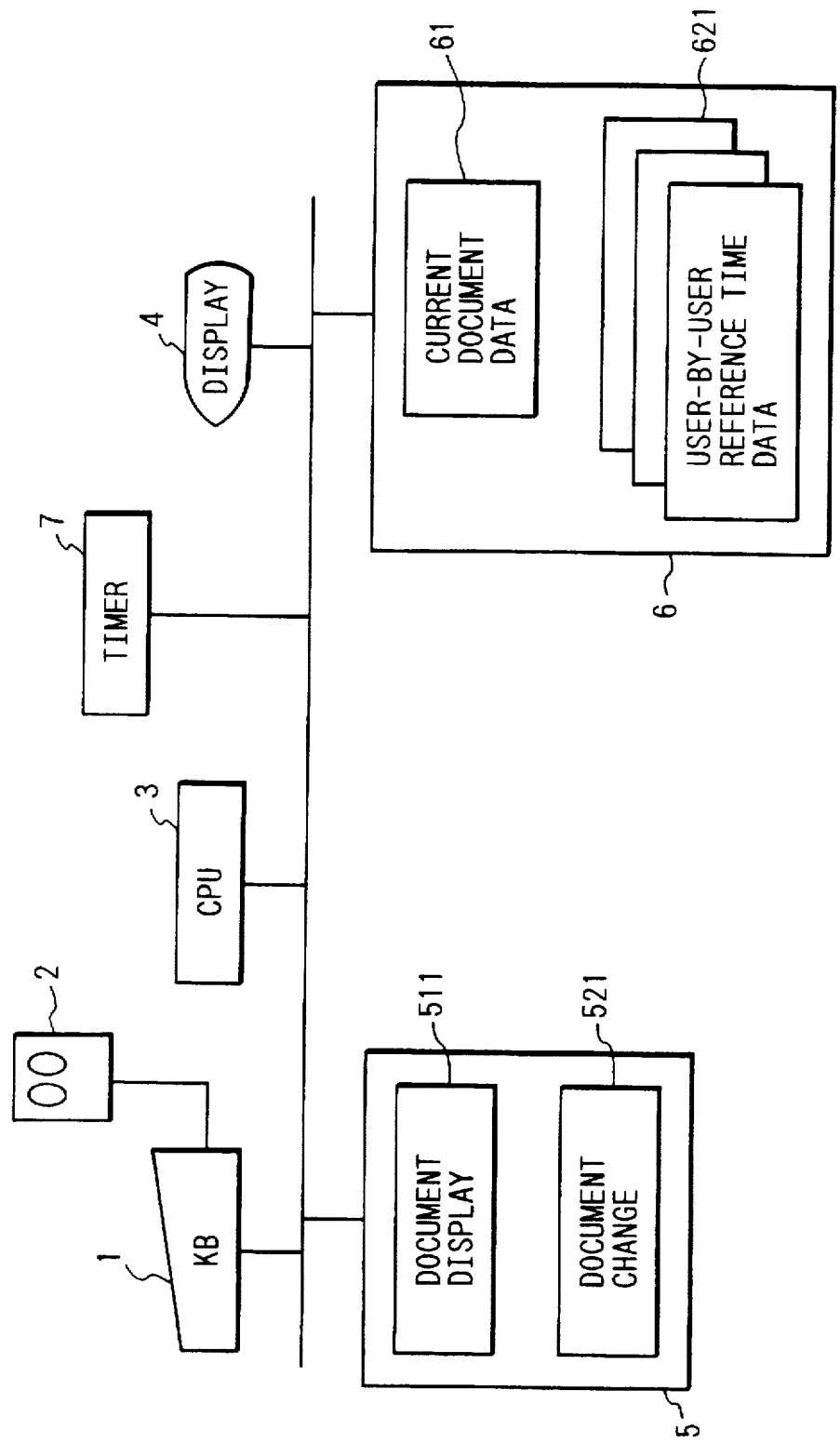
FIG. 33 is a block diagram illustrating the arrangement of a document processing apparatus according to a twelfth embodiment of the present invention.

FIG. 33 is a schematic block diagram illustrating the arrangement of a document processing apparatus according to the twelfth embodiment. An explanation of the components that are identical to those in FIG. 1 will not be given here.

As is shown in FIG. 33, a document display program 511 and a document change program 521 are stored in the memory 5. Current document data 61 and user-by-user reference time data 62 are stored in the auxiliary storage device 6.

In this embodiment, document data is regarded as structured document data that consists of document elements that have state update time data ST and style update time data FT as attributes, as is shown in FIG. 34. The user-by-user reference time data holds the reference time for each user in the form shown in FIG. 35.

Figures 35, 36:
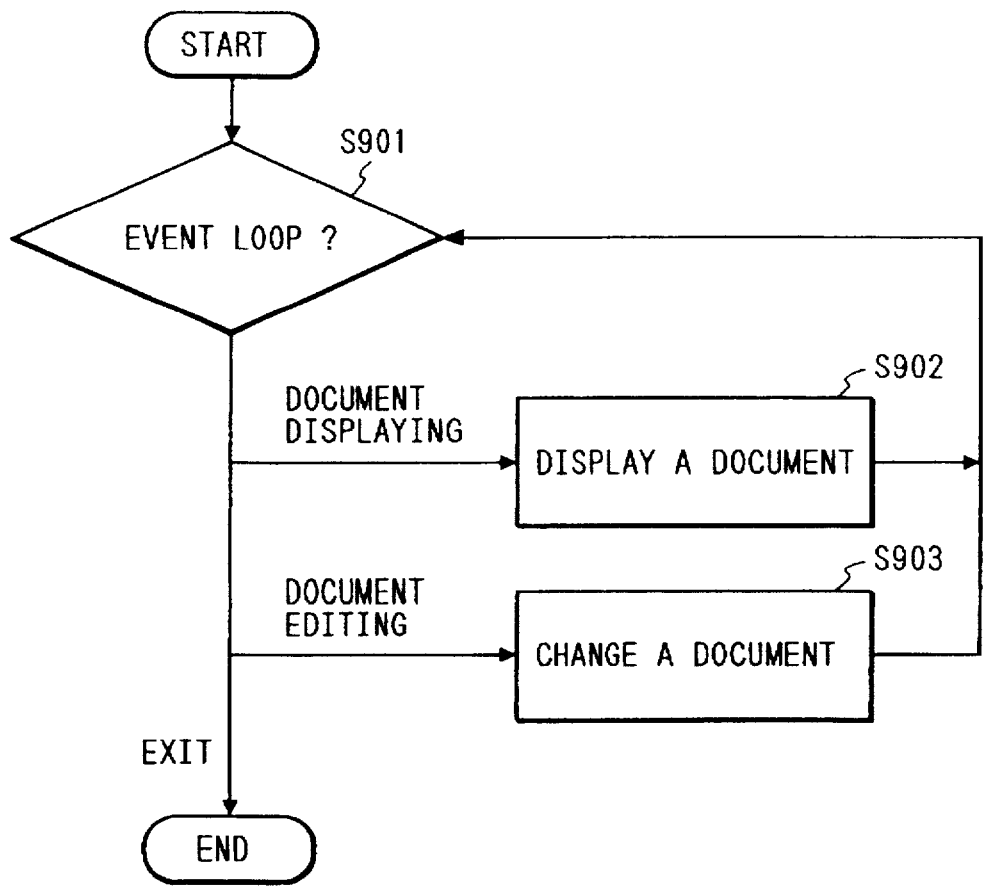
FIG. 35 is a diagram showing one example of user-by-user document reference time data of the twelfth embodiment of the present invention.
FIG. 36 is a flowchart showing processing performed by the document processing apparatus according to the twelfth embodiment of the present invention.

The flowchart for the entire system according to this embodiment is shown in FIG. 36. When a system is activated by a certain user, the occurrence of an event is waited for in the event loop at step S901. When the display of a document is instructed, program control moves to step S902 where the document is displayed. When the editing of a document is instructed, program control moves to step S903 where the document is changed. When termination is instructed, the system is thereafter inactivated.

Figure 37:
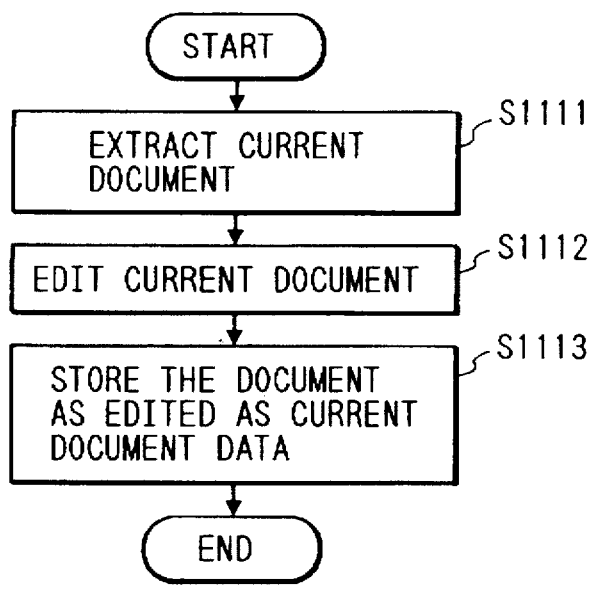
FIG. 37 is a flowchart showing document editing performed by the document processing apparatus according to the twelfth embodiment of the present invention.

When an editing event has occurred, the editing process is performed following the flowchart in FIG. 37. Those operation procedures will now be explained.

First, at step S1111, current document data 61 is extracted from the auxiliary storage device 6. Then, at step S1112, a document editing process is performed. The document editing process is performed following the flowchart in FIG. 38. The procedures for that process will now be described.

At step S1101, document data is edited by the individual content unit of a document element. When, at step S1102, it is determined that an insertion is to be performed, at step S1103, FT of a parent element for which the inserted element is its daughter element, the ST and the FT of the inserted document element itself, and all the STs and the FTs that are included in the inserted element are set to the current time. When the inserted document element is a character, only the FT of the parent element for which the inserted character is its daughter element is set to the current time. If, at step S1104, it is determined that a deletion is to be performed, at step S1105, the FT of a parent element for which the deleted document element is its daughter element is set to the current time. The insertion and deletion of a character may be performed by the individual character row unit.

Steps S1101, S1102, and S1104 in the document editing process do not have to be performed in order. As long as the update time attributes in the document element and in the contents of the document element are set to the current time as the editing of a document is performed, an event driven process may be performed instead. Through the above described procedures, the update time attribute is changed as is shown in FIG. 39.

The entry "nop" indicates that no processing is to be performed and the entry "update" indicates that a target update time attribute (ST or FT) is to be updated to a current time. When all the editing is completed, at step S1106, the document element editing process is terminated. The document that has been edited is stored as the current document data 61 at step S1113. At this time, for the reference time data 62, a current time is held as reference time data for a user who has performed the editing. The current document data 61 may be held each time the document element is edited at step S1112. In this case, the reference time data for a user who is performing the editing is stored as the user-by-user reference time data 62 each time that reference time data is edited.

Figure 40:
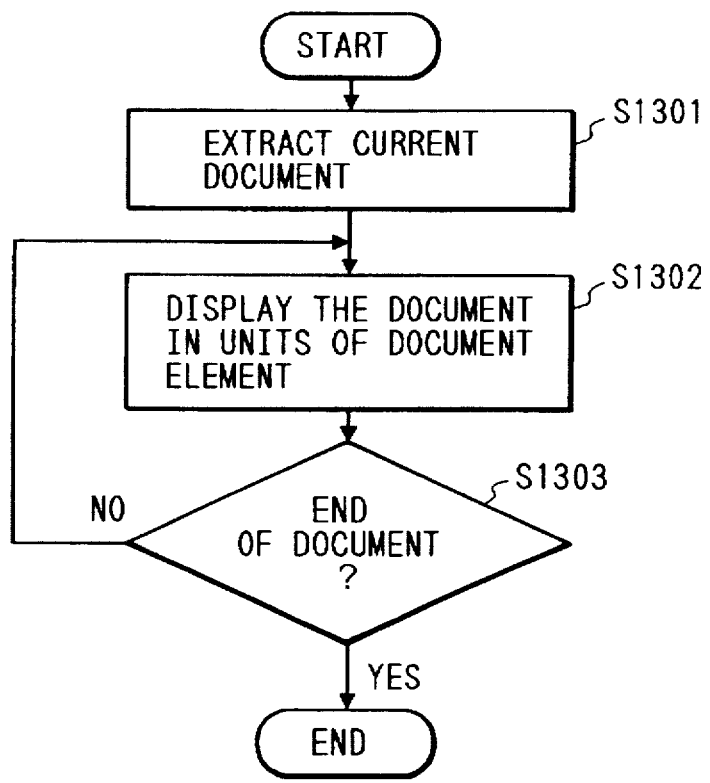
FIG. 40 is a flowchart showing document display processing according to the twelfth embodiment of the present invention.

The display of a document at step S902 in FIG. 36 is shown in the flowchart in FIG. 40.

When a user instructs the display of a document, at step S1301, the current document data 61 is extracted from the auxiliary storage device 6. Then, at step S1302, a document is displayed on the display 4 in consonance with the structure for each document element.

Figure 41:
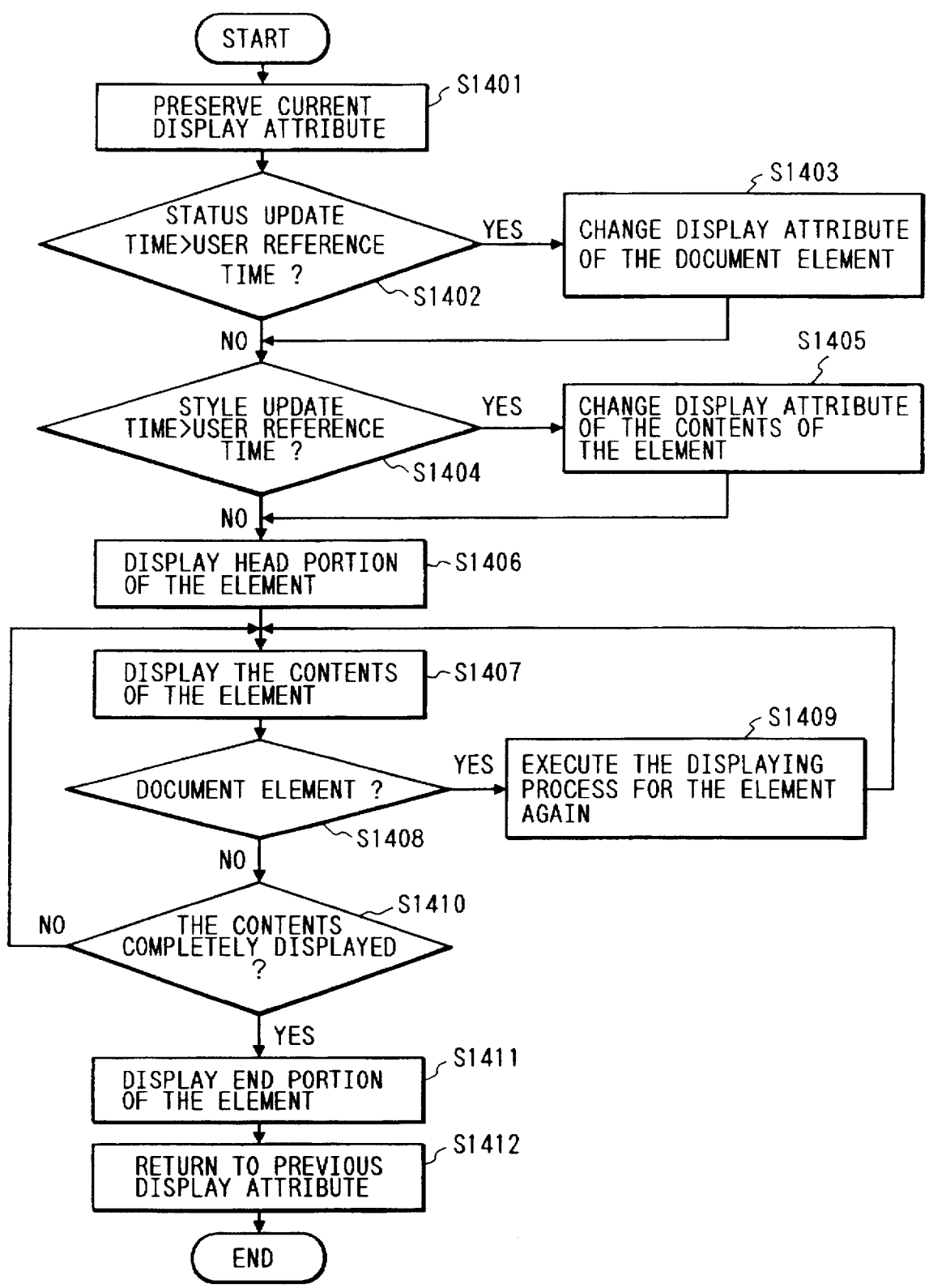
FIG. 41 is a flowchart showing document element display processing according to the twelfth embodiment of the present invention.

The document element display process will now be explained while referring to the flowchart in FIG. 41.

First, at step S1401, the current display attribute is saved. When, at step S1402, the state update time attribute of a document element is later than the time in the reference time data 62 for a user who is currently to display a document, it is assumed that the document element has been inserted.

Thus, at step S1403, the display attribute of the document element is changed. When, at step S1404, the style update time attribute of the document element is later than the time in the reference time data 62 for a user that is currently to display a document, it is assumed that the contents of the document element have been changed. At step S1405, the display attribute of the contents of the document element is changed. Then, at step S1406, the head portion of the document element is displayed in consonance with the determined display attribute.

Figure 42:
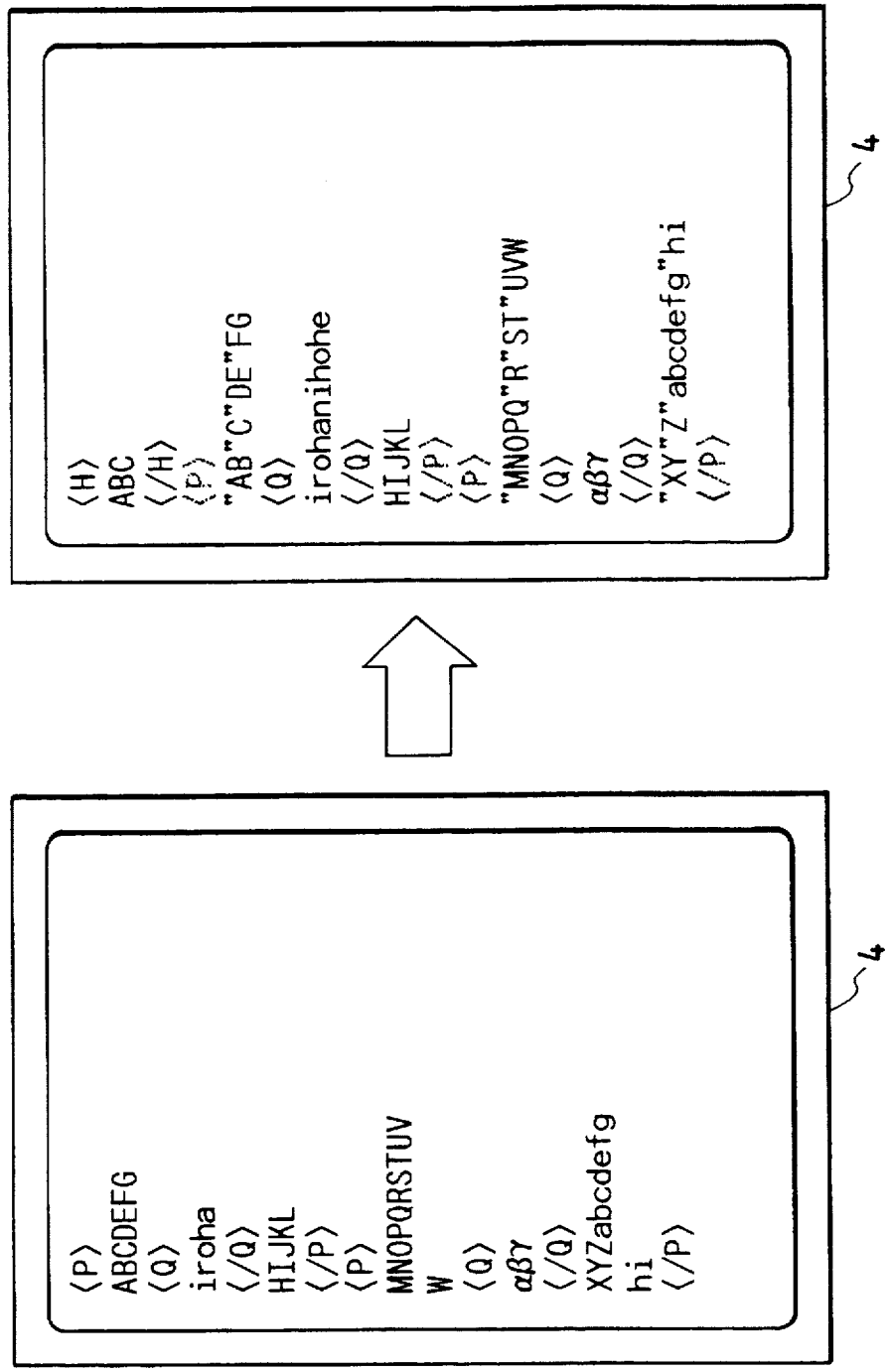
FIG. 42 is a diagram showing one display example of a changed portion according to the twelfth embodiment of the present invention.

At step S1407, the contents of the document element are displayed in consonance with the determined display attribute. When, at step S1408, a document element appears in the contents of the document element that are being displayed, at step S1409, the display process for that document element is performed again. As for the change in the display attribute, as is shown in FIG. 42, the background at a changed portion may be shaded with a different color, or for a display attribute that has a light standard color, the color of a changed portion may be altered so that it is darker. In addition, a rank is not given to the change of the display attribute, and such a binary display may be accepted wherein every updated portion is displayed inverted and the other portions are displayed in the standard manner. When, at step S1410, the display of the contents of the document element is completed, at step S1411, the end portion of the document element is displayed. At step S1412, the display attribute is returned to its original state. The document element display process is thereafter terminated.

In consonance with the combination of the state update time and the style update time, and the user-by-user reference time, the display example shown in FIG. 43 can be provided.

When additional data is written to a document, as is indicated by 1 in FIG. 43, the content of the document element, the document elements that are included in the content, and the contents of those document elements are all displayed as changed portions. When cut and paste or copy and paste is performed on the document element, the pasted document element and the style update time data of the inserted document element are updated, so that the display is as indicated by 1 in FIG. 43.

When the character of the contents of a document element is changed without altering the structure of a document, i.e., when the style of a document element is changed, the contents of the changed document element are displayed as changed portions, as are indicated by 2, 3, and 4. When there are no changes performed, all the documents are displayed in the standard manner, as indicated by 5. A mechanism that designates updated data that a reader should confirm can be achieved by displaying the document in the above described manner.

When, at step S1303, all the contents of the reference time data 62 for a user who has displayed the current time, in the auxiliary storage device 6, and program control returns to the event loop. In this manner, the document display program 511 can be provided. Therefore, when a user refers to a document, the reference time is constantly retained in the user-by-user reference time data. The user compares the user-by-user reference time data 62 with the state update time attribute and the style update time attribute, both of which are appended to a document element, so that, by the individual document structure unit, he can identify data that has been updated since he last referred to them.

In this embodiment, different update time attributes, i.e., the state update time and the style update time, are given respectively to the document element and to the contents of the document element, so that a portion that has actually been changed can be easily identified. That is, since the updated document element and the updated content of the document element are highlighted by using a shaded background, these changes can be confirmed. In this embodiment, the state update time attribute and the style update time attribute are employed as the attributes of a document element. The contents of a document element may be separated from the document element by using the entity SGML, so that the update time attribute is provided both for a document element and for the contents of the document element. In this case, the separated contents of the document element may be stored as a file, and the time stamp for that file may also be used as the style update time attribute of the document element. Even when the contents of a specific document element are used in common by a plurality of document elements, a changed portion can be indicated. Although the event driven processes are employed to carry out this embodiment, the event driven processes may be replaced with independent programs that use document data in common. In this case, the termination event process is not required. Further, although in this embodiment the display program and the editing program are separated, a program that includes both a display process and an edit process may be employed as an editing program and a display program may be eliminated. According to this embodiment, a document element that includes unknown data for each user, and the contents of the document element can be designated in the document data group 61 wherein are-document data that have been updated since they were last referred to by a user, and thus both known data and unknown data can be included. Therefore, each user can easily access document data that must be confirmed.

[Thirteenth Embodiment]

Although, in the twelfth embodiment, the contents of a document element that has a changed portion is regarded as unknown data, i.e., as updated data that a reader should confirm, the contents of the document element are not limited to these.

According to the thirteenth embodiment, a changed portion is designated by independently deciding on a display attribute without employing a display attribute that is inherited from a parent element.

The thirteenth embodiment of the present invention will now be explained while referring to the accompanying drawings. The block diagram for this embodiment is the same as in FIG. 33 with the exception that the document display program 511 in FIG. 33 is changed to a document display program 512 (not shown). In this embodiment, a document is regarded as structured document data, as in FIG. 34, that has as its attributes the state update time data ST of a document element and the style update time data FT of the document element.

The flowchart for the entire system in this embodiment is the same as in FIG. 36, with the exception that the document display process step S902 is changed to another document editing process (not shown). When the system is activated by a user, the occurrence of an event is waited for in the same event loop as that at step S901. When the display of a document is instructed, the document is displayed. When the editing of a document is instructed, the document is changed. When termination is instructed, the system is inactivated. When an editing event has occurred, the process is the same as that which is performed in the twelfth embodiment. When a display event has occurred, the processing is the same as that which is performed in the flowchart in FIG. 40. When a user instructs the display of a document, the current document data 61 is extracted from the auxiliary storage device 6 as well as at step S1301. Then, as is performed at step S1302, the document is displayed on the display 4 in consonance with the structure for each document element.

Figure 46:
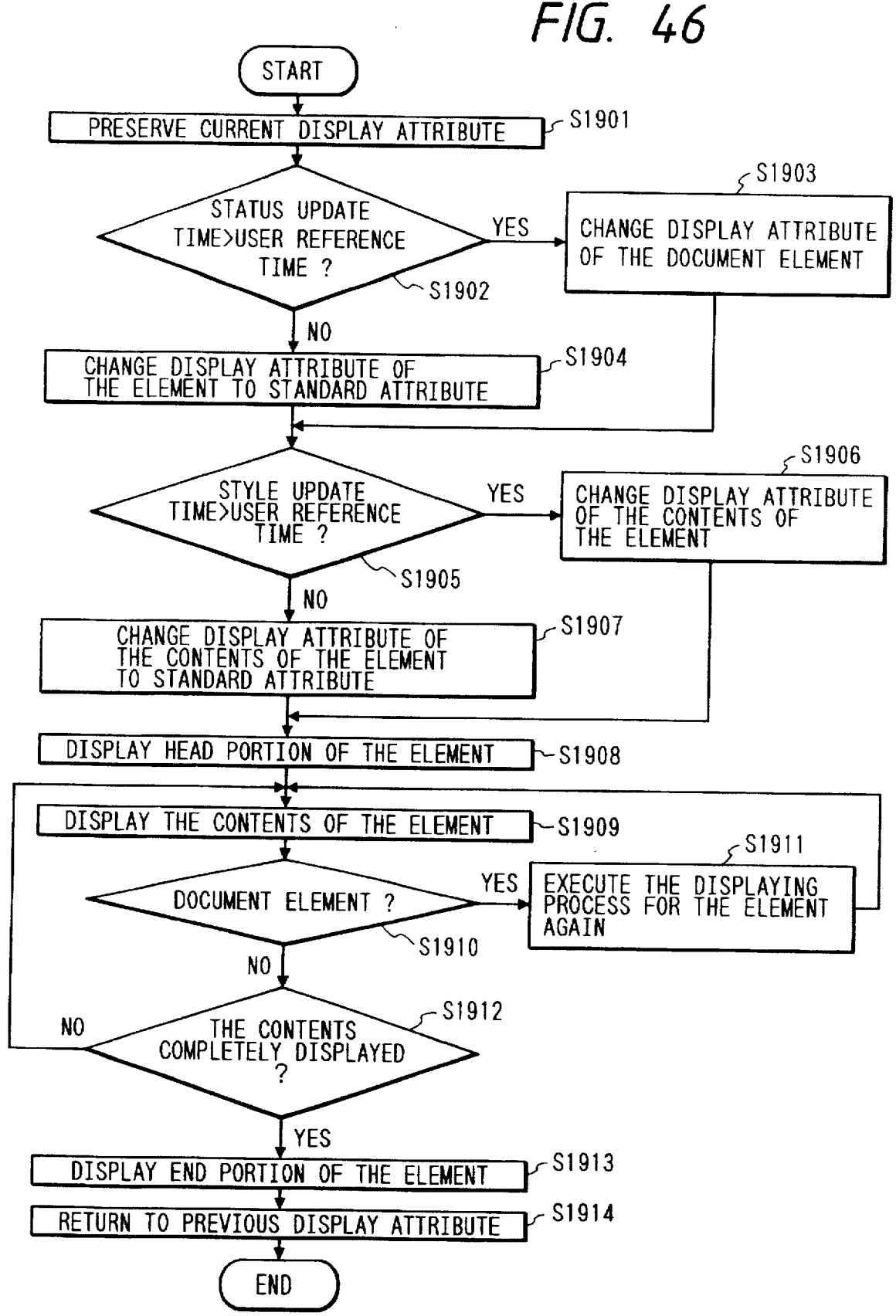
FIG. 46 is a flowchart showing document element display processing according to the thirteenth embodiment of the present invention.

The document element display process will now be described while referring to the flowchart in FIG. 46.

First, at step S1901, the current display attribute is stored. When, at step S1902, the state update time attribute of a document element is later than the time of the reference time data 62 for a user who is to display a document, it is assumed that the document element has been inserted. At step S1903, the display attribute of the document element is changed. When the state update time attribute of the document element is earlier than the time in the reference time data 62 for the user who is currently to display a document, it is assumed that the document element has not been changed. At step S1904, the display attribute of the document element is changed to the standard attribute.

If, at step S1905, the style update time attribute of the document element is later than the time in the reference time data 62 for the user who is to currently display a document, it is assumed that the contents of the document element have been changed. At step S1906, the display attribute of the contents of the document element have been changed. When the style update time attribute of the document element is earlier than the reference time data 62 for the user who is to currently display a document, it is assumed that the contents of the document element have not been changed. At step S1907, the display attribute of the contents of the document element is changed to the standard attribute.

At step S1908, the head portion of the document element is displayed in consonance with the determined display attribute. At step S1909, the contents of the document element are displayed in consonance with the determined display attribute. If, at step S1910, a document element appears in the displayed contents of the document element, at step S1911, the display process for that document element is performed again. As for the change of the display attribute, as is shown in FIG. 42, the background of a changed portion may be shaded with a different color, or for a display attribute that has a light standard color, the color of a changed portion may be altered so that it is darker. In addition, a rank is not given to the change of the display attribute, and such a binary display may be accepted wherein every updated portion is displayed inverted and the other portions are displayed in the standard manner.

When, at step S1912, the display of the contents of the document element is completed, at step S1411, the end portion of the document element is displayed, and at step S1412, the display attribute is returned to its original state. The document element display process is thereafter terminated.

In consonance with the combination of the state update time and style update time, and the user-by-user reference time, the display example shown in FIG. 45 can be provided. When additional data is written to a document, as is indicated by 1 in FIG. 43, the content of the document element, the document elements included in the content, and the contents of those document elements are all displayed as changed portions. When cut and paste is performed on the document element and its contents are changed, or when copy and paste is performed on the document element, the pasted document element, its contents, and the style update time data for the inserted document element are updated, so that the display is as indicated by 1 in FIG. 45. When cut and paste is performed on the document element, the update time data of both the pasted document element and the contents of the inserted document element are updated, and they are displayed as indicated by 3. When the character of the contents of a document element is changed without altering the structure of a document, i.e., when the style of a document element is changed, the contents of the changed document element are displayed as changed portions, as are indicated by 2, 4, and 5. When there are no changes performed, all the documents are displayed according to the standard as is indicated by 6.

A mechanism that designates updated data that a reader should confirm can be achieved by displaying the document in the above described manner.

When all the contents of the document are displayed at a step identical to step S1303, they are stored, as the reference time data 62 for a user who has displayed the current time, in the auxiliary storage device 6, and program control returns to the event loop. In this manner, the document display program 512 can be provided. Therefore, when a user refers to a document, the reference time is constantly maintained in the user-by-user reference time data. The user compares the user-by-user reference time data 62 with the state update time attribute and the style update time attribute, both of which are appended to a document element, so that, by the individual document structure unit, he can identify data that have been updated since he last referred to them. In this embodiment, different update time attributes, i.e., the state update time and the style update time, are given respectively to the document element and to the contents of the document element, so that a portion that has actually been changed can be easily identified.

In other words, since, in the changed document element or in the contents of the document element, document data that is not changed is displayed with the standard attribute, a changed portion and an unchanged portion can be distinguished. According to this embodiment, a document element that includes unknown data for each user and the contents of the document element can be designated in the document data group 61 wherein the document data have been updated since a user last referred to them and thus both known data and unknown data are included. Therefore, each user can easily acquire document data that must be confirmed. Especially, when there are no changes made to a daughter element that is included in a parent element whose contents have been changed, the fact that the daughter element has not been changed can be specified.

[Fourteenth Embodiment]

Although, in the above described embodiments, the contents of an inserted document element are regarded as unknown data, i.e., as data that a reader should confirm by updating, the contents of the document element are not limited to these. According to the fourteenth embodiment, a changed portion is designated by not changing the state update time attribute and the style update time attribute of all the elements in a document element when it is to be inserted.

The fourteenth embodiment of the present invention will now be explained while referring to the accompanying drawings.

The block diagram for this embodiment is the same as in FIG. 33 with the exception that the document change program 521 in FIG. 33 is changed to a document change program 522 (not shown). In this embodiment, a document is regarded as structured document data, as in FIG. 34, that has as its attributes the state update time data ST of a document element and the style update time data FT of the document element. The flowchart for the entire system in this embodiment is the same as in FIG. 36, with the exception that the document editing process step S903 is changed to another document editing process (not shown). When the system is activated by a user, the occurrence of an event is waited for in the same event loop as that at step S901. For a display event the same procedure is performed as in the twelfth embodiment. For the termination event, the same procedure is performed as in the twelfth embodiment. When editing is instructed, the document is changed. When an editing event has occurred, the process is the same as that which is performed in the flowchart in FIG. 37. At a step that is equivalent to step S1112 in FIG. 37, document data are edited by the individual document element unit following the flowchart as in FIG. 38. The differences from the twelfth embodiment are contained in the following steps.

When the insertion of a document element is performed at a step that is equivalent to step S1102, only the FT of the parent element that employs the inserted document element as its daughter element and the ST of the inserted document element are set to the current time (not shown). Thus, the update time attribute is changed as is shown in FIG. 44, and the display example shown in FIG. 47 can be provided through the display process that is the equivalent of the step S902 in FIG. 36. When additional data is written to a document, as is indicated by 1 in FIG. 43, the content of the document element, the document elements included in the content, and the contents of that document elements are all displayed as changed portions. When cut and paste or copy and paste is performed on the document element, only the state update time attribute of the pasted, target element, and the style update time attribute of the parent element of the target element are updated, so that they are displayed as indicated by 3 in FIG. 47. When only the character of the contents of the document element is changed without altering the structure of a document, the contents of the changed document element are displayed as changed portions, as are indicated by 2, 4, and 5. When there are no changes performed, all the documents are displayed in the standard manner, as indicated by 6. A mechanism that designates updated data that a reader should confirm can be achieved by displaying the document in the above described manner.

The document display program may be the same as that in the thirteenth embodiment. Through the above described processing, when a user refers to a document, the reference time is constantly maintained in the user-by-user reference time data 62. The user compares the user-by-user reference time data 62 with the state update time attribute and the style update time attribute, both of which are appended to a document element, so that, by the individual document structure unit, he can identify data that has been updated since he last referred to them. In this embodiment, different update time attributes, i.e., the state update time and the style update time, are given respectively to the document element and to the contents of the document element, so that a portion that has actually been changed can be easily identified. In other words, since, among the changed contents of the document element, the update time for document data that is not changed is not altered, a changed portion and an unchanged portion can be distinguished. According to this embodiment, a document element that includes unknown data for each user and the contents of the document element can be specified among the document data group 61 wherein the document data that has been updated since a user last referred to them, and thus both known data and unknown data are included. Therefore, each user can easily access document data that must be confirmed. Especially, when a document element is inserted whose contents are not changed and which is known data, the fact that the contents of the element has not been changed can be specified.

[Fifteenth Embodiment]

Although, in the above described embodiment, the contents of a parent element, which has an inserted document element as its daughter element, is changed and is regarded as data that a reader should confirm by updating, the contents of the parent element are not limited to these. According to the fifteenth embodiment, a changed portion is specified by not changing the style update time attribute of a parent element that has an inserted element as its daughter element when that element is inserted. The block diagram for this embodiment is the same as in FIG. 33 with the exception that the document change program 521 in FIG. 33 is changed to a document change program 523 (not shown). In this embodiment, a document is regarded as structured document data, as in FIG. 34, that has as its attributes the state update time data ST of a document element and the style update time data FT of the document element.

The flowchart for the entire system in this embodiment is the same as in FIG. 36, with the exception that the document editing process step S903 is changed to another document editing process (not shown). When the system is activated by a user, the occurrence of an event is waited for in the same event loop as that at step S901. When a display is instructed, the same procedure is performed as in the thirteenth embodiment. When editing is instructed, the document is changed. When termination is instructed, the system is inactivated. When an editing event has occurred, the editing process is the same as that which is performed in the flowchart in FIG. 37.

Figure 48:
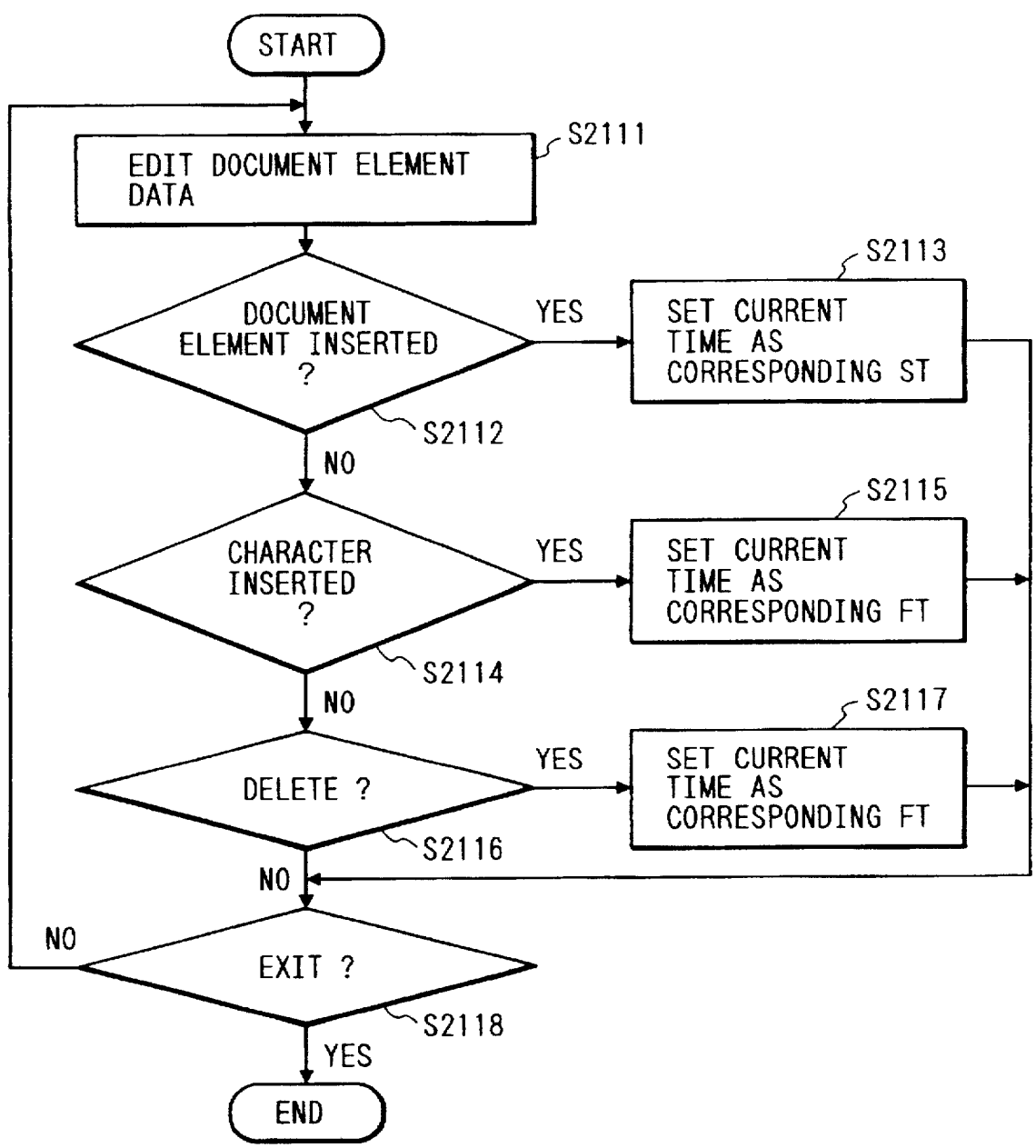
FIG. 48 is a flowchart showing document element edit processing according to a fifteenth embodiment of the present invention.

At a step that is the equivalent of step S1112 in FIG. 37, document data are edited by the individual document element unit following the flowchart as in FIG. 48.

At step S2111, document data are edited by the individual content unit of a document element. When, at step S2112, a document element is inserted, at step S2113, the state update time attribute of the inserted document element is set to the current time. If, at step S2114, the inserted document element is determined to be a character, the contents of the parent element that has as its daughter element the inserted character have been changed. At step S2115, the style update time attribute of the parent element is set to the current time. If, at step S2116, it is determined that a deletion has been performed, the contents of the parent element that has as its daughter element the deleted element have been changed. At step S2117, the style update time attribute of the parent element is set to the current time. The insertion and deletion of a character may be performed by the individual character row unit. Steps S2111, S2112, S2114, and S2116 in the document editing process do not have to be performed in order. As long as the update time attributes of the document element and of the contents of the document element are updated to the current time as the editing of a document is performed, an event driven process may be performed instead.

Through the above described procedures, the update time attribute is changed as is shown in FIG. 49. When the editing for all the documents is completed, at step S2118 the document element editing process is terminated. When a display event has occurred, the same process is performed as in the thirteenth embodiment to provide the display example shown in FIG. 52. When additional data is written to a document, the contents of a document element, the document elements included in the contents, and the contents of all those document elements are displayed as changed portions, as is indicated by 1. When only a character in the contents of the document element is changed, without changing the structure of a document, only the contents of the document elements that have been changed are displayed as changed portions, as are indicated by 2, 4, and 6. When a document element (new-elem) is inserted into the contents in the document element, the document element is displayed as is indicated by 3 for a case where the contents of a parent document element that has as its daughter element the inserted document element are changed, as indicated by 5 for the case where the contents of the inserted document element is changed, or as indicated by 7 for the case where there is no change aside from insertion. The case indicated by 7 is when merely a document element from another document element is inserted. When there is no change, all the documents are displayed in the standard manner as is indicated by 8.

A mechanism that clearly shows the previously specified data that a reader desires to see for updating can be achieved by displaying the document in the above described manner. At this time, the document elements that are so displayed that they have been changed are all inserted. The document display program may be the equivalent of that in the twelfth embodiment. Through the above described processing, when a user refers to a document, the reference time is constantly maintained in the user-by-user reference time data. The user compares the user-by-user reference time data 62 with the state update time attribute and the style update time attribute, both of which are appended to a document element, so that, by employing the document structure by the unit, he can identify data that has been updated since he last referred to them. In this embodiment, different update time attributes, i.e., the state update time and the style update time, are given respectively to the document element and the contents of the document element, so that a portion that has actually been changed can be easily identified.

In other words, an inserted document element can be specified by assuming there is no change in the contents of a parent element that has as its daughter element the inserted document element. According to this embodiment, a document element that includes unknown data for each user and the contents of the document element can be designated in the document data group 61 wherein the document data have been updated since a user last referred to them and thus both known data and unknown data are included. Therefore, each user can easily access document data that must be confirmed. Especially, for a document element that is inserted by cut and paste or copy and paste, its insertion can be clearly expressed. In other words, the change in the structure can be easily identified.

[Sixteenth Embodiment]

While, in the fifteenth embodiment, cut and paste and copy and paste are employed without distinguishing them, in this embodiment, cut and copy are distinguished. An explanation will now be given where cut and paste is employed for the moving of data, and copy and paste is employed for the addition of unknown data. The block diagram for this embodiment is the same as in FIG. 33 with the exception that the document change program 521 in FIG. 33 is changed to a document change program 523 (not shown). In this embodiment, a document is regarded as structured document data, as in FIG. 34, that has as its attributes the state update time data ST of a document element and the style update time data FT of the document element.

The flowchart for the entire system in this embodiment is the same as FIG. 36, with the exception that the document editing process step S903 is changed to another document editing process (not shown). When the system is activated by a user, the occurrence of an event is waited for in the same event loop as that at step S901. When a display is instructed, the same procedure is performed as in the thirteenth embodiment. When termination is instructed, the system is inactivated. When an editing event has occurred, the editing process is the same as that which is performed in the flowchart in FIG. 37.

Figure 50:
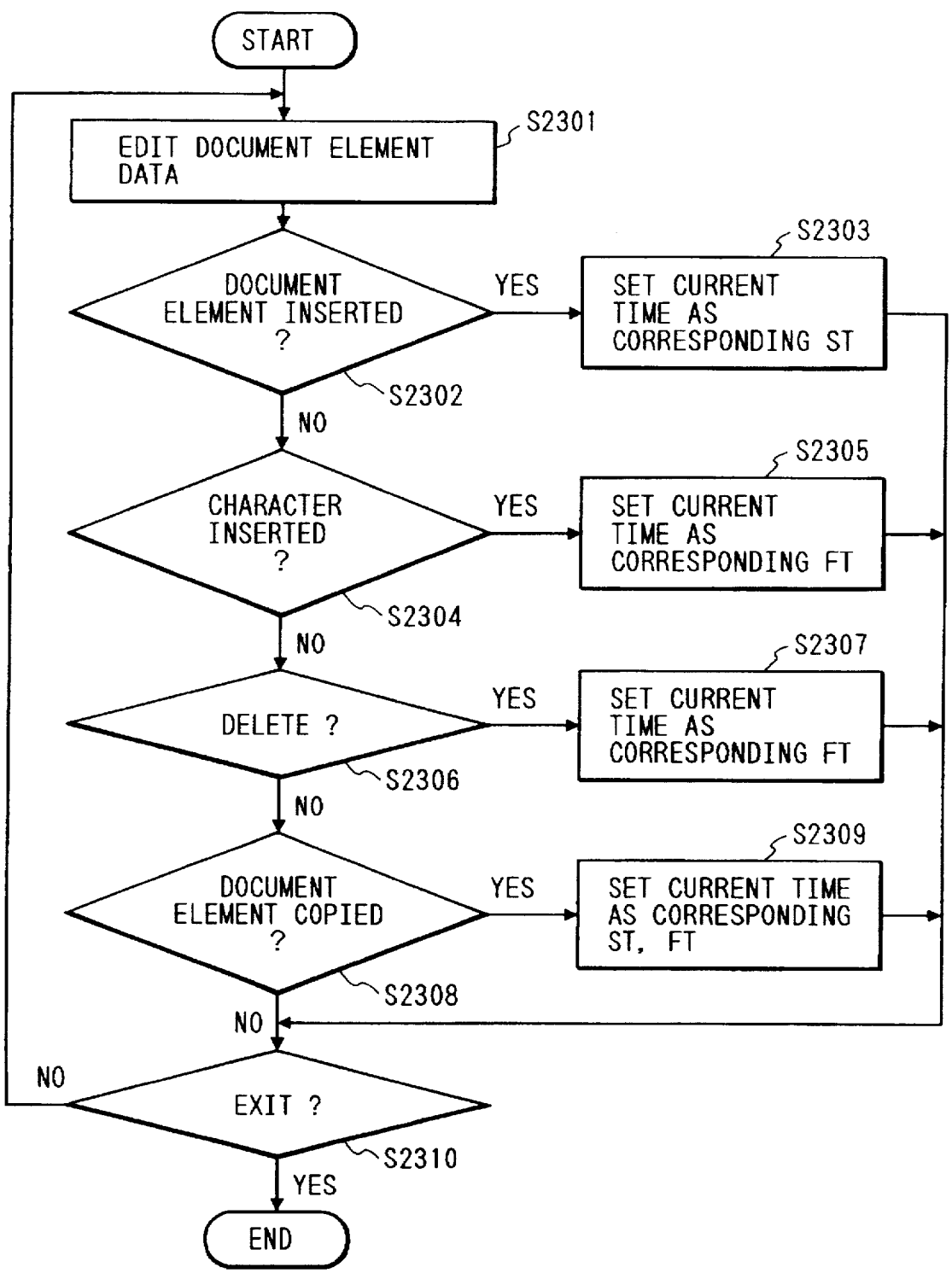
FIG. 50 is a flowchart showing document element edit processing according to a sixteenth embodiment of the present invention.

At a step that is the equivalent of step S1112 in FIG. 37, document data is edited by the individual document element unit following the flowchart as in FIG. 50.

At step S2301, document data are edited by the individual content unit of a document element. When, at step S2302, a document element is inserted from, for example, a cut buffer, at step S2303, the state update time attribute of the inserted document element is set to the current time. If, at step S2304, the inserted document element is determined to be a character, the contents of the parent element that has as its daughter element the inserted character have been changed. At step S2305, the style update time attribute of the parent element is set to the current time. If, at step S2306, it is determined that a deletion has been performed, the contents of the parent element that has as its daughter element the deleted element have been changed. At step S2307, the style update time attribute of the parent element is set to the current time. At this time, the deleted element is stored in the cut buffer without changing all the state update time attributes and the style update time attributes that are included in the deleted element. When, at step S2308, the document element is copied, all the state update time attributes and the style update time attributes of the copied element are set to the current time, and are stored in the cut buffer. The insertion and deletion of a character may be performed by the individual character row unit. Steps S2301, S2302, S2304, and S2306 in the document editing process do not have to be performed in order. As long as the update time attributes of the document element and of the contents of the document element are updated to the current time as the editing of a document is performed, an event driven process may be performed instead. Through the above described procedures, the update time attribute is changed as is shown in FIG. 51. When the editing for all the documents is completed, at step S2310 the document element editing process is terminated.

When a display event has occurred, the same process is performed as in the thirteenth embodiment to provide the display example shown in FIG. 52. In this embodiment, the display example in FIG. 52 provides the following meaning. When additional data is written to a document, the contents of a document element, the document elements included in the contents, and the contents of all those document elements are displayed as changed portions, as is indicated by 1. When only a character in the contents of the document element is changed without changing the structure of a document, only the contents of the document elements that have been changed are displayed as changed portions, as are indicated by 2, 4, and 6. When a document element (new-elem) is inserted into the contents in the document element and when cut and paste is performed on the inserted document element, i.e., when the document element is moved, the head portion and the end portion of the inserted document element are displayed as indicated by 3 and 7, and the contents of the document element are displayed in the standard manner. The 3 denotes a case where the contents of a parent element that has as its daughter element the inserted element are also changed. When the document element (new-elem) is inserted into the contents of a document element by performing copy and paste, or when the contents of the inserted document element are changed, such a case is displayed as is indicated by 1 or 3. At this time, 1 denotes a case where the contents of a parent element that has as its daughter element the inserted document element are also changed. When there is no change, all the documents are displayed in the standard manner as is indicated by 8.

A mechanism that specifies updated data that a reader should confirm can be achieved by displaying the document in the above described manner. At this time, if the document element that is so displayed that it has been changed includes unchanged contents, it is determined that the document element was simply moved. Through the above described processing, the user-by-user reference time is constantly maintained. The user compares the user-by-user reference time data 62 with the state update time attribute, which indicates the time a document element has been inserted, and the style update time attribute, which indicates the time the document element of the contents has been deleted or the time a character has been inserted, so that he can identify, by the individual document structure unit, data that have been updated since he last referred to them. In addition, a document element that has actually been inserted and a document element that is moved are easily identified. Especially when the contents of an inserted document element are not so displayed as to indicate they have been updated, it is apparent that the element has merely been moved.. According to this embodiment, a document element that includes unknown data and the contents of the document element can be specified for each user in the document data group 61 wherein the document data have been updated since a user last referred to them and thus both known data and unknown data are included. Therefore, each user can easily access document data that must be confirmed. Especially, for a document element that has been inserted by cut and paste or copy and paste, its insertion can be clearly expressed. In other words, the change in the structure is easily identified. Especially the moving of a document element can be clearly identified by varying how all the update time attributes in the contents of a document element are changed, depending on whether the changes is for a cut process or a copy process.

[Seventeenth Embodiment]

Figure 6:
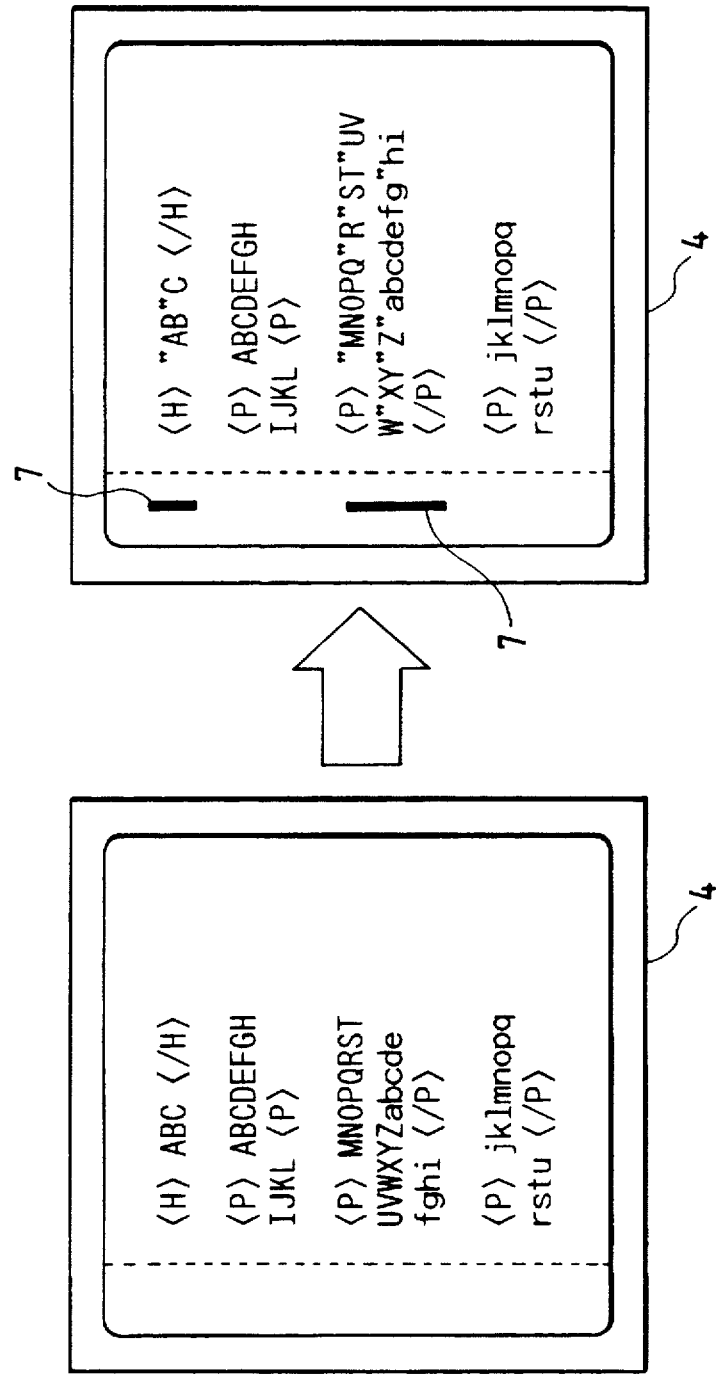
FIG. 6 is a diagram showing one example of a conventional document display after it is changed.
Figure 53:
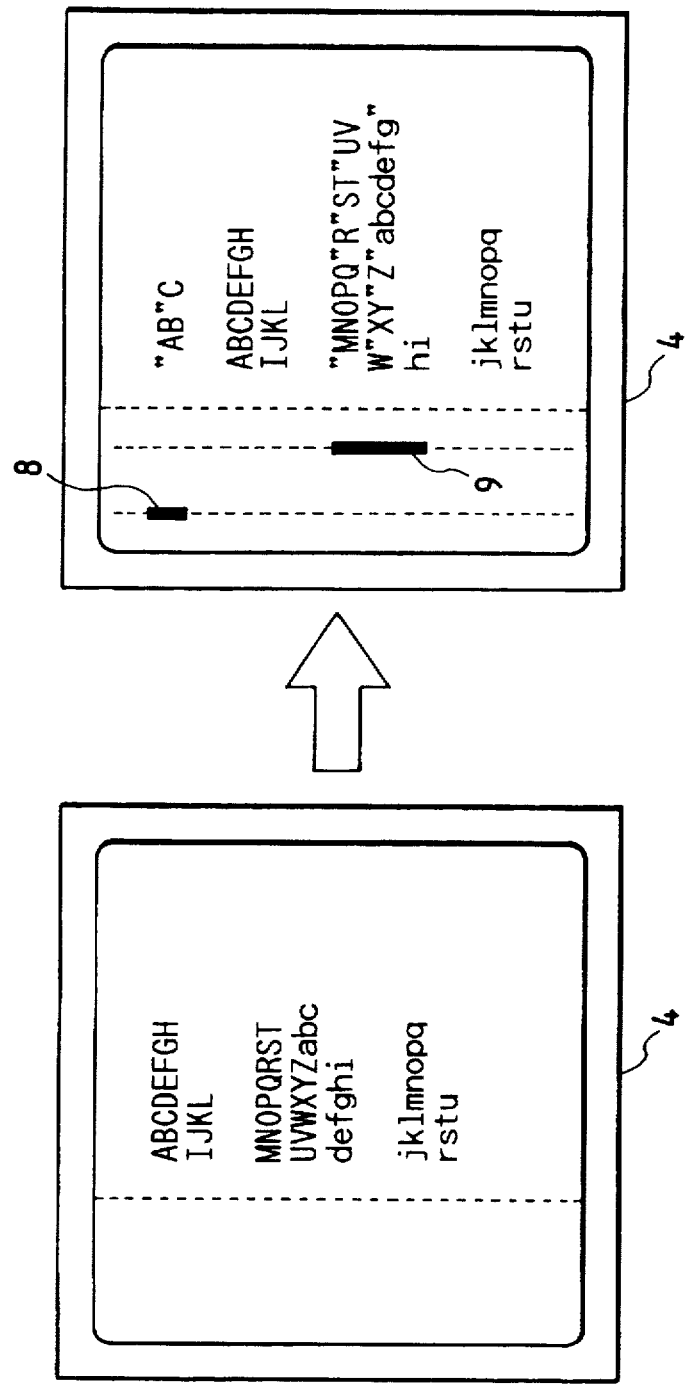
FIG. 53 is a diagram showing one display example of an altered portion according to a seventeenth embodiment of the present invention.
Figure 56:
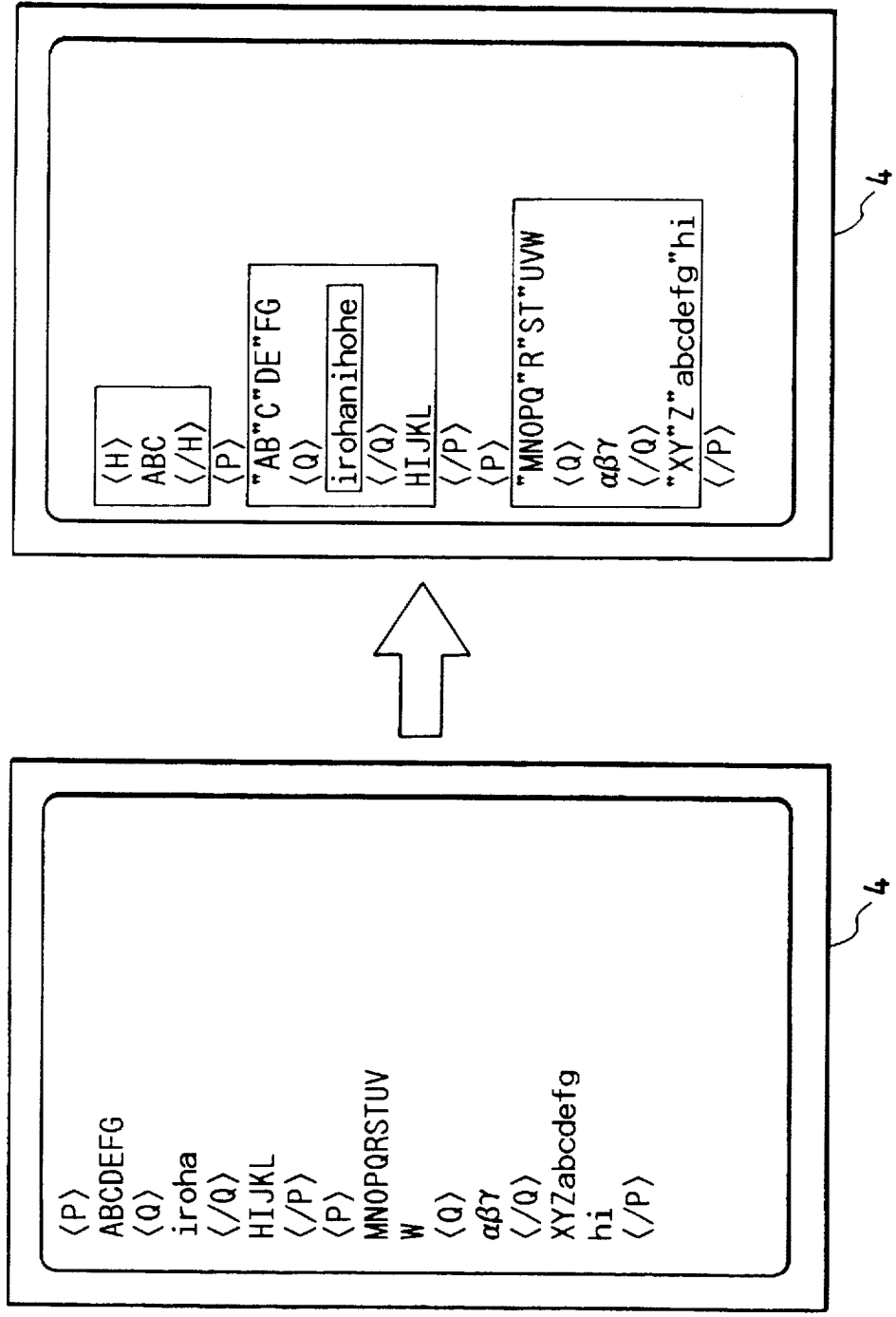
FIG. 56 is a diagram showing a further display example of an altered portion according to the seventeenth embodiment of the present invention.

Although, in the above embodiments, a different color shade is employed to highlight a change of a display attribute, other methods may also be employed. As is shown in FIG. 6, a black line that designates a change is displayed near a changed display attribute. Further, as is shown in FIG. 53, when the tag of a document element is not displayed, two lines, the one denoted by 8 for a document element and the other denoted by 9 for the contents of a document element, may be employed to designate a change. When a nested structure is employed and a plurality of changes are made at different nested levels, as is shown in FIGS. 54 and 55, the weight of a line, the width of a line, or the number of lines may be changed in consonance with the overlapping of the changes of the display attributes for the displayed changed portions. At this time, it is assumed that the contents of a document element is nested one level deeper than a document element, so that a document element with no display of a tag can be handled. In addition, as is shown in FIG. 56, the tag of a changed document element and the changed contents of the document element may be displayed enclosed in modified rectangles. By changing the display attribute using one of the above described methods, a document element that includes unknown data for each user and the contents of the document element can be specified in the document data group 61 wherein the document data have been updated since a user last referred to them and thus both known data and unknown data are included. Therefore, each user can easily access desired document data that must be confirmed.

According to the present invention, it is possible to recognize known data and unknown data by specifying which data in a current document have been changed since they were last referred to. Therefore, each user can acquire, in the form of a document, the latest data that he desires. Since a document element and the updated data of the contents of the document data are distinguished, and the corresponding state update time attribute and the style update time attribute are provided, whether or not a change has been made is easily determined. Further, when a daughter element is not changed even though the contents of its parent element are changed, the fact that there is no change in the daughter element can be clearly expressed. In addition, when an element is inserted and when its contents are unchanged and are known data, this fact concerning the contents of the element can be specified. Moreover, for a document element that has been inserted by performing cut and paste or copy and paste, the type of insertion can be identified. Further, the shifting of a document element can be specified by varying how all the update time attributes in the contents of a document element are altered, depending on whether a cut process or a copy process has been performed. A change in the structure is easily identified, and a changed portion can be clearly designated.

[Eighteenth Embodiment]

The eighteenth embodiment will now be described while referring to the accompanying drawings.

Figure 57:
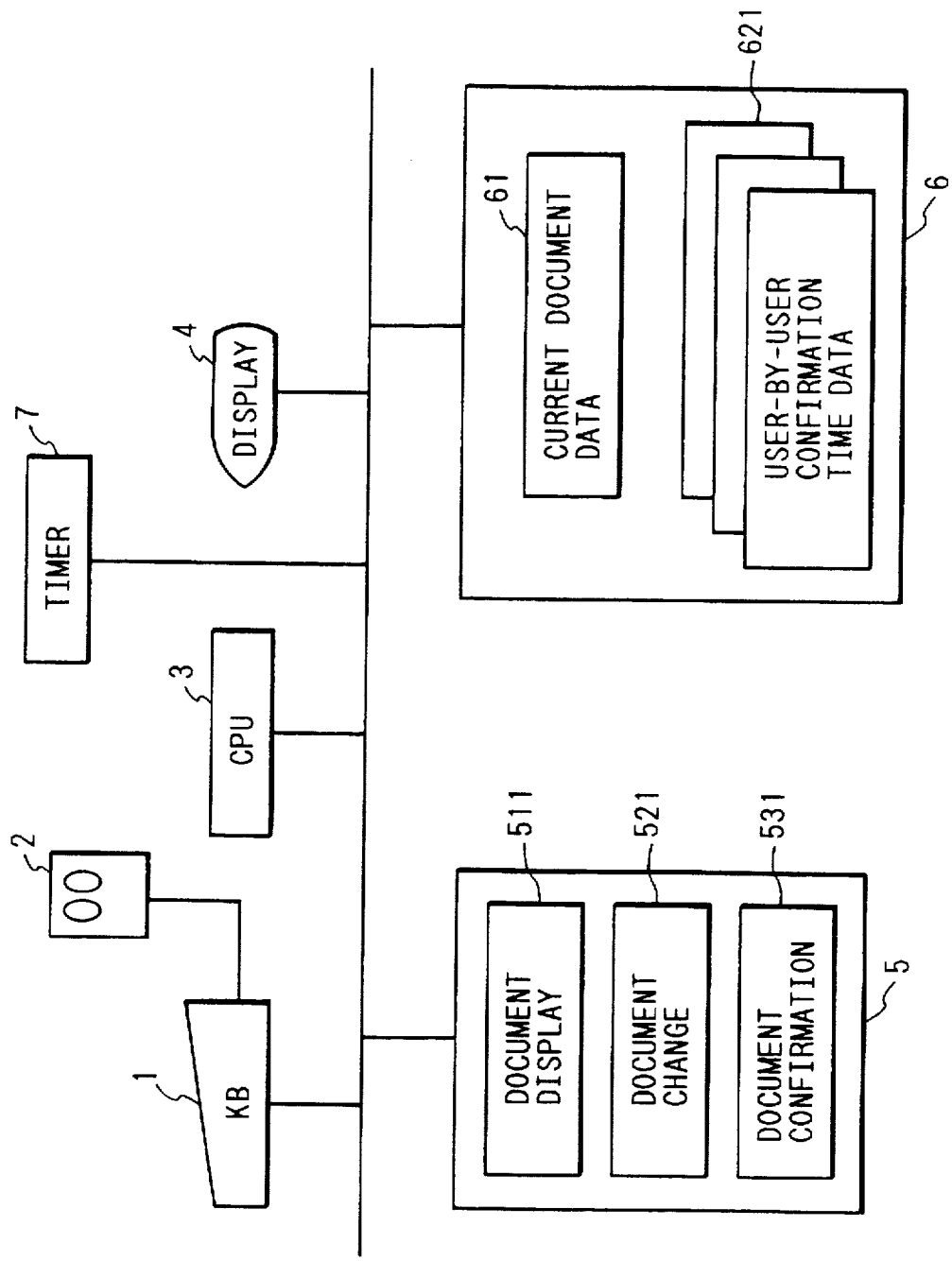
FIG. 57 is a block diagram illustrating the arrangement of a document processing apparatus according to an eighteenth embodiment of the present invention.

FIG. 57 is a schematic block diagram illustrating the arrangement of a document processing apparatus according to this embodiment of the present invention. An explanation will not be given for the components that correspond to or are identical to those in FIG. 1.

As is shown in FIG. 57, a document display program 511, a document change program 521, and a document confirmation program 531 are stored in a memory 5. Current document data 61 and user-by-user confirmation time data 621 are stored in an auxiliary storage device 6.

Figures 58, 59:
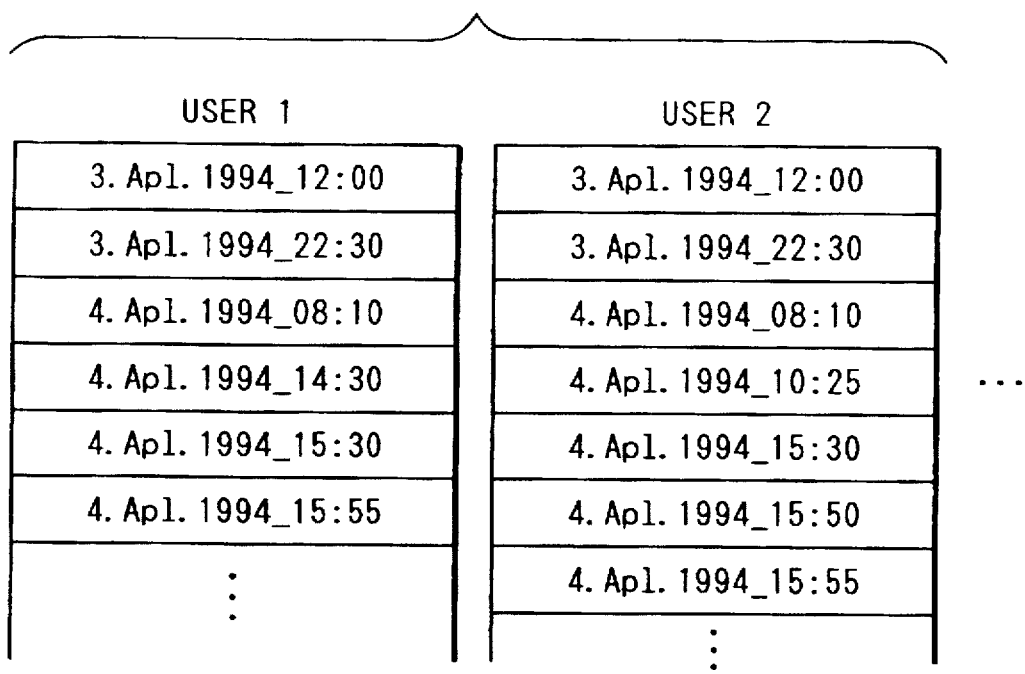
FIG. 58 is a diagram showing one example of structured document data that includes update time data according to the eighteenth embodiment of the present invention.
FIG. 59 is a diagram showing one example for the confirmation time data for each user according to the eighteenth embodiment of the present invention.

In this embodiment, as is shown in FIG. 58, a document is regarded as structured document data that consists of document elements that have update time Time as an attribute. For each user, the user-by-user confirmation time data 621 maintains, in the form shown in FIG. 59, document update time that has been confirmed. The confirmed document update time is the time of the update time attribute Time for a document element that has been confirmed. In this embodiment, it is presumed that there are no identical update times in the update time attributes of a document element.

Figure 60:
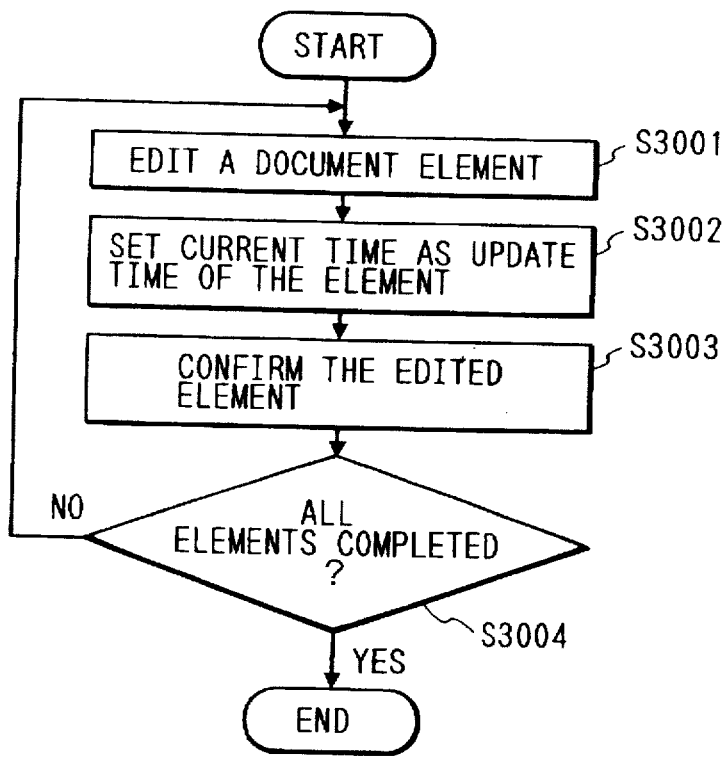
FIG. 60 is a flowchart showing document element edit processing according to the eighteenth embodiment of the present invention.

The flowchart for the entire system of this embodiment is shown in FIG. 36. When the system is activated by a user, the occurrence of an event is waited for in the event loop at step S901. When a display is instructed, at step S902 a document is displayed. When editing is instructed, a document is changed at step S903. When termination is instructed, the system is inactivated. When an editing event has occurred, the editing process is performed following the flowchart in FIG. 37. The processing will now be described. At step S1111, the current document data 61 is extracted from the auxiliary storage device 6. The document editing process at step S1121 is performed following the flowchart in FIG. 60. The editing process will now be explained. At step S3001, document data is edited by the individual document element unit. At step S3002, the update time attribute Time for the updated document element is set to the current time as the update time for the document element. Since the editing of the document is equivalent to the confirmation of the document element, at step S3003, a document confirmation process is performed. As was previously described, in this embodiment, the same time is not accepted as the update time where the document was edited. This can be achieved by using the time display that is obtained by addition from a specific date in the UNIX system.

Figure 61:
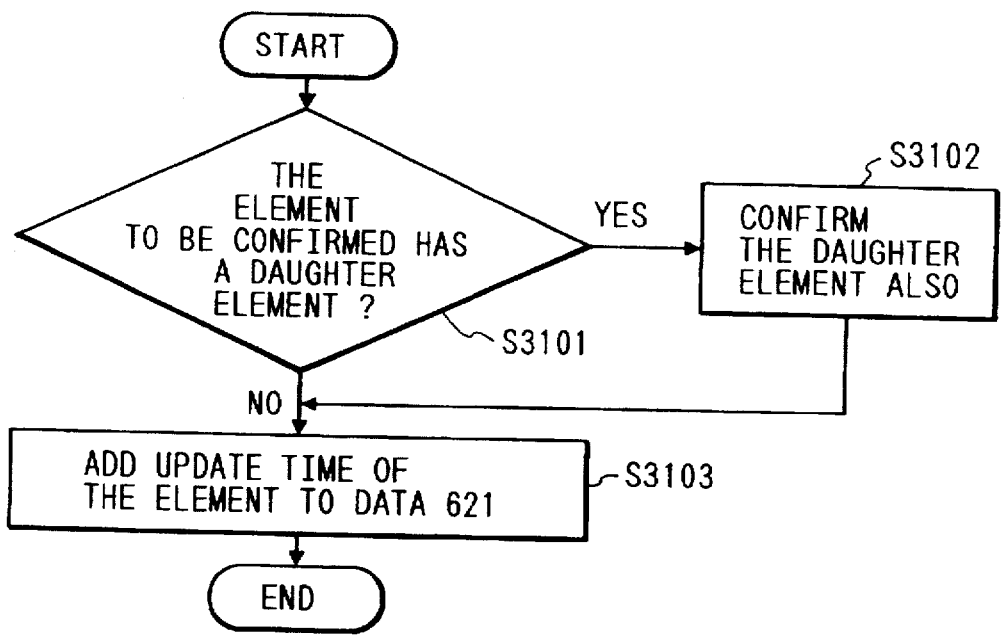
FIG. 61 is a flowchart showing document confirmation processing according to the eighteenth embodiment of the present invention.

The document confirmation process is performed following the flowchart in FIG. 61. When, at step S3101, the confirmed document element has its daughter element, it is assumed that the daughter element is also confirmed. At step S3102, the document confirmation process is performed again on the daughter element. At step S3103, the update time of the update time attribute Time for the confirmed document element is added to a table in the user-by-user confirmation time data 621. When the time that is indicated by the update time attribute is already present in the user-by-user confirmation time data 621, that update time need not be added to the user-by-user confirmation time data 621. In this manner, the document confirmation program 531 is accomplished. When, at step S3004, the editing for all the document elements has been completed, the document element editing process is terminated. The document that has been edited is held as the current document data 61 at step S1113. The current document data 61 may be held each time the document element is edited at step S1112.

Figure 62:
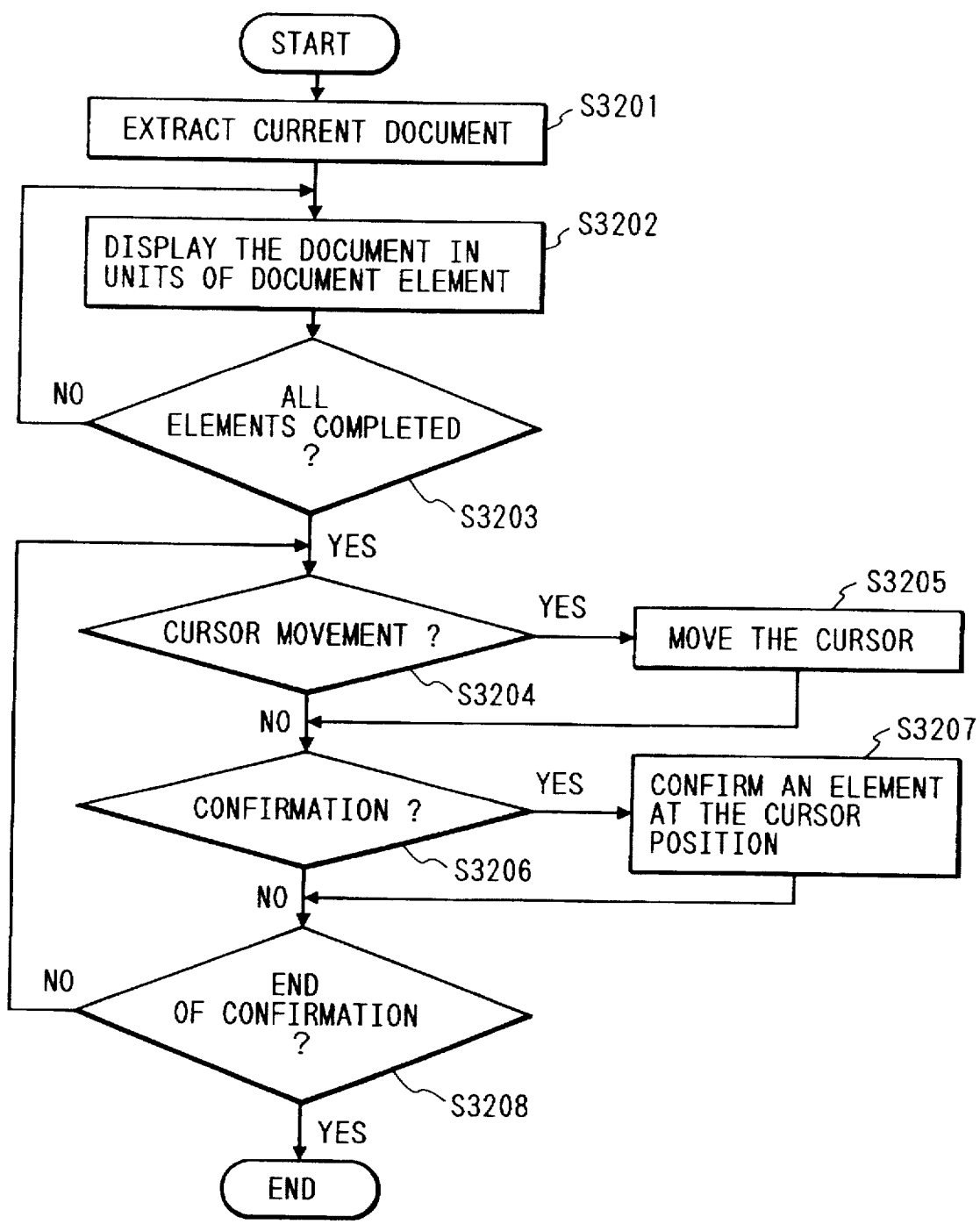
FIG. 62 is a flowchart showing document display processing according to the eighteenth embodiment of the present invention.
Figure 63:
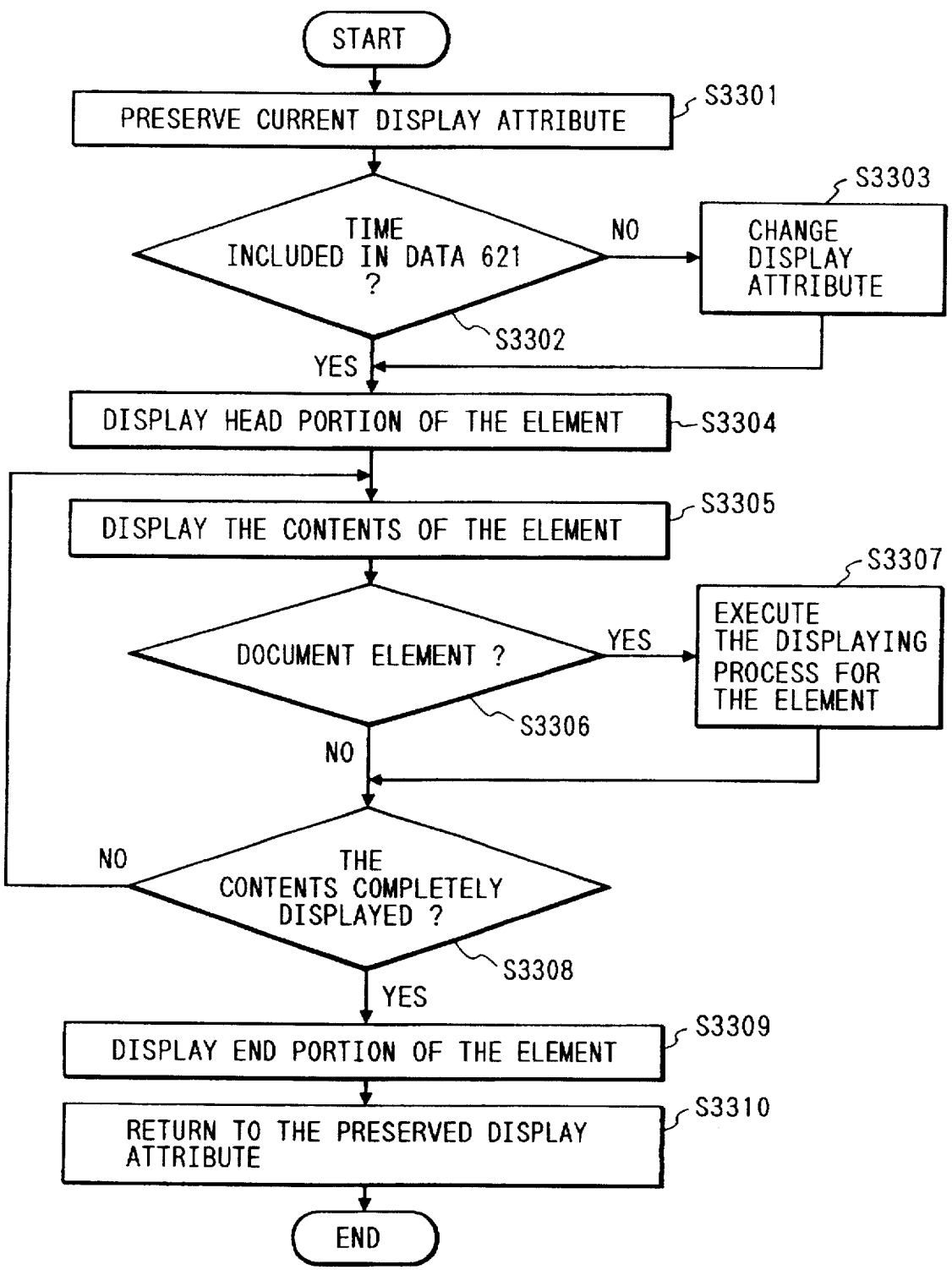
FIG. 63 is a flowchart showing document element display processing according to the eighteenth embodiment of the present invention.
Figure 64:
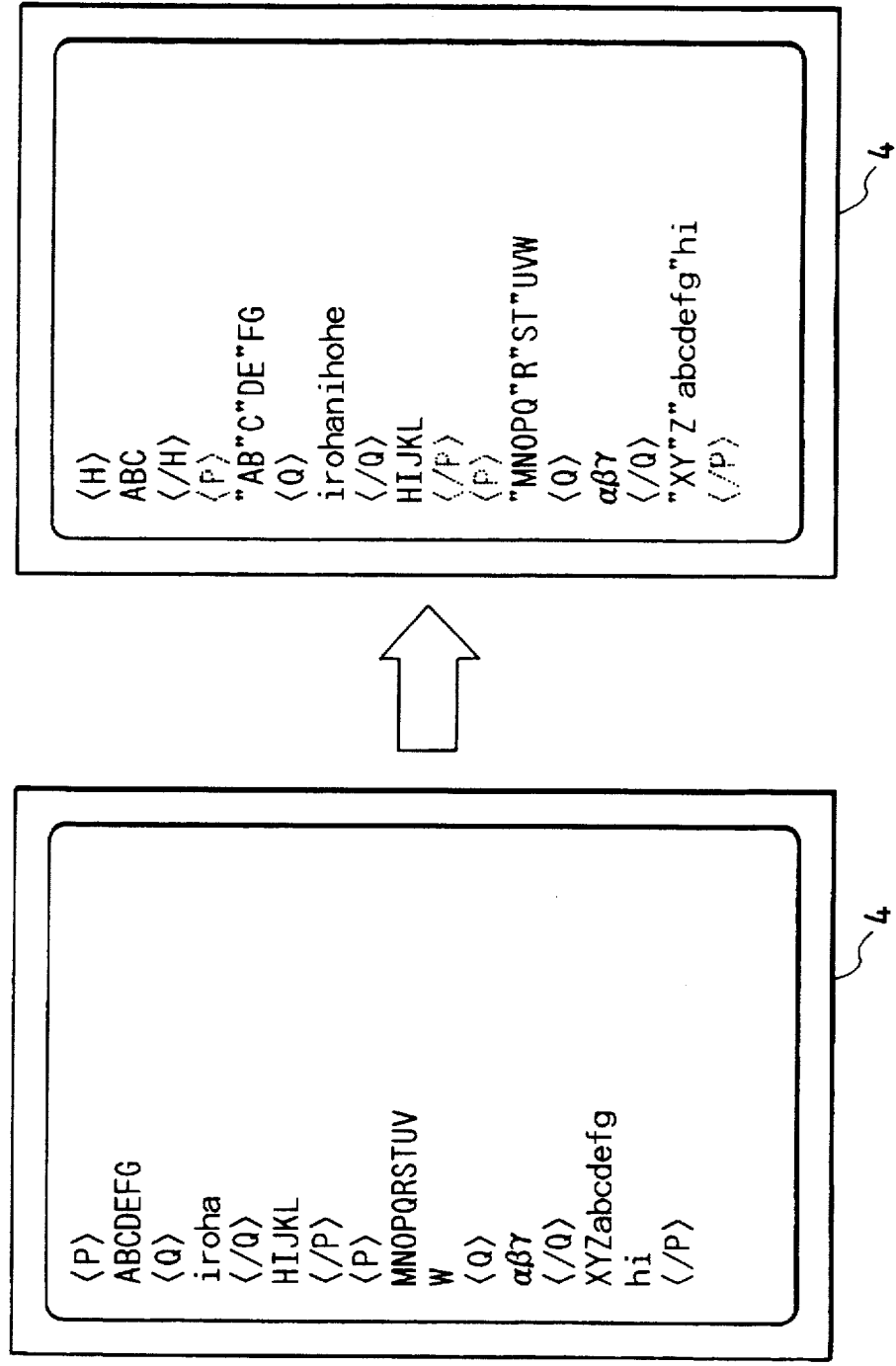
FIG. 64 is a diagram showing one display example of a changed portion according to the eighteenth embodiment of the present invention.

The display at step S902 in FIG. 36 will be explained following the flowchart in FIG. 62. When a display of a document is instructed, the current document data 61 is extracted from the auxiliary storage device 6 at step S3201. At step S3202, the document is displayed on the display device 4 in consonance with the structure for each document element. The document element display process will now be described while referring to the flowchart in FIG. 63. First, at step S3301, the current display attribute is saved. At step S3302, when the time of the update time attribute Time for the document element is not included in the confirmation time data 621 for a user who is currently to display a document, it is assumed that the updating of the document element has not yet been confirmed. Therefore, at step S3303, the display attribute of a document element is changed. As the change for the display attribute, as is shown in FIG. 64, a changed portion is shaded, for example, and the color is changed, or the color of the display attribute is changed so that it is thicker while the standard is determined to be a thin color. At step S3304, the head portion of the document element is displayed in consonance with the determined display attribute. At step S3305, the contents of the document element is displayed. When, at step S3306, it is found that there is a document element in the contents, at step S3307, the document element display process is performed again. The contents are displayed until the end. When, at step S3308, it is determined that the contents have been displayed, at step S3309 the end portion of the document element is displayed. Finally, program control goes to step S3310 to return to the display attribute that has been saved. The document element display process is thereafter terminated. The document element display process is repeated until the display of all the document elements in the document has been completed at step S3203.

Figures 65, 66:
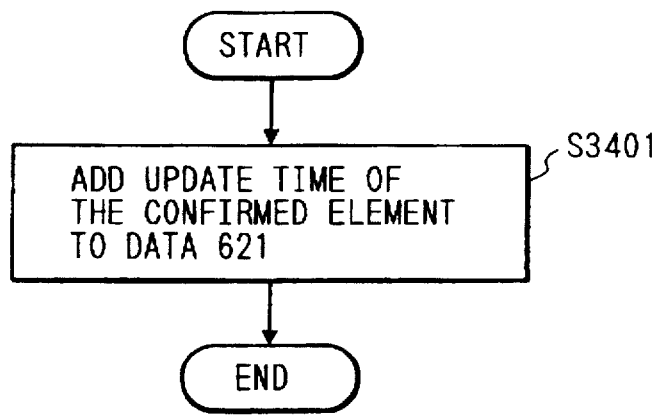
FIG. 65 is a diagram showing a document display example according to the eighteenth embodiment of the present invention.
FIG. 66 is a flowchart showing document confirmation processing according to a nineteenth embodiment of the present invention.

Through the above process, the display example as is shown in FIG. 65 can be provided.

When, at step S3204, a conventional pointer, such as a cursor or a mouse, for designating a position is determined to have been moved, the pointer is moved at step S3205. If, at step S3206, a confirmation process is required by clicking a mouse button or by selecting a button on the screen in the conventional manner, at step S3207, a confirmation process for a document element is performed to verify the location of a pointer for designating the current position of a cursor. This confirmation process is the same as that in FIG. 61 in this embodiment. When the confirmation process is terminated at step S3208, the document display process is thereafter terminated and program control returns to the event loop.

The document display program 511 can be accomplished in this manner. The display process for a document element may be performed each time the document element is confirmed. Therefore, when a user has confirmed a document element, user-by-user confirmation data is maintained in the user-by-user confirmation time data 621. Each user examines whether or not the update time of the update time attribute Time for the document element is entered in the user-by-user confirmation time data 621 and can recognize unconfirmed data by the document element unit. Although this embodiment is accomplished by performing event driven processing, the event driven processes may be replaced by independent programs that use document data in common. Further, while the display program and the editing program are separately employed in this embodiment, a program that includes both a display process and an editing process may be employed as an editing program and the display program may be eliminated. According to this embodiment, it is possible to extract unconfirmed user-by-user data from a document by the document element unit and to recognize it. Therefore, each user can obtain document data that need to be confirmed. In addition, no matter how many times the entire document is displayed, an unconfirmed document element is maintained as unconfirmed until the confirmation process has been performed for it.

[Nineteenth Embodiment]

Although, in the eighteenth embodiment, it is assumed that a daughter element of a document element is also confirmed when the document element has been confirmed, another case may be employed. In the nineteenth embodiment, an explanation is given of a case where only a designated document element is confirmed and its daughter element is separately confirmed. The embodiment of the present invention will now be described while referring to the accompanying drawings. In the block diagram for this embodiment, the document confirmation program 531 in FIG. 57 is replaced by another document confirmation program 532 (not shown). A document in this embodiment is the same as in FIG. 58 in the eighteenth embodiment. The flowchart for the entire system in this embodiment is the same as that in FIG. 36. When the display of a document is instructed, the same process is performed as in the eighteenth embodiment. When editing is instructed, the same process is performed as in the eighteenth embodiment.

When termination is instructed, the system is inactivated. When the document confirmation process is to be performed during the display process or during the editing process, the flowchart in FIG. 66 is employed. At step S3401, only the update time that is included in the update time attribute Time of a confirmed document element is added to a table in the user-by-user confirmation time data 621. That is, even when the confirmed document element has a daughter element, it is not assumed that the daughter element is also confirmed. In this case, the daughter element that has as its parent element the confirmed document element must be separately confirmed. When the update time is added to the table, the time indicated by the update time attribute Time is already entered in the user-by-user confirmation time data, that update time need not to be added to the user-by-user confirmation time data. In this manner, the document confirmation program 532 can be accomplished. When there is a document element, such as a mixed content in SGML, by using the document confirmation program 532, a daughter element that has as a parent a confirmed element is distinguished from a character row that is actually the content of the parent element, and both of them can be confirmed. The document confirmation process is easy.

[Twentieth Embodiment]

Figures 67, 69:
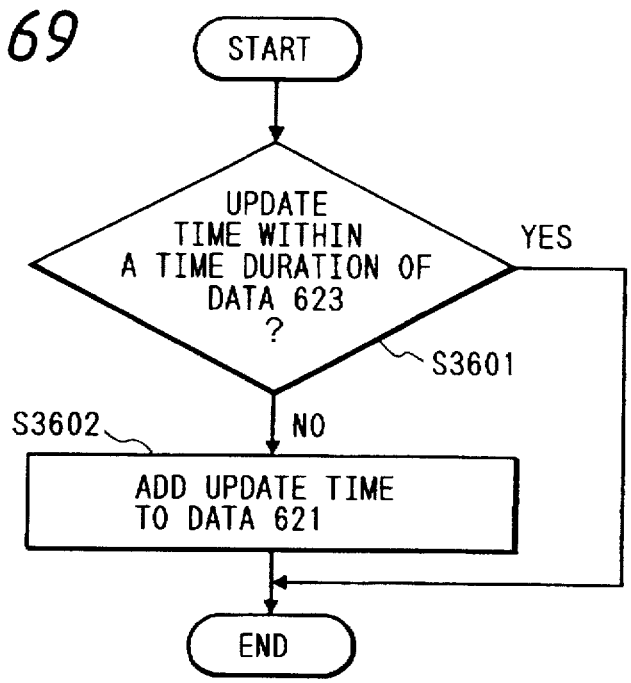
FIG. 67 is a diagram showing one example of document element confirmation time information for each user according to a twentieth embodiment of the present invention.
FIG. 69 is a flowchart showing document confirmation processing according to the twentieth embodiment of the present invention.
Figure 68:
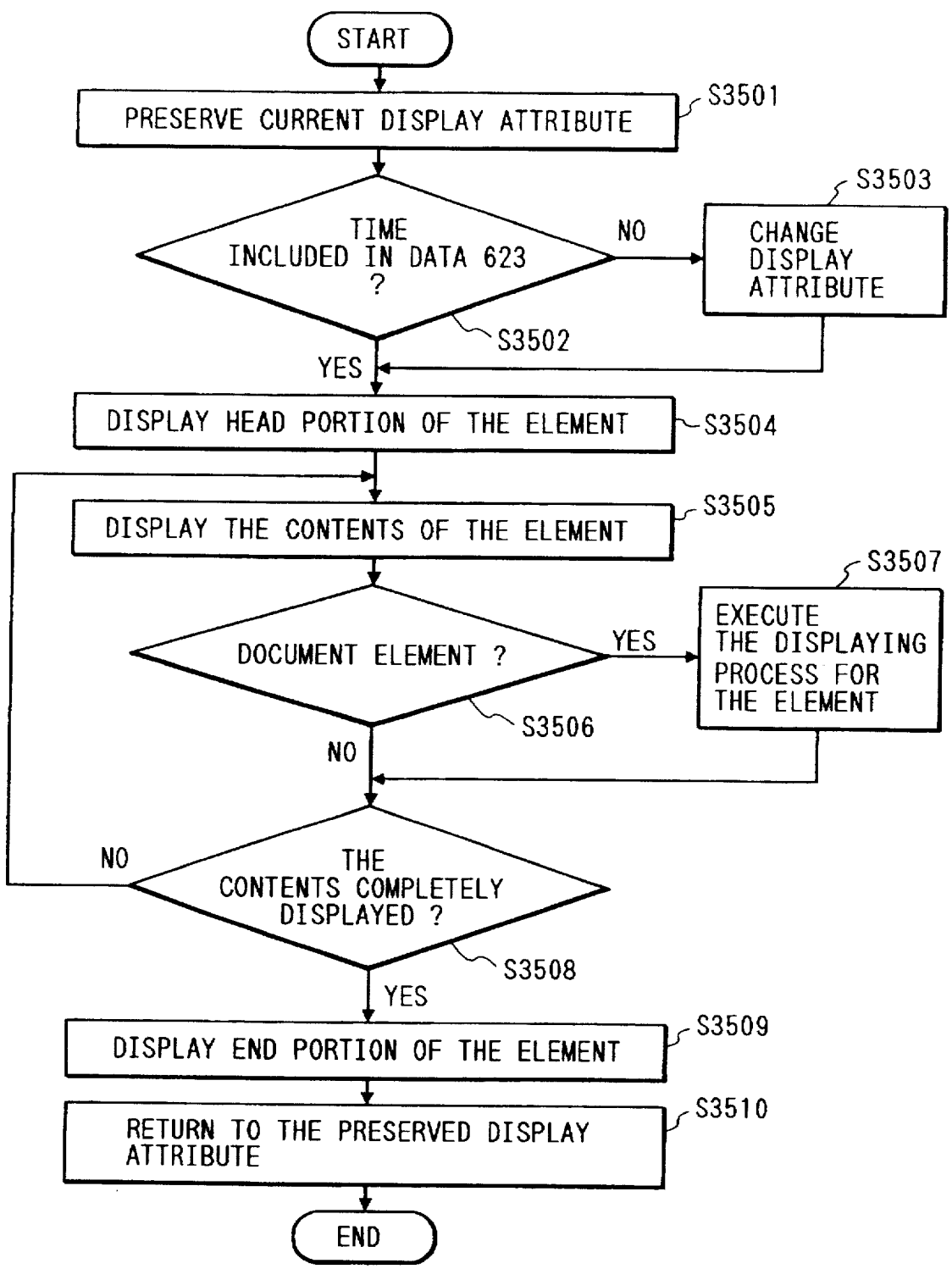
FIG. 68 is a flowchart for document element display processing according to the twentieth embodiment of the present invention.
Figure 70:
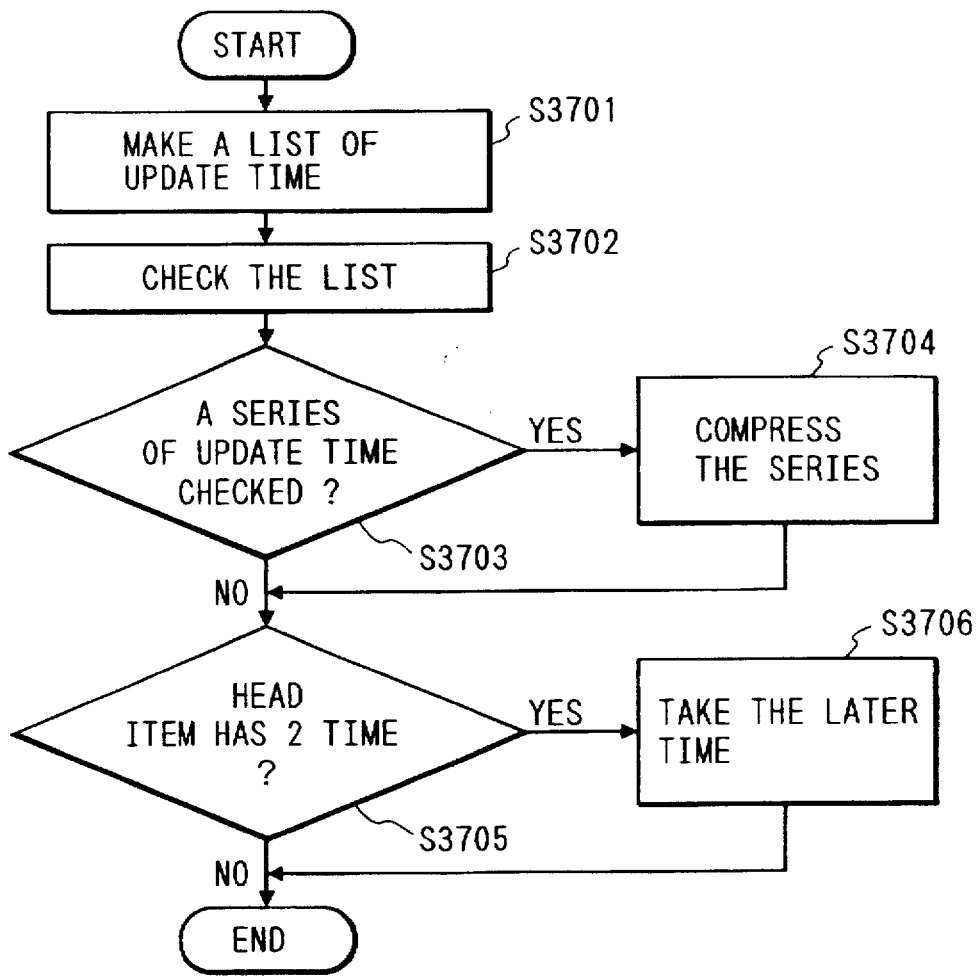
FIG. 70 is a flowchart showing confirmed information compression processing according to a twenty-first embodiment of the present invention.

Although, in the eighteenth and nineteenth embodiments, all the confirmation times that a user confirmed in the past are added to the user-by-user confirmation time data 621, the other process may be employed. In the twentieth embodiment, an explanation is given for a case where confirmation time data that are earlier than a certain time are deleted when the updating of the documents at the certain time and before has been confirmed. Also, an explanation will be given for a case where confirmation data are compressed by using a range of time between two times when the update times Time in the document data that exist between the two times have all been confirmed. This embodiment will now be described while referring to the accompanying drawings. In the block diagram for this embodiment, the document display program 511 in FIG. 57 is replaced by another document display program 513, the document confirmation program 531 is replaced by another document confirmation program 533, and a confirmation information compression program 543 is additionally stored in the memory 5 (not shown). In addition, the user-by-user confirmation time data 621 is changed to user-by-user confirmation time data 623. For each user, the user-by-user confirmation time data 623 maintains document update times that have been confirmed in ascending order in the form as is shown in FIG. 67. When there are two different times in a column, a time duration between the two times, i.e., the time range, is shown. When there is only one time in the column, that time is shown. It should be noted that, when a time is entered in the first column, it indicates that the time that was entered before it has been confirmed. A document that is employed for this embodiment is the same as is shown in FIG. 58 in the eighteenth embodiment. The flowchart for the entire system in this embodiment is the same as the flowchart in FIG. 36. When a display is instructed, a document is displayed. When editing is instructed, the same process is performed as in the eighteenth embodiment. When termination is instructed, the system is inactivated. When a display event has occurred, the same process is performed as is shown in FIG. 62. The document element display process at a step that is the equivalent of step S3202 will now be explained while referring to the flowchart in FIG. 68. First, at step S3501, the current display attribute is saved. When the time in the update time attribute Time of a document element is included in the confirmation time data 623 for a user that is to currently display a document, i.e., when, at step S3502, it is determined that the time of the update time attribute Time is entered in the user-by-user confirmation time data 623, or is included within the range that is delimited by the two times or in the range lying before the time in the head column, an updating event does not occur and program control moves to step S3504 for a display. If it is not included, it is assumed that the updating of that document element has not yet been confirmed. At step S3503, the display attribute of the document element is changed. The changing of the display attribute is performed in the same manner as in the eighteenth embodiment. Then, at step S3504, the head of the document element is displayed in consonance with the determined display attribute. At step S3505, the contents of the document element are displayed. If, at step S3506, it is determined that there is a document element included in the contents, at step S3507, the document element display process is performed again for that element. The contents of a document continue to be displayed until the last of the contents has been displayed. When the end of the contents is reached at step S3508, the end portion of the document element is displayed at step S3509. Finally, program control goes to step S3510 to return to the saved display attribute, and the document element display process is thereafter terminated. The display example through the above process is as is shown in FIG. 65 for the eighteenth embodiment. The flowchart in FIG. 69 is employed for the document confirmation process when it is performed during the display process or the editing process. When, at step S3601, the update time that is included in the update time attribute Time of a confirmed document element is not within the confirmation time range of the user-by-user confirmation time data 623, at step S3602, that update time is added to the table of the user-by-user confirmation time data 623. In this manner, the document confirmation program 533 can be provided. To inactivate the system, according to the flowchart in FIG. 70, the user-by-user confirmation data 623 is compressed. First, the current document data 61 is read in, and a list of the update times Time of the individual current document elements are prepared in the form shown in FIG. 71 by sorting them according to the order of the update times at step S3701. When each update time entered in the Time list table is within the range of the confirmation time for the user-by-user confirmation time data 623, at step S3702, a mark for confirmation is entered in the column in the Time list table. If, at step S3703, a series of confirmation marks exist in a plurality of columns in the list of the update times Time of the current document elements, at step S3704, the user-by-user confirmation time data 623 is so restructured that the earliest update time and the latest update time are paired in the column where a series of confirmation marks are entered, and each update time in a single column wherein a confirmation mark is a discontinuous entry. When, at step S3705, the two different times are entered in a column where the earliest update time is entered, at step S3706, only the latest time is left in the column. In this manner, the confirmation data compression program 543 can be provided. In this embodiment, the user-by-user confirmation time data 623 is handled as a table that has two different times in a column. The user-by-user confirmation time data may be achieved in a table that has only one time in a column. In this case, only the confirmation data before the time in the head column are compressed. The memory required for confirmation time data that must be saved for each user can be reduced by using the document confirmation program 533 and the confirmation data compression program 543.

[Twenty-first Embodiment]

Figure 38:
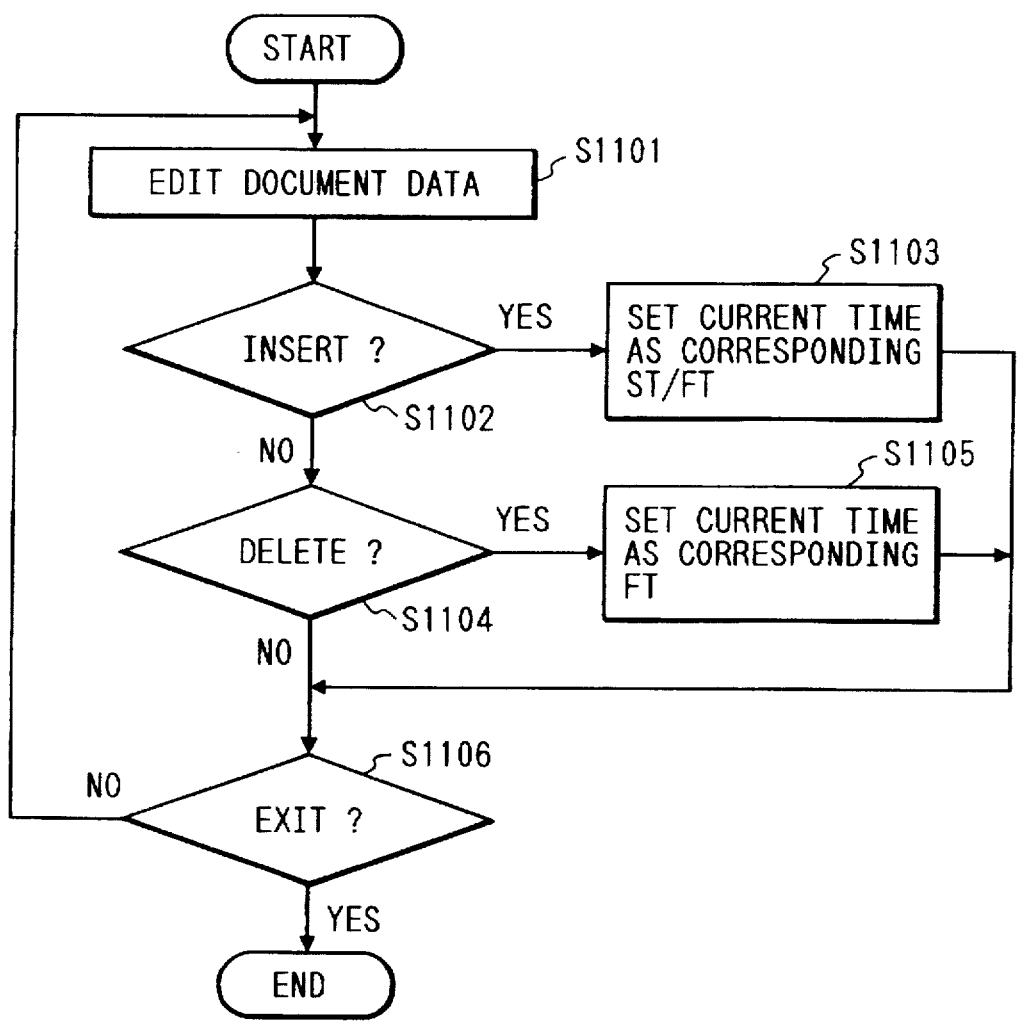
FIG. 38 is a flowchart showing processing for editing document elements performed by the document processing apparatus according to the twelfth embodiment of the present invention.
Figure 74:
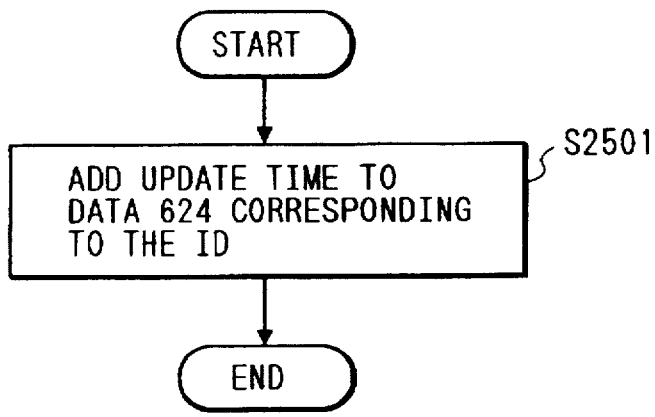
FIG. 74 is a flowchart showing document confirmation processing according to the twenty-second embodiment of the present invention.
Figure 73:
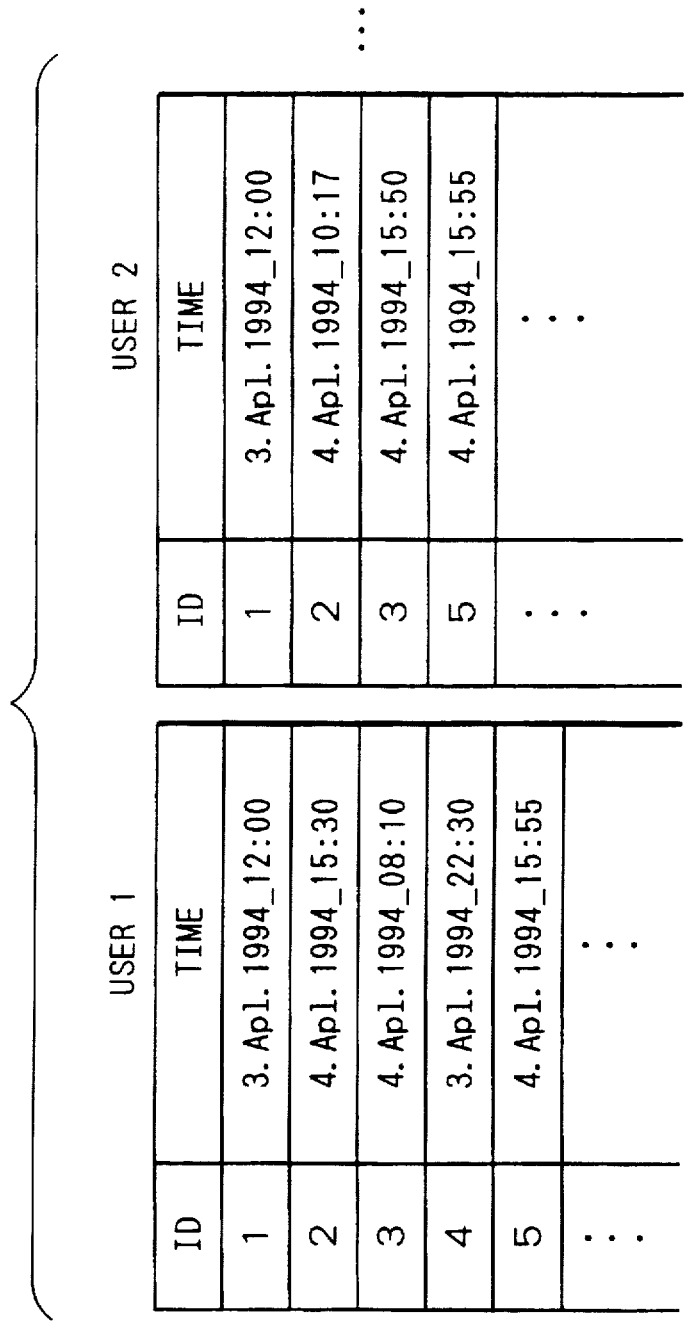
FIG. 73 is a diagram showing one example of document element confirmation time information for each user according to a twenty-second embodiment of the present invention.
Figure 75:
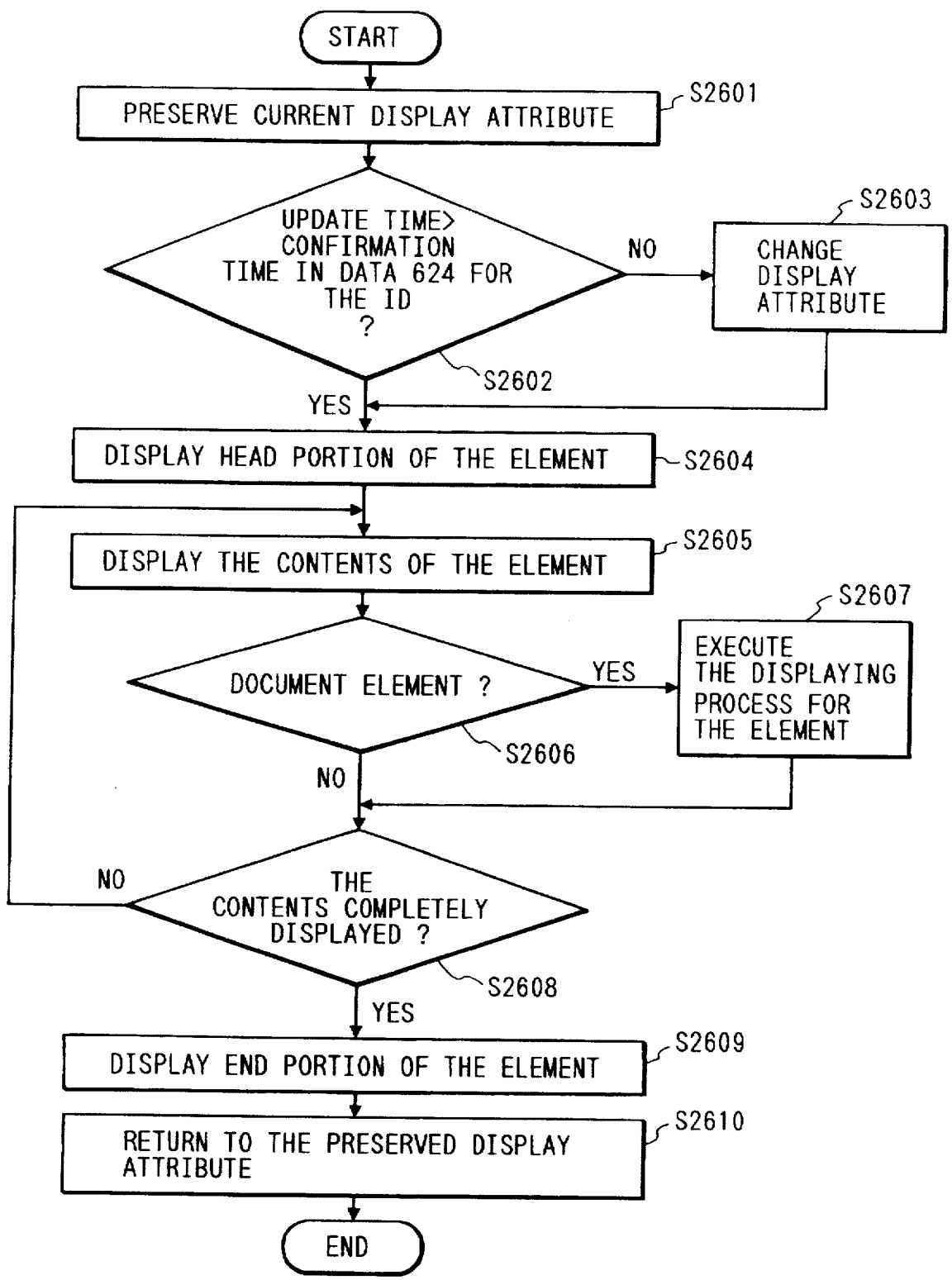
FIG. 75 is a flowchart showing document element display processing according to the twenty-second embodiment of the present invention.

Although, in the eighteenth, nineteenth, and twentieth embodiments, only the update time is stored as confirmation data for each user in the auxiliary storage device 6, another method may be employed. In the twenty-first embodiment, document update data and user confirmation data are maintained by using the ID of a document element and the update time attribute of the document element. This embodiment will now be described while referring to the accompanying drawings. In the block diagram for this embodiment, the document display program 511 in FIG. 57 is replaced by another document display program 514, and the document confirmation program 531 is replaced by another document confirmation program 534 (not shown). In addition, the user-by-user confirmation time data 621 is changed to user-by-user document element confirmation data 624. In this embodiment, as is shown in FIG. 72, a document is regarded as structured document data that has, as attributes, a unique ID that is added to a document element and the update time data Time of the document element. For each user, the user-by-user document element confirmation data 624 holds, in the form shown in FIG. 73, a data set comprising an ID of a document element that has been confirmed and the update time of that document element. According to this embodiment, a data set comprising, for example, a document element ID and a counter or a comment, which is the update data of the document element, is held in the user-by-user document element confirmation data 624. In the flowchart for the entire system of this embodiment, the document display process at step S902 in FIG. 36 is replaced by another document display process (not shown). When the system is activated by a user, the occurrence of an event is waited for in the event loop that is the equivalent of that at step S901. When a display is instructed, a document is displayed. When editing is instructed, the document is changed. When termination is instructed, the system is inactivated. When an editing event has occurred, the same process is performed as shown in the flowchart in FIG. 37. In a process that is the equivalent of step S1112, the document is edited. For the document editing process, the same process is performed as shown in FIG. 38. At a step that is the equivalent of step S3001, document data is edited by the individual document element unit. When a new document element is generated by insertion, the ID column for that element is added to the user-by-user document element confirmation data 624. Since the performance of the editing is equivalent to the confirmation of the document element, at a step that is the equivalent of step S3003, the confirmation process for a document element is performed following the flowchart in FIG. 74. The confirmation process will now be explained. At step S2501, the update time Time that is included in the document element that is to be confirmed is also entered in a column that corresponds to the ID of the document element in the table of the user-by-user document element confirmation data 624. When a new document element is generated by insertion, the update (generation) time of the document element is entered, as the document element confirmation time, in the column of the user-by-user document element confirmation data 624 that corresponds to the ID of the inserted document element. In this manner, the document confirmation program 534 is accomplished. When all the editing has been completed, at a step that is the equivalent of step S3004, the document element editing process is terminated. The difference from the eighteenth embodiment is that, in the document confirmation process in FIG. 74, the data that is stored includes not only time data but also a data set comprising the ID and the update time data of a document element. When a display has occurred, the same process is performed as in the flowchart in FIG. 62. At a step that is the equivalent of step S3202, the document element display process is performed following the flowchart in FIG. 75. The procedure that is performed at step S2602 is different between the flowchart in FIG. 63 and the flowchart in FIG. 75. If, at step S3302, the time of the update time attribute Time for a document element is determined to be later than the confirmation time in the corresponding ID column in the document element confirmation data 624 for a user who is currently to display a document, it is assumed that the updating of the document element has not yet been confirmed. At step S2603, the display attribute of the document element is changed. Through the above described process, the display example as is shown in FIG. 65 can be acquired. In this case, the ID of a document element, the state update time attribute, and the style update time attribute constitute a set of update data. When, at a step that is the equivalent of step S3206, a confirmation process is instructed by the clicking of a mouse or by the selection of a button on the screen as is performed conventionally, at a step that is the equivalent of step S3207, the document confirmation process is performed. At this time, as in the nineteenth embodiment, only the update time attribute of a document element where a cursor is currently positioned may be set in the user-by-user document element confirmation time history data. In this case, the confirmation process must be separately performed for a daughter element that has as a parent the confirmed document element. When the ID of the confirmed document element exists in the user-by-user document element confirmation time history data, it is assumed that the column is to be overwritten. In this manner, the document display program 514 can be provided. For the user-by-user document element confirmation data 624, confirmation data for an ID that has been deleted and thus is not present in the current document 61 can be ignored. More specifically, since an ID is not present in the current document 61 even though it was confirmed before it was deleted, the ID is not employed for the display even if the update data remains in the user-by-user document element confirmation data 624. When the ID was not confirmed before it was deleted, it does not exist in the current document 61, and thus the update data is not registered in the user-by-user document element confirmation data 624. To delete a document element, the column of the user-by-user document element confirmation data 624 that corresponds to the target ID may be deleted. The document display process may be performed each time the document element is confirmed. Through this processing, when a user confirms a document element, confirmation data is constantly maintained for each user in the user-by-user document element confirmation data 624. Thus, by comparing the document element confirmation time, which has an ID that is identical to the document element, with the update time attribute Time of the document element, a user can identify data that he has not confirmed by the individual document element unit. Although this embodiment is achieved by performing event driven processing, the event driven processes may be replaced by independent programs that use document data in common. Further, although the display program and the editing program are separately employed in this embodiment, a program that includes the display process and the editing process may be used as an editing program and a display program may be eliminated. According to this embodiment, it is possible that unconfirmed data for each user will be extracted from a document by the individual document element unit and be recognized. Therefore, each user can easily access document data that should be confirmed. In addition, even if the entire document is displayed many times, the fact that the document element is unconfirmed is specified until the confirmation process is performed on that document element. Since a unique ID is provided for each document element and the update data is monitored for each ID, the update history data to be managed can be limited to the number of the document elements that were present in the past.

[Twenty-second Embodiment]

Although, in the twenty-first embodiment, the update time data for all the document elements are maintained as confirmation data for each user, another method may be employed. According to the twenty-second embodiment, confirmation data for each user is compressed and held by using the structure of a structured document, and the memory required for confirmation data to be saved is reduced. When an unconfirmed portion is produced by updating, data indicating that effect is recovered for the confirmation data for each user. This embodiment will now be described while referring to the accompanying drawings. In the block diagram for this embodiment, the document display program 511 in FIG. 57 is replaced by another document display program 515, the document editing program 521 is replaced by another document editing program 525, and the document confirmation program 531 is replaced by another document confirmation program 535 (not shown). In addition, the user-by-user confirmation time data 621 is changed to user-by-user document element confirmation data 625. In this embodiment as well as in the twenty-first embodiment, as is shown in FIG. 72, a document is regarded as structured document data that has, as attributes, a unique ID that is added to a document element and the update time data Time of the document element. For each user, the user-by-user document element confirmation data 625 as well as in the twenty-first embodiment holds a data set comprising an ID of a document element that has been confirmed and the update time of that document element. However, the update time is not held for all the document elements. That is, when the structured document is regarded as a tree structure, only confirmation data that is acquired by removing branches for the confirmed elements is held (which will be described in detail later). In the flowchart for the entire system of this embodiment, the document editing process at step S903 in FIG. 36 is changed to another document editing process, and the document display process at step S902 is replaced by another document display process (not shown). When the system is activated by a user, the occurrence of an event is waited for in the event loop that is the equivalent of that at step S901. When a display is instructed, a document is displayed. When editing is instructed, the document is changed. When termination is instructed, the system is inactivated. When an editing event has occurred, the same process is performed as shown in the flowchart in FIG. 37. In a process that is the equivalent of step S1112 in the eighteenth embodiment, the document is edited. At a step that is the equivalent of step S3001, document data is edited by the individual document element unit. When a new document element is generated by insertion, the ID column for that element is added to the user-by-user document element confirmation data 625. Since the performance of the editing is the equivalent of the confirmation of the document element, at a step that is the equivalent to step S3003, the confirmation process for a document element is performed. The confirmation process will be explained while referring to the flowchart in FIG. 76. When, at step S2701, it is determined that a confirmed document element has a daughter element, it is assumed that, since the parent element is confirmed, the daughter element is also confirmed. At step S2702, the confirmation process for that daughter element is performed. The confirmation process for a daughter element will now be explained while referring to the flowchart in FIG. 77. When, at step S2801, the daughter element to be confirmed has a granddaughter element (a daughter's daughter), at step S2802 it is assumed that the granddaughter element is also confirmed. The daughter element confirmation process is performed again for the granddaughter element. Then, at step S2803, data that correspond to the ID of the granddaughter element (the daughter's daughter) are deleted from the user-by-user document element confirmation data 625. The daughter element confirmation process is performed in this manner. At the end of the confirmation process, at step S2703, the time of the update time attribute Time for the document element that is confirmed is entered in the column, of the table of the user-by-user document element confirmation data 625, that corresponds to the ID of the document element. Through the above described processing, confirmation time data in the partial structure that has as a parent a confirmed document element is cut off, and the user-by-user document element confirmation data 625 is stored in the auxiliary storage device 6. When the editing of all the document elements is completed, the document element editing process is thereafter terminated at a step that is the equivalent of step S3004. When a display event has occurred, the same process is performed as is shown in FIG. 62. The document element display process at a step that is the equivalent of step S3202 will be explained while referring to the flowchart in FIG. 78. First, the current display attribute is saved at step S2901. When there is user-by-user document element confirmation data 625 for the ID of a corresponding document element and when, at step S2902, the time of the update time attribute of the document element is later than the confirmation time of the document element confirmation data 625 for a user who is currently to display a document, it is assumed that the updating of the document element has not yet been confirmed. Then, at step S2903, the display attribute of the document element is changed. When there is no user-by-user document element confirmation data 625 for the ID of a corresponding document element, or when the time of the update time attribute of the document element is earlier than the confirmation time of the document element confirmation data for a user who is currently to display a document, it is assumed that the document element has been confirmed. Program control thus advances to step S2905 for display. The change of the display attribute is the same as in the eighteenth embodiment. Since there is a possibility that a daughter element that has as a parent an unconfirmed document element is also unconfirmed, the restructure process for the user-by-user document element confirmation data 625 is performed at step S2904. The restructure process of the user-by-user document element confirmation data 625 will now be described following the flowchart in FIG. 79. First, at step S3801, the contents of a target document element are read in. When a daughter element that is included in the contents has as a parent the document element, and when, at step S3802, the update time attribute Time of the daughter element is later than the document element confirmation time of the parent element, at step S3803, the column that corresponds to the ID of the daughter element is added to the user-by-user document element confirmation data 625, while a time that is the same as the document element confirmation time of the parent element is entered in the confirmation time column of the daughter element. Following this, at step S3804, the restructure process for the user-by-user document element confirmation data 625 is performed again on the included daughter element. When, at step S3805, the contents of the document element have been read, the restructure process for the user-by-user confirmation data 625 is terminated. Then, at step S2905, the head portion of the document element is displayed in consonance with the determined display attribute. At step S2906, the contents of the document element are displayed. If, at step S2907, it is determined that a document element is included in the contents, at step S2908, the document element display process is performed again. The contents continue to be displayed at step S2909 until the last of the contents have been displayed. When, at step S2909, the contents have been displayed, at step S2910, the end portion of the document element is displayed. Finally, program control moves to step S2911 to return to the display attribute that has been saved. The document element display process is thereafter terminated.

Figure 76:
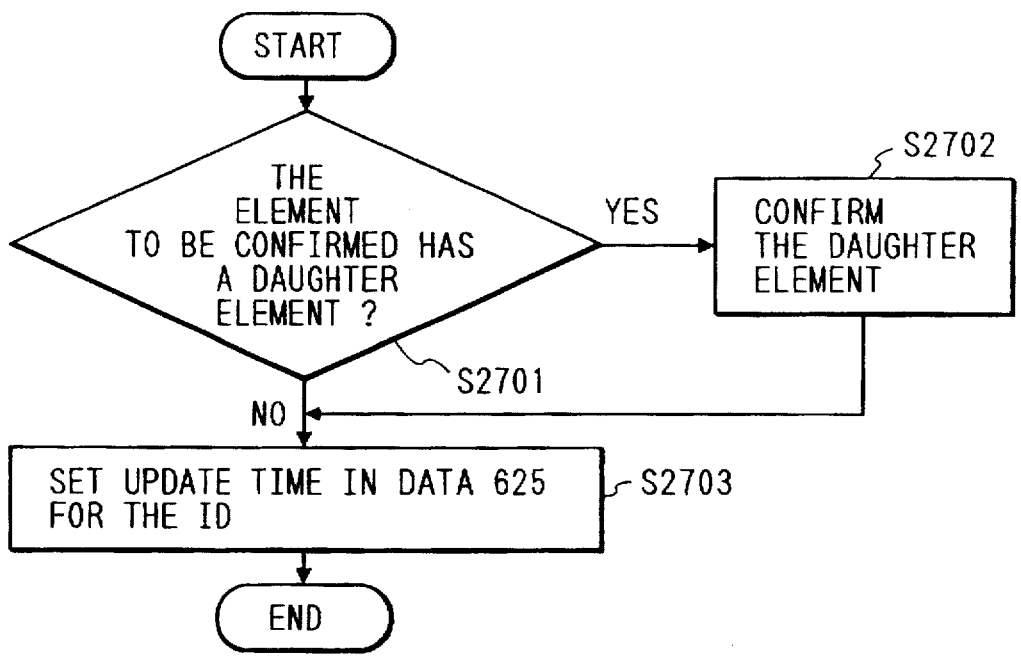
FIG. 76 is a flowchart showing document element confirmation processing according to a twenty-third embodiment of the present invention.
Figure 77:
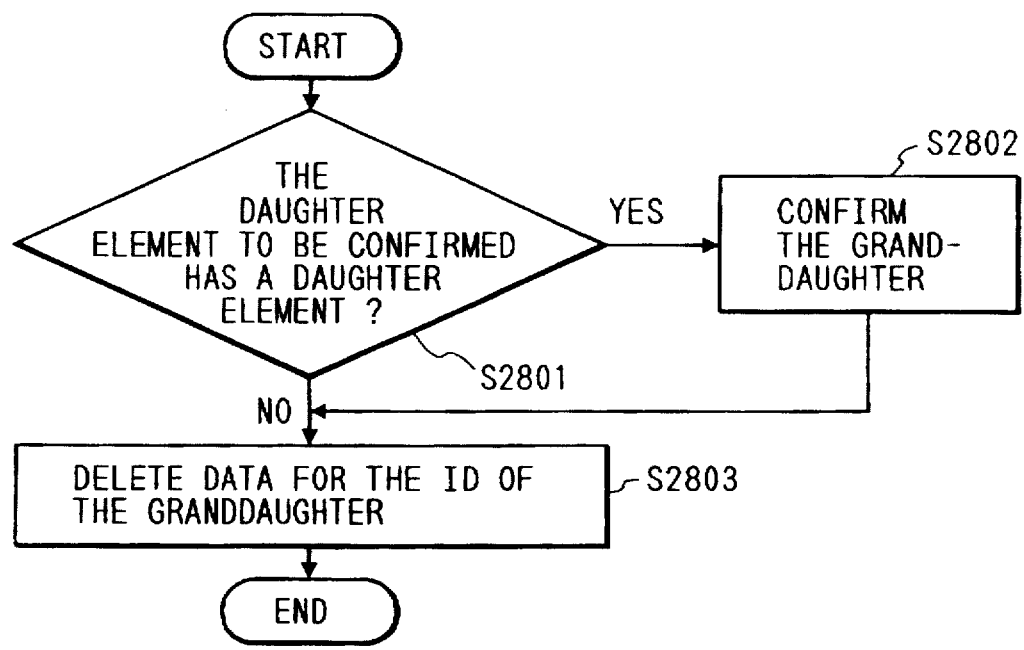
FIG. 77 is a flowchart showing daughter element confirmation processing according to the twenty-third embodiment of the present invention.

Through the above processing, as well as in the eighteenth embodiment, the display example that is shown in FIG. 65 can be acquired. At a step that is the equivalent of step S3207, the confirmation process is performed on a document element where a pointer for designating the current position of a cursor is located. This confirmation process is the same as that which is shown in FIG. 76 in this embodiment. When the document display process is completed, program control returns to the event loop. In this manner, the document display program 515 can be accomplished. The display process for a document element may be performed each time the confirmation process for the document element is performed. Through this processing, when a user confirms a document element, confirmation data is constantly maintained for each user in the user-by-user document element confirmation data 625. Thus, by comparing the update time of the update time attribute Time of the document element with the document element confirmation time of the user-by-user document element confirmation data 625, a user can identify unconfirmed data by the individual document element unit. Although this embodiment is realized by performing event driven processing, the event driven processes may be replaced by independent programs that use document data in common. Further, although the display program and the editing program are separately employed in this embodiment, a program that includes the display process and the editing process may be used as an editing program and a display program may be eliminated. According to this embodiment, it is possible for unconfirmed data for each user to be extracted from a document by the individual document element unit and to be recognized. Therefore, each user can easily access document data that should be confirmed. In addition, even if the entire document is displayed many times, the fact that the document element is unconfirmed is specified until the confirmation process is performed on that document element. In addition, by using the structure of the structured document, confirmation data for each user that should be saved is compressed to reduce a memory for use.

[Twenty-third Embodiment]

Figure 78:
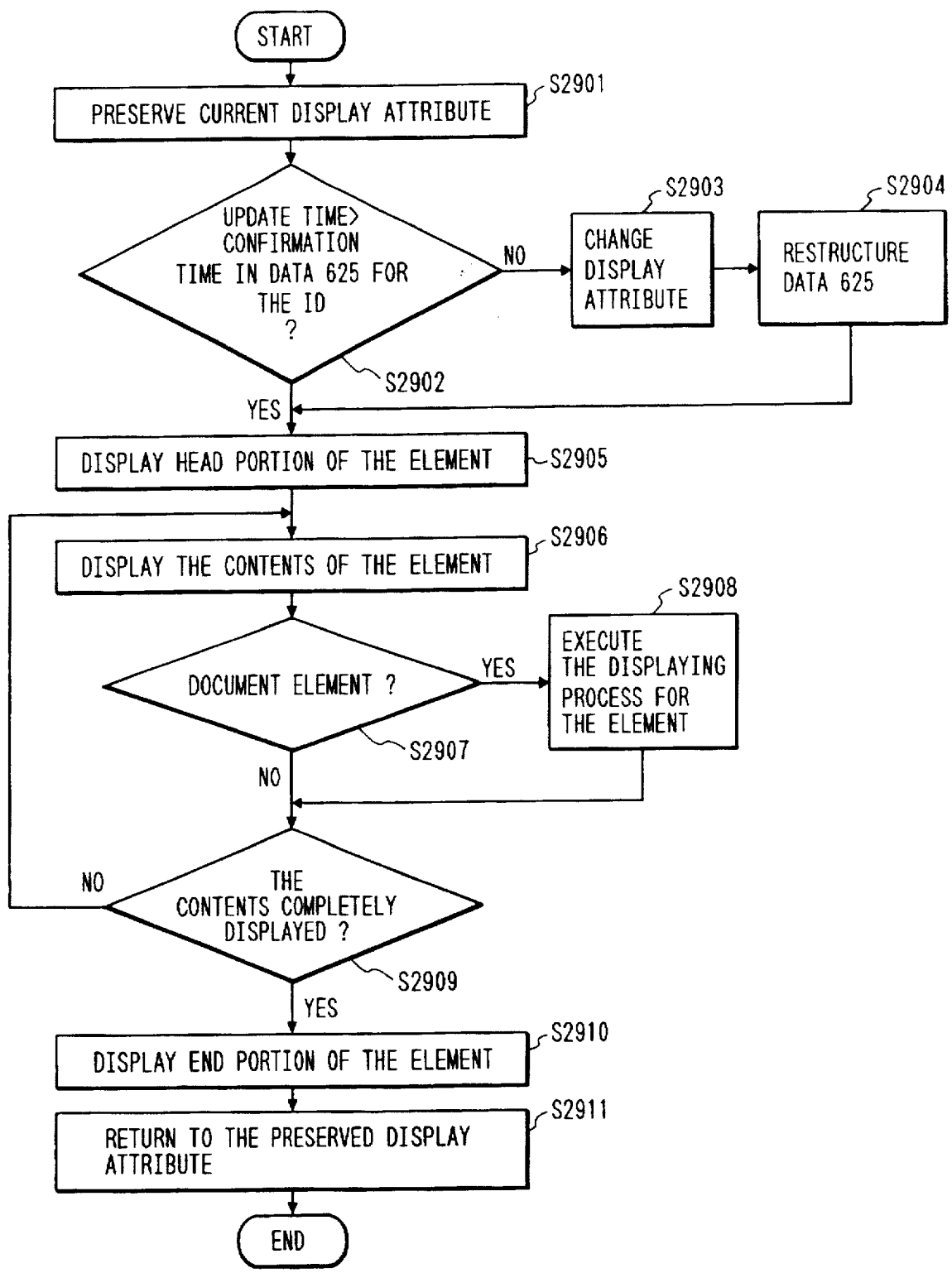
FIG. 78 is a flowchart showing document element display processing according to the twenty-third embodiment of the present invention.
Figure 79:
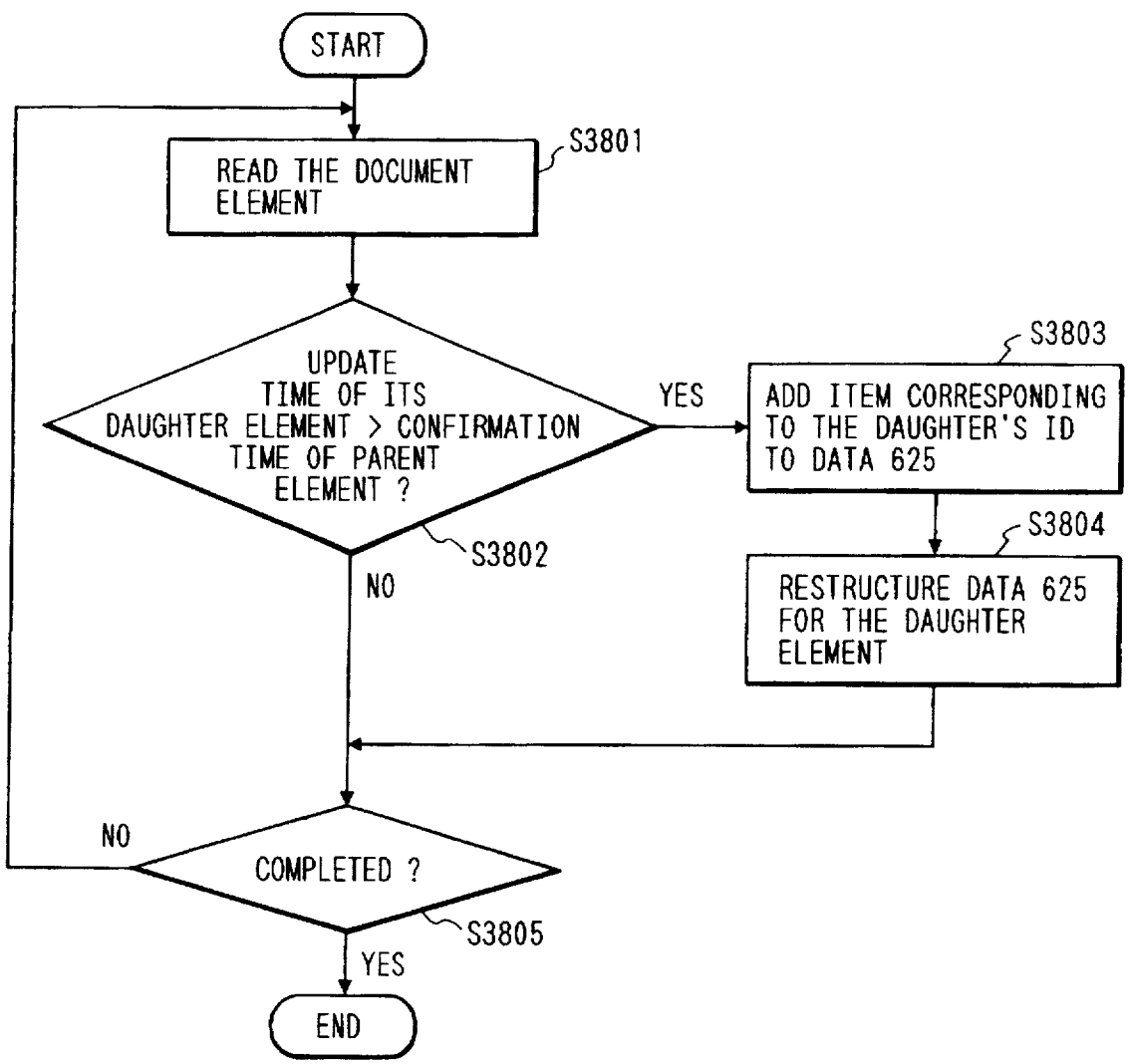
FIG. 79 is a flowchart showing restructure processing for document element confirmation time data for each user according to the twenty-third embodiment of the present invention.

Although, in the twenty-second embodiment, the restructure process for the user-by-user document element confirmation data 625 in FIG. 78 is distinguished from the document element display process, other cases besides this may be employed. In the twenty-third embodiment, the restructure of confirmation data for each user is performed in the document element display process.

The embodiment of the present invention will now be described while referring to the accompanying drawings.

Figure 80:
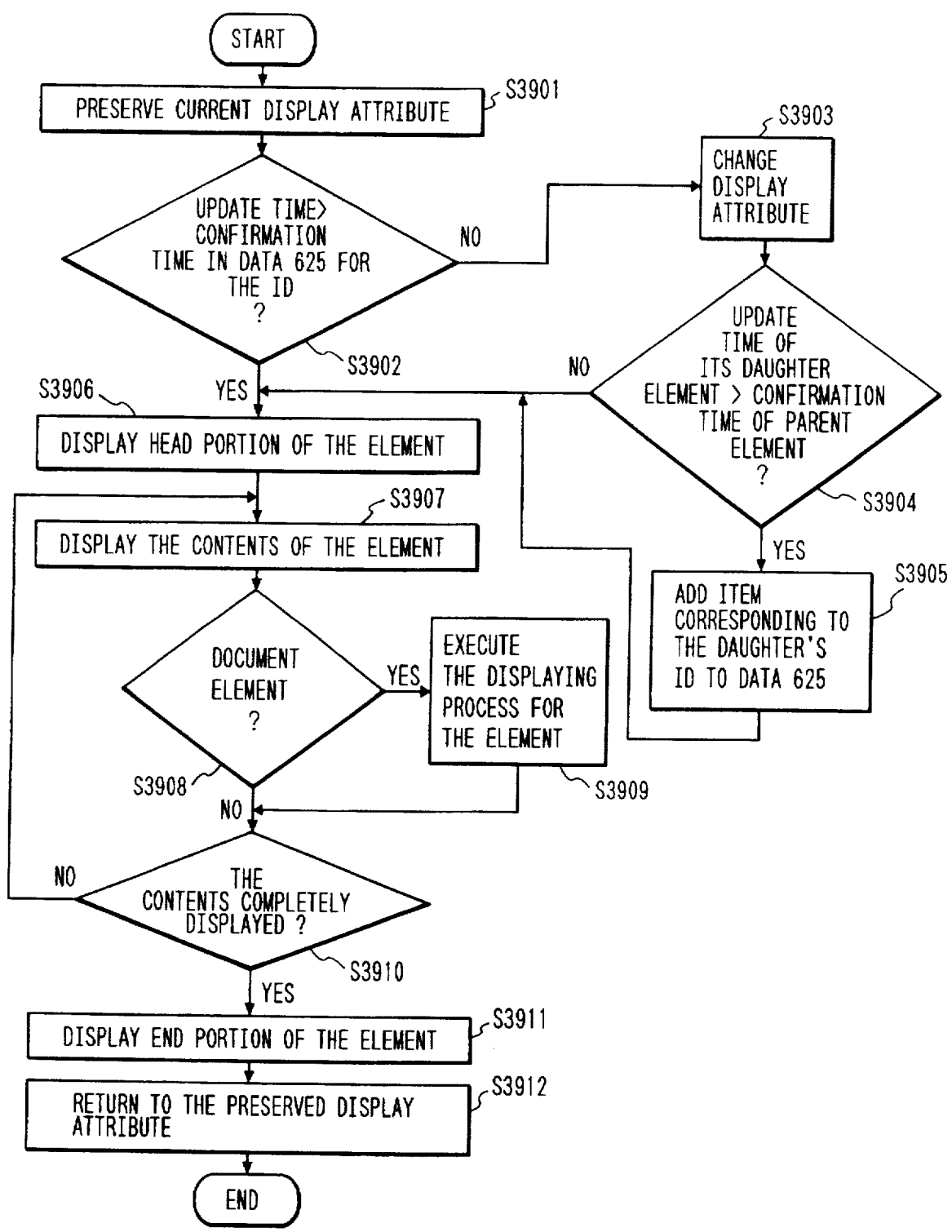
FIG. 80 is a flowchart showing document element display processing according to a twenty-fourth embodiment of the present invention.

In the block diagram for this embodiment, the document display program 511 in FIG. 57 is replaced by another document display program 516 (not shown). A document in this embodiment is the same as in FIG. 72 in the twenty-second embodiment. The user-by-user document element confirmation data 625 is the same as in the twenty-second embodiment. In the flowchart for the entire system in this embodiment, the document display process at step S902 in FIG. 36 is changed to another document display process (not shown). When the system is activated by a user, the occurrence of an event is waited for in the event loop that is the equivalent of step S901. When a display is instructed, a document is displayed. When editing is instructed, the document is changed. When termination is instructed, the system is inactivated. When an editing event has occurred, the same process is performed as in the twenty-second embodiment. When a display event has occurred, the same process is performed as in FIG. 62. The document element display process at a step that is the equivalent of step S3202 will now be explained while referring to the flowchart in FIG. 80. First, at step S3901, the current display attribute is saved. When there is user-by-user document element confirmation data 625 for the ID of a corresponding document element, and when, at step S3902, the time of the update time attribute of the document element is later than the document element confirmation time of the confirmation data 625 for a user who is currently to display a document, it is assumed that the updating of the document element has not yet been confirmed. At step S3903, the display attribute of the document element is changed. When there is no user-by-user document element confirmation data 625 for the ID of a corresponding document element or when the time of the update time attribute Time of the document element is earlier than the document confirmation time of the confirmation data 625 for a user that is currently to display a document, it is assumed that the document element has been confirmed. Program control then moves to step S3906 for display. The changing of the display attribute is the same as in the eighteenth embodiment. When, at step S3904, a daughter element that has as a parent the document element is included and when the update time attribute Time of the daughter element is later than the document element confirmation time of the parent element, program control moves to step S3905. The column corresponding to the ID of the daughter element is added to the user-by-user document element confirmation data 625, while a time that is the same as the document element confirmation time of the parent element is entered in the confirmation time column of the daughter element. Then, at step S3906, the head portion of the document element is displayed in consonance with the determined display attribute. At step S3907, the contents of the document element are displayed. If, at step S3908, it is found that a document element is included in the contents, at step S3909, the document element display process is performed again. Since a document element confirmation time that is identical to that of the parent element is provided for unconfirmed document elements and the document element display process is performed again, the restructure of the confirmation data for each user can be accomplished. The contents of the document are continuously displayed until the last of the contents have been displayed. When, at step S3910, the contents have been displayed, at step S3911, the end portion of the document element is displayed. Finally, program control moves to step S3912 to return to the display attribute that has been saved, and the document element display process is thereafter terminated. In this manner, a display example as is shown in FIG. 65 can be provided as well as in the eighteenth embodiment. Through this processing, when a user confirms a document element, confirmation data is constantly held for each user in the user-by-user document element confirmation data 625. Thus, by comparing the update time of the update time attribute Time of the document element with the document element confirmation time of the user-by-user document element confirmation data 625 that has a corresponding ID, a user can identify data that he has not yet confirmed by the individual document element unit. According to this embodiment, it is possible for unconfirmed data for each user to be extracted from a document by the individual units of document elements and to be recognized. Therefore, each user can easily access document data that should be confirmed. In addition, even if the entire document is displayed many times, the fact that the document element is unconfirmed is specified until the confirmation process is performed on that document element. In addition, by using the structure of the structured document, confirmation data for each user that should be saved is compressed to reduce memory use. Further, since the restructure of the confirmation data for each user can be accomplished during its display, a document can be displayed in a patchwork fashion, and can be handled as a stream.

According to the present invention, unconfirmed data that has been updated after it was previously confirmed can be identically displayed for confirmation. Therefore, the latest data that each user should confirm can be provided in the form of a document, and even if the target document is displayed many times, an unconfirmed portion can be continuously specified until that portion is confirmed. When a document element such as a mixed content in SGML is present, a daughter element that has as a parent a confirmed element is distinguished from a character row in the contents of the parent element, and both elements can be identified. Further, the document confirmation process can be simplified. When an unconfirmed portion is found in the vicinity of an area that has been updated, a volume of confirmation data for that portion can be compressed by using data for a time series. In addition, since a special ID is added to a document element and update history data for each ID is managed, the number of the update history data that should be managed can be limited to the number of the document elements that existed in the past. When a partial structure is identified, the volume of the confirmation data for that portion can be compressed by using structured data. Moreover, when a partial structure is confirmed by effectively using the structure of a structured document, the volume of the confirmation data for that portion can be compressed and the document data can be handled as a stream.

The present invention may be employed for a system that consists of a plurality of devices or for an apparatus that has a single device. Further, of course, to carry out this invention, the present invention can be employed as a program that is provided for a system or for an apparatus. In this case, a storage medium wherein a program that is related to the present invention is stored constitutes the present invention. By reading the program from the storage medium to the system or to the apparatus, the system or the apparatus can be activated in a predetermined manner.

What is claimed is:

1. A document processing apparatus comprising:

holding means for holding a plurality of documents, each of the documents being provided with respective update time data;

storage means for storing respectively, for each of a plurality of users, reference time data for the plurality of documents held by said holding means;

reading means for reading the plurality of documents from said holding means; and control means for reading, for one of the plurality of users, the reference time data for the one user from said storage means, for comparing, for each of the plurality of documents, the respective update time data with the read reference time data to determine whether or not the one user has confirmed any of the plurality of documents after a previous updating of that document and, in response to the determination, displaying the plurality of documents with any confirmed documents being displayed distinguishably from the rest of the documents.

2. An apparatus according to claim 1, wherein said control means generates an audible alarm signal when any of the plurality of documents is determined to have been unconfirmed.

3. An apparatus according to claim 1, wherein, when one of the documents refers to other document data, said holding means further holds respective update time data for the other document data, and said control means determines whether the one document has been confirmed by additionally comparing the respective update time data for the other document data with the read reference time data.

4. An apparatus according to claim 1, wherein said control means determines whether each document has been confirmed by determining whether each document has been updated by another one of the users after that document was updated by the one user.

5. An apparatus according to claim 1, wherein said control means determines whether each document was confirmed by determining whether specific data within that document was confirmed.

6. An apparatus according to claim 1, wherein said control means displays any confirmed documents distinguishably from the rest of the documents for each user.

7. An apparatus according to claim 1, wherein at least one of the documents is provided from structured data.

8. An apparatus according to claim 1, wherein at least one of the documents is structured as a document element and contents of the document element.

9. An apparatus according to claim 8, wherein the respective time data for each of the at least one document is updated when a document change occurs, the document change being selected from the group including inserting a daughter element into the document element, deleting a document element and deleting a character in the contents.

10. An apparatus according to claim 8, wherein when said control means determines that one of the at least one document has been confirmed by determining that the contents of that one document have been changed from an old content to a new content, said control means displays the new content and the old content in correspondence.

11. An apparatus according to claim 10, wherein the display of old and new contents is made separately for each user.

12. An apparatus according to claim 11, wherein the display of old and new contents distinguishes between moved data and copied data.

13. A document processing method comprising the steps of:
   holding a plurality of documents in holding means, each of the documents being provided with respective update time data;
   storing, in storage means, respectively, for each of a plurality of users, reference time data for the plurality of documents held by the holding means;
   reading the plurality of documents from the holding means;
   reading, for one of the plurality of users, the reference time data for the one user from the storage means;
   comparing, for each of the plurality of documents, the respective update time data with the read reference time data to determine whether or not the one user has confirmed any of the plurality of documents after a previous updating of that document; and
   in response to the determination, displaying the plurality of documents with any confirmed documents being displayed distinguishably from the rest of the documents.

14. A method according to claim 13, wherein said comparing step generates an audible alarm signal when any of the plurality of documents is determined to have been unconfirmed.

15. A method according to claim 13, wherein, when one of the documents refers to other document data, the holding means further holds respective update time data for the other document data, and said comparing step determines whether the one document has been confirmed by additionally comparing the respective update time data for the other document data with the read reference time data.

16. A method according to claim 13, wherein said comparing step determines whether each document has been confirmed by determining whether each document has been updated by another one of the users after that document was updated by the one user.

17. A method according to claim 13, wherein said comparing step determines whether each document was confirmed by determining whether specific data within that document was confirmed.

18. A method according to claim 13, wherein said display step displays any confirmed documents distinguishably from the rest of the documents for each user.

19. A method according to claim 13, wherein at least one of the documents is provided from structured data.

20. A method according to claim 13, wherein at least one of the documents is structured as a document element and contents of the document element.

21. A method according to claim 20, wherein the respective time data for each of the at least one document is updated when a document change occurs, the document change being selected from the group including inserting a daughter element into the document element, deleting a document element and deleting a character in the contents.

22. A method according to claim 20, wherein when said comparing step determines that one of the at least one document has been confirmed by determining that the contents of that one document have been changed from an old content to a new content, said control means displays the new content and the old content in correspondence.

23. A method according to claim 22, wherein the display of old and new contents is made separately for each user.

24. A method according to claim 23, wherein the display of old and new contents distinguishes between moved data and copied data.

25. A computer readable medium containing a program for causing a document processing apparatus to execute a method comprising the steps of:
   holding a plurality of documents in holding means, each of the documents being provided with respective update time data;
   storing, in storage means, respectively, for each of a plurality of users, reference time data for the plurality of documents held by the holding means;
   reading the plurality of documents from the holding means;
   reading, for one of the plurality of users, the reference time data for the one user from the storage means;
   comparing, for each of the plurality of documents, the respective update time data with the read reference time data to determine whether or not the one user has confirmed any of the plurality of documents after a previous updating of that document; and
   in response to the determination, displaying the plurality of documents with any confirmed documents being displayed distinguishably from the rest of the documents.

26. A medium according to claim 25, wherein said comparing step generates an audible alarm signal when any of the plurality of documents is determined to have been unconfirmed.

27. A medium according to claim 25, wherein, when one of the documents refers to other document data, the holding means further holds respective update time data for the other document data, and said comparing step determines whether the one document has been confirmed by additionally comparing the respective update time data for the other document data with the read reference time data.

28. A medium according to claim 25, wherein said comparing step determines whether each document has been confirmed by determining whether each document has been updated by another one of the users after that document was updated by the one user.

29. A medium according to claim 25, wherein said comparing step determines whether each document was confirmed by determining whether specific data within that document was confirmed.

30. A medium according to claim 25, wherein said display step displays any confirmed documents distinguishably from the rest of the documents for each user.

31. A medium according to claim 25, wherein at least one of the documents is provided from structured data.

32. A medium according to claim 25, wherein at least one of the documents is structured as a document element and contents of the document element.

33. A medium according to claim 32, wherein the respective time data for each of the at least one document is updated when a document change occurs, the document change being selected from the group including inserting a daughter element into the document element, deleting a document element and deleting a character in the contents.

34. A medium according to claim 32, wherein when said comparing step determines that one of the at least one document has been confirmed by determining that the contents of that one document have been changed from an old content to a new content, said control means displays the new content and the old content in correspondence.

35. A medium according to claim 34, wherein the display of old and new contents is made separately for each user.

36. A medium according to claim 35, wherein the display of old and new contents distinguishes between moved data and copied data.

* * * * *